United States Patent
Cramer et al.

(10) Patent No.: US 11,580,715 B2
(45) Date of Patent: Feb. 14, 2023

(54) METHODS AND APPARATUS FOR ENCODING DATA IN NOTCHED SHAPES

(71) Applicants: Jonathan Cramer, Walton, NY (US); Mehdi Ben Slama, Rueil-Malmaison (FR); Nicholas Petraco, Massapequa Park, NY (US)

(72) Inventors: Jonathan Cramer, Walton, NY (US); Mehdi Ben Slama, Rueil-Malmaison (FR); Nicholas Petraco, Massapequa Park, NY (US)

(73) Assignee: Shape Matrix Geometric Instruments, LLC, Brooklyn, NY (US)

( * ) Notice: Subject to any disclaimer, the term of this patent is extended or adjusted under 35 U.S.C. 154(b) by 0 days.

(21) Appl. No.: 17/666,882

(22) Filed: Feb. 8, 2022

(65) Prior Publication Data
US 2022/0230409 A1   Jul. 21, 2022

Related U.S. Application Data

(63) Continuation of application No. 16/827,504, filed on Mar. 23, 2020, now Pat. No. 11,282,288.

(60) Provisional application No. 62/938,303, filed on Nov. 20, 2019.

(51) Int. Cl.
*G06T 19/20* (2011.01)
*G06T 17/10* (2006.01)

(52) U.S. Cl.
CPC ............. *G06T 19/20* (2013.01); *G06T 17/10* (2013.01); *G06T 2219/2008* (2013.01); *G06T 2219/2021* (2013.01)

(58) Field of Classification Search
CPC . G06T 19/20; G06T 17/10; G06T 2219/2008; G06T 2219/2021
See application file for complete search history.

(56) References Cited

U.S. PATENT DOCUMENTS

2012/0034349 A1* 2/2012 Jing ..................... G06V 10/267
426/231
2015/0324694 A1* 11/2015 Wang ....................... G06N 5/04
706/12

* cited by examiner

*Primary Examiner* — Michelle Chin
(74) *Attorney, Agent, or Firm* — Ronald D. Slusky; Stephen R. Otis

(57) ABSTRACT

A notched 2D shape may encode information. For instance, a physical tag may display, form or include a polygon that is modified by notches and by one or more holes. This notched 2D shape may encode data that identifies, or provides information regarding, a physical product to which the tag is physically attached. Alternatively, this notched 2D shape may encode any other type of information, such as information about what we sometimes call a product shape or shape matrix. The notched shape may be an octagon that is modified by notches and by one or more holes.

25 Claims, 22 Drawing Sheets
(13 of 22 Drawing Sheet(s) Filed in Color)

$$PID_{rand} = $$
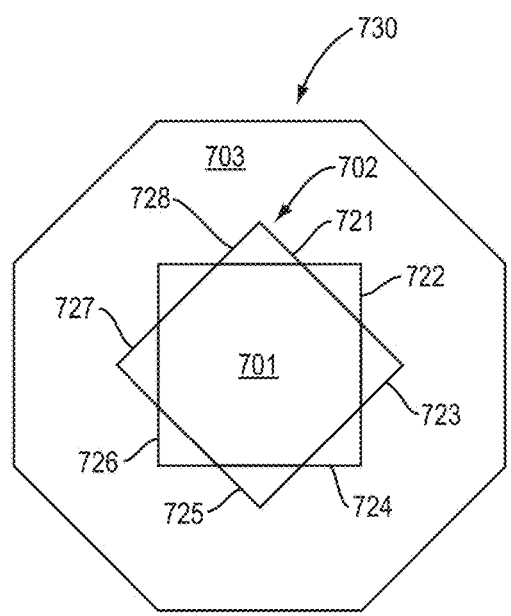
FIG. 6
FIG. 7
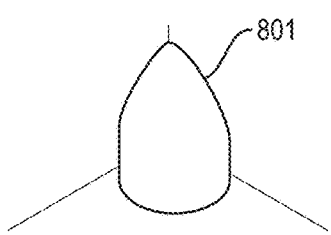
FIG. 8A
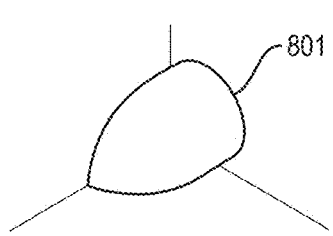
FIG. 8B
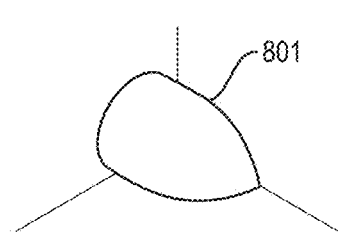
FIG. 8C

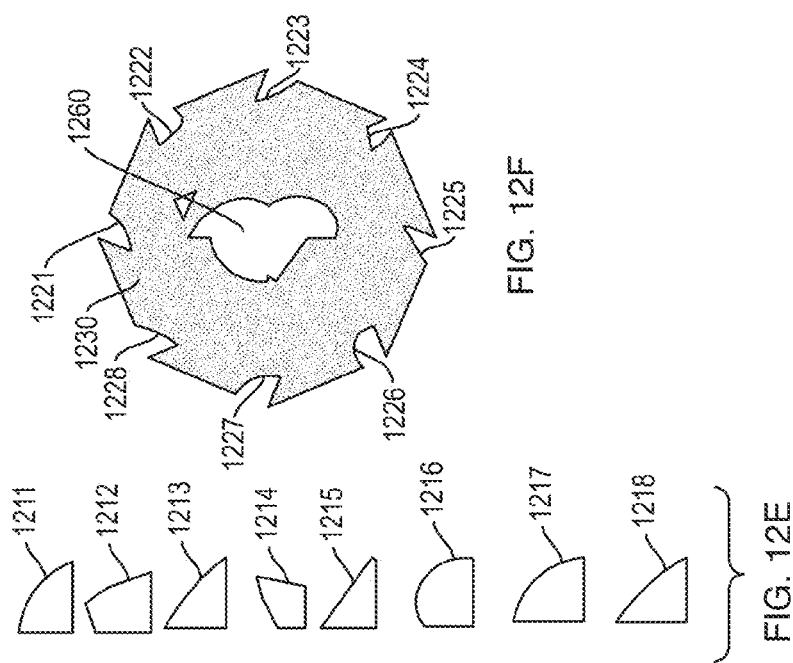
FIG. 12F
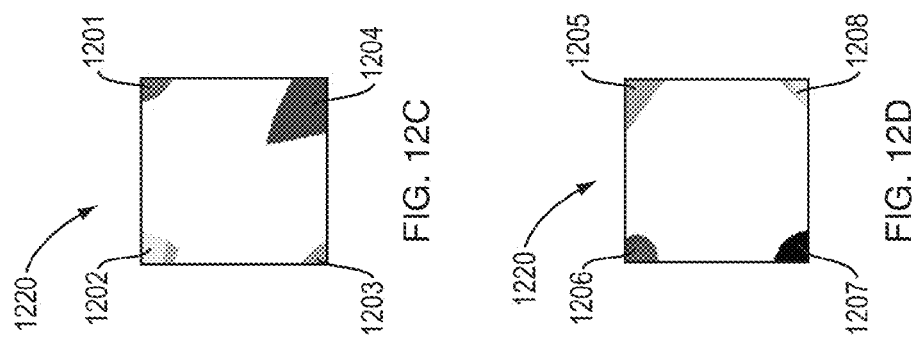
FIG. 12E
FIG. 12C
FIG. 12D
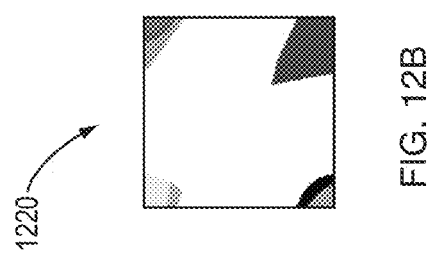
FIG. 12B
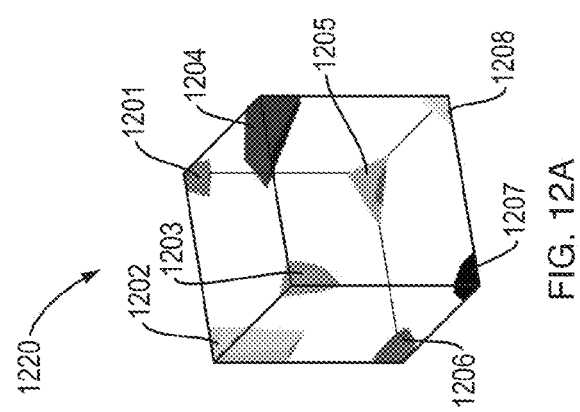
FIG. 12A

METHODS AND APPARATUS FOR ENCODING DATA IN NOTCHED SHAPES

RELATED APPLICATIONS

This application is a continuation of U.S. patent application Ser. No. 16/827,504 filed Mar. 23, 2020, which claimed the benefit of U.S. Provisional Application No. 62/938,303 filed Nov. 20, 2019 (the "Provisional").

FIELD OF TECHNOLOGY

The present invention relates generally to encoding data in notched shapes.

COMPUTER PROGRAM LISTING

The following four computer program files are incorporated by reference herein: (1) createShapetagSets.txt with a size of about 2 KB; (2) createShapetagSets.txt with a size of about 10 KB; (3) errorCorrection.txt with a size of about 1 KB; and (4) Settings.txt with a size of about 1 KB. Each of these four computer program files was created as an ASCII.txt file on Feb. 26, 2020. These four computer program files are part of the patent or patent application file.

SUMMARY

In illustrative implementations of this invention, a notched, two-dimensional (2D) geometric shape encodes data. For instance, a physical tag may display or include a 2D geometric shape that is modified by notches. This 2D shape may encode data that identifies (or provides information regarding) a physical product to which the tag is physically attached (or of which the tag is a part).

In some implementations, the tag is attached to the surface of the product, or is embossed or engraved on the surface of the product, or is partially embedded inside the product. A camera may capture one or more images of the tag. Then a computer may analyze these image(s) to recognize a notched 2D shape that is displayed by, or occurs in, the tag. Then a computer may access data associated with the shape. For instance, this associated data may identify the product (to which the tag is attached or of which the tag is part) or provide other information about the product. To access the associated data, a computer may employ a look-up table.

In some cases, the notched 2D shape that encodes the information is (a) a regular polygon (such as a regular pentagon, regular hexagon, regular heptagon regular octagon, regular nonagon, or regular decagon) modified by notches; or (b) an irregular polygon modified by notches.

In some cases, the notched 2D shape has a convex hull that is a regular polygon (such as a regular pentagon, regular hexagon, regular heptagon, regular octagon, regular nonagon, or regular decagon).

The phrase "convex hull" is used herein in its geometric sense. Put differently, the "convex hull" of a 2D shape is the smallest convex set that contains the 2D shape. For instance, the "convex hull" of a convex regular polygon is the polygon of minimum perimeter that contains the convex regular polygon. For example, if one were to stretch a rubber band tightly around the perimeter of a convex polygon, then the inner edge of the rubber band would be located at or about the perimeter of the "convex hull" of the polygon.

In some implementations, the notched 2D geometric shape that encodes information is what we call an "octoshape". The octoshape may be an octagon that is notched by eight notches along its perimeter, each notch being located at a different face (straight outer edge) of the octagon. Each notch may appear to have been carved into the octoshape. Each notch may include curved or straight regions. Put differently, in a region where an octoshape is notched by a notch, the perimeter of the octoshape may consist of one or more curved lines and/or one or more straight line segments.

The remainder of the perimeter of the octoshape (i.e., the portion of the perimeter other than the notches) may consist of straight edges. These straight edges may be coincident with straight edges of the convex hull of the octoshape.

The convex hull of an octoshape is an octagon. We sometimes call the octagonal convex hull of an octoshape a "base octagon" for the octoshape.

In some cases, the notches of a notched 2D shape are allowed to have only certain shapes. Put differently, in some cases, each notch must have a 2D geometric shape that is one of a finite, predetermined set of shapes. For instance, in some cases, each notch must have a 2D contour that is one of a set of 192 allowed contours. This set of allowed contours may be selected in such a way as to maximize differences in the contours, which in turn may facilitate rapid and accurate optical identification of the contour of a notch.

In some cases, there are one or more holes in each notched 2D shape. The shape or position of these holes may encode information. These holes may include what we sometimes loosely call a "keyhole" and an "orientation mark".

A keyhole may be an irregular polygon that is located in a central region of a notched 2D shape. For instance, a keyhole in an octoshape may be an irregular polygon that is located in a central region of the octoshape and has eight vertices. A keyhole may encode information, such as color. In some cases, for each particular notch in a notched 2D shape, a keyhole encodes the color of a 3D "subshape" that is associated with the particular notch. (Subshapes are discussed in detail, elsewhere in this document)

A keyhole may encode data by distance. For instance, the distance between a specific vertex of the keyhole and a reference point may encode color of a 3D subshape that is associated with the notch closest to the specific vertex. In some cases: (a) the notched 2D shape has a convex hull; and (b) the reference point in the keyhole is the center of the convex hull.

Alternatively, the shapes of different regions of the perimeter of a keyhole may encode information such as color. For instance, the shape of four different regions of the perimeter of a keyhole in an octoshape may encode data regarding the color of eight different subshapes that are associated with the eight notches of the octoshape.

In some cases, each notched 2D shape has an orientation mark. The orientation mark may be a hole in the notched 2D shape. The orientation mark may indicate ordinal position of a notch that is closest to the orientation mark. This ordinal position may be relative to other notches of the notched 2D shape. For instance, in some cases: (a) the notched 2D shape is an octoshape; and (b) a computer ordinally numbers the notches of the octoshape in such a way that the particular notch that is physically closest to the orientation mark has an ordinal position of one, and the other notches of the octoshape are ordinally numbered two to eight in a clockwise (or counterclockwise) direction from the particular notch.

In some cases, a notch is allowed to have only one of 192 2D contours, where each allowed contour of a notch is different in than each other allowed contour of a notch. These 192 contours may be 2D shapes that would result from the following procedure: (1) Start with eight three-dimensional (3D) "mother shapes", such as sphere, torus, cube, cone, ellipsoid, pyramid, cylinder and diamond. (2) Slice each 3D mother shape into a set of eight 3D subshapes, where each 3D subshape created in this step 2 is different in geometric shape than each other subshape created in this step 2. This step 2 creates sixty-four 3D subshapes. (3) Allow each of the sixty-four 3D subshapes to be in any of only 3 different angular orientations. (4) For each of the sixty-four allowed 3D subshapes in each of the three allowed orientations, determine a 2D outline. This results in one-hundred ninety-two 2D outlines. Each of these 192 outlines is the perimeter of a projection (e.g., orthogonal projection) of a subshape unto a geometric plane. In some implementations, the only allowed contours for a notch in an octoshape are these one hundred ninety-two 2D outlines. In step (2) of the above process, the mother shapes may be sliced in such a way as to maximize the difference in geometric shape among the projected 2D contours that are the output of step (4). This, in turn, may facilitate optical recognition of the contours.

In some cases, a notch may be allowed to be associated with only one of eight colors. The allowed color associated with a 2D notch of an octoshape (and with a corresponding subshape) may be specified by the keyhole of the octoshape.

In some cases, a notched 2D shape may encode a unique array of values, out of a very large set (e.g., a set of more than 10 million) of allowed arrays of values.

In some cases, the respective shapes of the notches in a specific notched 2D shape and the shape of the keyhole of the specific notched 2D shape together encode a single array of values, which is a unique member of a very large set (e.g., a set of more than 10 million) of allowed arrays. This unique array of values may be used to identify a physical product.

For example, a physical tag may form, display or include, a notched 2D shape. The respective shapes of the notches in that notched 2D shape and the shape of the keyhole of that notched 2D shape may together encode a unique array of values, which is a unique member of a very large set (e.g., a set of more than 10 million) of allowed arrays. The encoded array of values may be used to uniquely identify a physical product with which the tag is associated (e.g., the tag may be attached to, or embossed or engraved in, or embedded in, the physical object).

In some cases: (a) the geometric shapes of eight notches in an octoshape and the geometric shape of the keyhole of the octoshape together encode an array of values; and (b) this array of values is a unique member of a set of $8^8 \times 3^8 \times 8^8 \times 8^8$ arrays that are allowed to encode a single octoshape.

This invention is not limited to representing values that identify (or provide information about) a physical product. In illustrative implementations, a notched 2D shape may encode any type of data. For instance, data that is encoded by one or more notched 2D shapes—or that is associated with or derived at least in part from such data—may comprise any type of information, such as: (a) a password; (b) data that authenticates a user, computer, communication, transaction or other event or object (e.g., a banknote, drug, or medical product); or (c) data regarding a physical object that displays, includes or is attached to the notched 2D shape. In some cases, a notched 2D shape may be employed to store data in "hard" physical format, for purposes of data backup or data recovery (e.g., recovery of data that would otherwise be lost in a disaster).

In some cases, the array (or permutation) of values encoded by a notched 2D shape specifies a 3D construct which we sometimes call a "product shape". Put differently, in some cases: (a) a notched 2D shape completely specifies a product shape and vice versa; and (b) the notched 2D shape and the product shape represent identical data. Each "shape nugget" that is mentioned in the 662 application (defined below) or in the 530 patent (defined below) is a non-limiting example of a product shape. As used herein, the "662 application" means U.S. patent application Ser. No. 15/975,662 filed May 9, 2018, titled Methods and Apparatus for Encoding Passwords or Other Information, published on Nov. 14, 2019 as U.S. patent publication 2019/0347397A1. As used herein, the "530 patent" means U.S. Pat. No. 10,204,530 B1, issued Feb. 12, 2019, titled Shape-Matrix Geometric Instrument. The entire disclosures of the 662 application and the 530 patent are incorporated by reference herein.

A product shape may consist of multiple subshapes. Each "shape fragment" that is mentioned in the 662 application is a non-limiting example of a subshape. Also, each "corner shape" that is mentioned in the 530 patent is a non-limiting example of a subshape.

In some cases, the array (or permutation) of values encoded by a notched 2D shape specifies a 3D construct which is all or a portion of what we sometimes call a "shape matrix". For instance, the array (or permutation) of values encoded by a notched 2D shape may specify a 3D construct which is a single cubic cell of a shape matrix, where the shape matrix consists of eight cubic cells. Put differently, in some cases: (a) a notched 2D shape completely specifies a cubic cell of a shape matrix and vice versa; and (b) the notched 2D shape and the cubic cell represent identical data. Or, for instance, the array (or permutation) of values encoded by a notched 2D shape may specify a 3D construct which is a triangular pyramid that is part of a shape matrix, where the shape matrix is an icosahedron that consists of twenty triangular pyramids. Put differently, in some cases: (a) a notched 2D shape completely specifies a triangular pyramid of a shape matrix and vice versa; and (b) the notched 2D shape and the triangular pyramid represent identical data. Each shape matrix mentioned in the 662 application is a non-limiting example of a shape matrix. Likewise, each "shape-matrix geometric instrument" or "shape-matrix" mentioned in the 530 patent is an example of a shape matrix.

In some cases, the array (or permutation) of values encoded by a notched 2D shape specifies a 3D construct which is all or a portion of what we sometimes call a "super-shape-matrix". The super-shape-matrix may be a set of shape matrices, where each shape matrix in the set touches at least one other shape matrix in the set. For instance, the array (or permutation) of values encoded by a notched 2D shape may specify a 3D construct which is a single cubic cell of a super-shape-matrix, where each shape matrix in the super-shape-matrix consists of eight cubic cells and touches at least one other shape matrix in the super-shape-matrix. Put differently, in some cases: (a) a notched 2D shape completely specifies a cubic cell of a super-shape-matrix and vice versa; and (b) the 2D octoshape and the cubic cell represent identical data. Or, for instance, the array (or permutation) of values encoded by a notched 2D shape may specify a 3D construct which is a triangular pyramid that is part of a super-shape-matrix, where each shape matrix in the super-shape-matrix is an icosahedron that consists of twenty triangular pyramids. Put differently, in some cases: (a) a notched 2D shape completely specifies a triangular pyramid of a super-shape-matrix and vice versa; and (b) the notched 2D shape and the triangular pyramid represent identical data. Each super-shape-matrix mentioned in the 662 application is a non-limiting example of a super-shape-matrix.

As noted above, a notched 2D shape may encode or represent information about: (a) a product shape; (b) cubic cell of a shape matrix; or (c) cubic cell of a super-shape-matrix. The product shape, shape matrix or super-shape-matrix may in turn encode or represent any type of information. For instance, data that is encoded by one or more product shapes, shape matrices or super-shape-matrices—or that is associated with or derived at least in part from such data—may comprise any type of information, such as: (a) a password; (b) data that authenticates a user, computer, communication, transaction or other event or object (e.g., a banknote, drug, or medical product); or (c) data regarding a physical object.

In some cases, multiple notched, 2D shapes together encode data. The notched 2D shapes may be located adjacent to each other (e.g., in a row or in an array). Alternatively, the information may be encoded by a set of roughly circular, notched 2D shapes which are nested, one inside the other, where each of the nested shapes includes at least one edge (e.g., an inner edge, outer edge, or both) that is notched by notches that encode information. This set of roughly circular, notched 2D shapes may include a keyhole and an orientation mark.

Each notched 2D shape (or notched 2D object) that is mentioned herein may comprise: (a) an octoshape; (b) a polygon that is modified by notches; (c) a solid 2D shape that has a notched perimeter; (d) a solid 2D shape that has a notched perimeter, which perimeter is at least partially curved including in regions outside of the notches; (e) an irregular polygon that is modified by notches; (f) a regular polygon that is modified by notches; (g) a convex regular polygon that is modified by notches; or an "inside-out" version of any of the foregoing. In an inside-out version, each 2D notch (which forms an indentation in the perimeter of a 2D shape) is replaced by a 2D protuberance (which forms a "bump" in the perimeter of a 2D shape). For instance, in an inside-out version of a notched 2D polygon, each 2D notch (which forms an indentation in an otherwise flat face of the polygon) is replaced by a 2D protuberance (which forms a "bump" in an otherwise flat face of the polygon). Also, one or more holes may exist in each notched 2D shape and each notched 2D object mentioned above in this paragraph. The shapes mentioned above in this paragraph are non-limiting examples of notched 2D shapes (and notched 2D objects) that may encode information, in illustrative implementations of this invention.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In FIGS. 1A-1D, the sub-shapes result from dividing a mother shape into eight parts.

Likewise, In FIG. 2, the eight sub-shapes are located in a product shape.

FIG. 6 shows an array that specifies a product identification number.

FIG. 7 shows different regions of an octoshape.

FIGS. 8A, 8B and 8C show three different orientations of a subshape.

FIGS. 12A, 12B, 12C, 12D, 12E and 12F illustrate how an octoshape may encode information about eight 3D sub-shapes in a cubic cell of a shape matrix.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

As noted above, in some cases, a 2D notch of an octoshape is allowed to have only one of 192 unique 2D contours. These 192 contours may be 2D geometric shapes that would result from the following procedure: (1) Start with eight 3D mother shapes, such as a sphere, torus, cube, cone, ellipsoid, pyramid, cylinder and diamond. (2) Slice each 3D mother shape into a set of eight 3D subshapes, where each 3D subshape created in this step 2 is different in geometric shape than each other subshape created in this step 2. This step 2 creates sixty-four 3D subshapes. (3) Allow each of the sixty-four 3D subshapes to be in any of only 3 different angular orientations. (4) For each of the allowed subshapes in each of the three allowed orientations, determine a 2D outline that is the perimeter of a projection (e.g., orthogonal projection) of the subshape unto a plane. This results in 192 allowed contours of a notch. FIGS. 1A-1D conceptually illustrate this process.

FIGS. 1A, 1B, 1C and 1D illustrate how 2D contours of eight notches in the perimeter of an octoshape may be selected to match the 2D outlines of eight 3D sub-shapes. In FIGS. 1A-1D, the sub-shapes result from dividing a mother shape into eight parts.

Figure 1A:
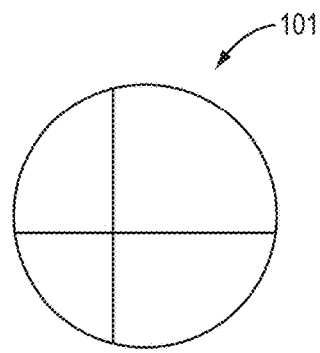
FIGS. 1A, 1B, 1C and 1D illustrate how 2D contours of eight notches in the perimeter of an octoshape may be selected to match the 2D outlines of eight 3D sub-shapes.

FIG. 1A shows a 3D mother shape that is a sphere 101 and that has been divided into eight 3D subshapes (four of which are occluded from view in FIG. 1A).

Figure 1B:
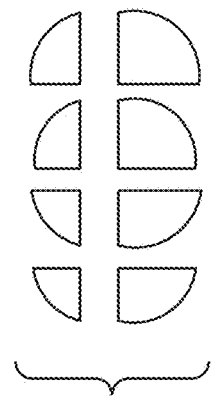

FIG. 1B shows eight 2D outlines. These eight outlines are the perimeters of orthogonal projections, onto a geometric plane, of the eight subshapes that result from dividing the spherical mother shape 101.

Figure 1C:
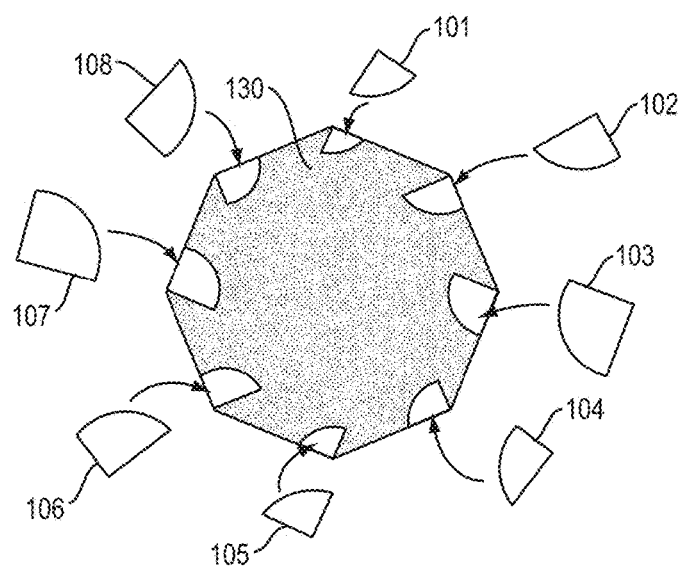

The eight outlines 101, 102, 103, 104, 105, 106, 107, 108 in FIG. 1C are identical to the eight outlines in FIG. 1B (which are outlines of eight subshapes formed by slicing sphere 101).

Figure 1D:
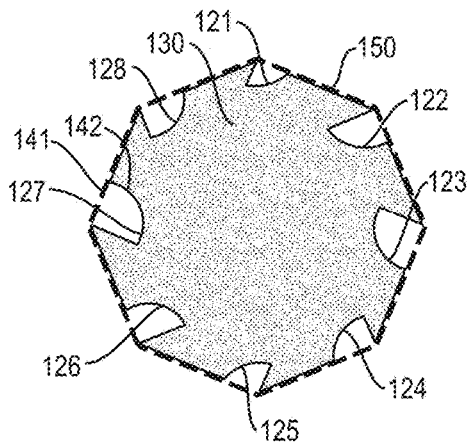

FIG. 1D shows the octoshape 130, notched by eight notches. The eight notches 121, 122, 123, 124, 125, 126, 127, and 128 in FIG. 1D have the same geometric shape as outlines 101, 102, 103, 104, 105, 106, 107, and 108, respectively, in FIG. 1C. In FIG. 1D, the convex hull 150 of octoshape 130 is an octagon. In FIG. 1D, the perimeter of convex hull 150 is denoted by a dashed line. Loosely speaking, the convex hull 150 of the octoshape is the octoshape with the notches and holes filled in.

In some cases, the contour of a notch in a notched 2D object is a geometric shape that consists of: (a) a "conforming portion" which is coincident with (and thus touches and perfectly conforms with) a portion of the perimeter of the notched 2D object; and (b) a "facet portion" which is a straight line segment that joins the two end points of the conforming portion (starting at one and ending at the other of these two end points).

Thus, in some cases: (1) the conforming portion of a contour of a notch is a geometric open shape; whereas (2) the entire contour of the notch is a geometric closed shape. This is because adding the facet portion to the conforming portion creates a geometric closed shape which is the contour of the notch.

In some cases, the notches are indentations in the perimeter of a notched 2D shape. The notches in a notched 2D shape may reduce the area of the notched 2D shape. Each notch may be a concave region of the perimeter of a notched shape. Each notch may have a geometric shape that, if it were smoothed, would be a concave indentation in the perimeter of the notched shape.

In FIG. 1D, the conforming portion 142 of the perimeter of notch 127 is coincident with a portion of the perimeter of octoshape 130. Conforming portion 142 is a geometric open shape. In FIG. 1D, the facet portion 141 of notch 127 is a straight line segment that runs between the two end points of conforming portion 142 (and is coincident with part of a straight outer facet of the convex hull 150 of octoshape 130).

In FIG. 1D, the contour of notch 127 is a geometric closed shape that consists of conforming portion 142 and facet portion 141.

In some implementations of this invention, each 2D contour of a notch is a geometric closed shape and each 2D outline of a 3D object is a geometric closed shape. Thus, the contour of a notch and the outline of a 3D object may potentially match each other.

In some implementations, a computer analyzes an image (or measurements) of a notched 2D shape (such as an octoshape), detects a notch, and calculates the location and length of a facet portion of the notch. The facet portion may be easily calculated, because the facet portion is straight and is coincident with part of a straight outer edge of the convex hull of the notched 2D shape.

Figure 2:
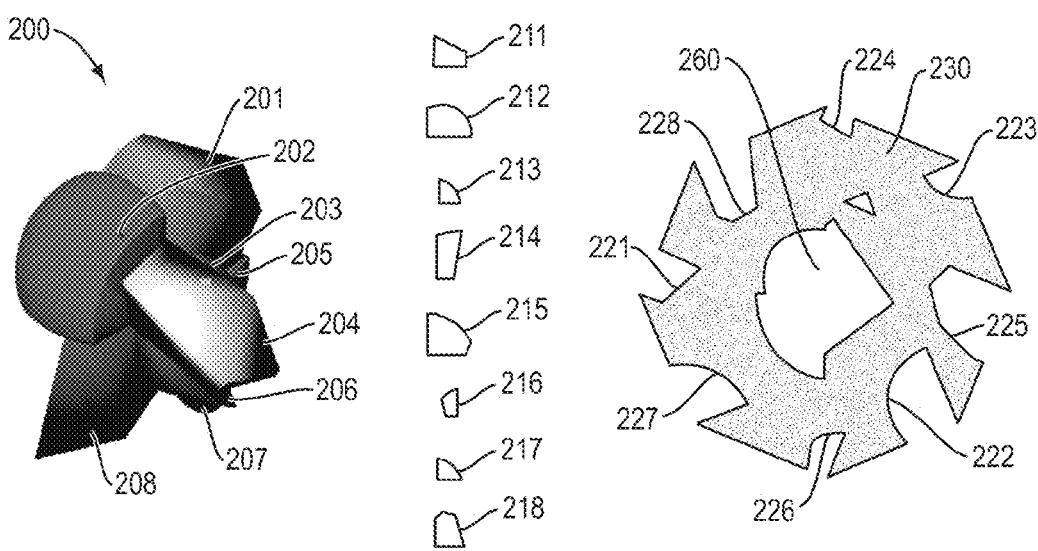
FIG. 2 illustrates how 2D contours of eight notches in the perimeter of an octoshape may be selected to match the 2D outlines of eight 3D sub-shapes.
Figure 3A:
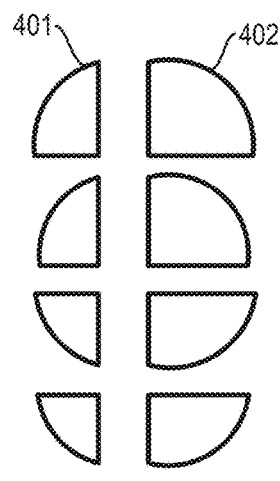
FIGS. 3A, 3B, 3C, 3D, 3E, 3F, 3G, and 3H each show outlines of eight sub-shapes that result from dividing a mother shape into eight parts.
Figure 3B:
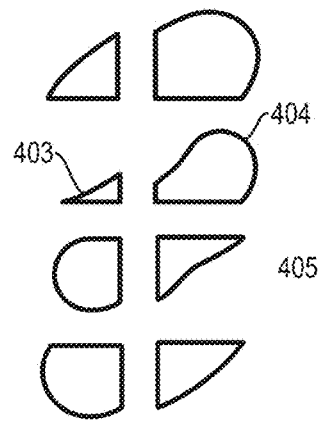
Figure 3C:
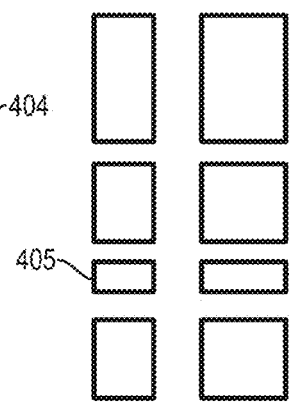
Figure 3D:
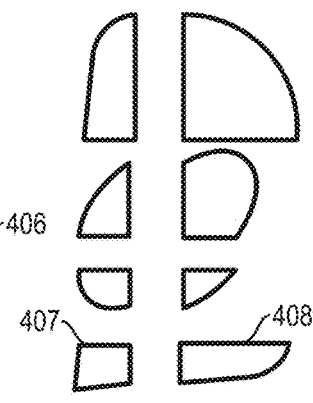
Figure 3E:
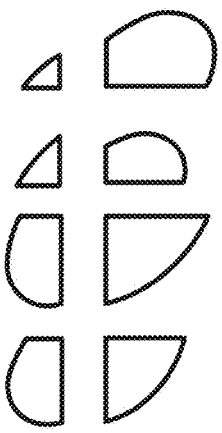
Figure 3F:
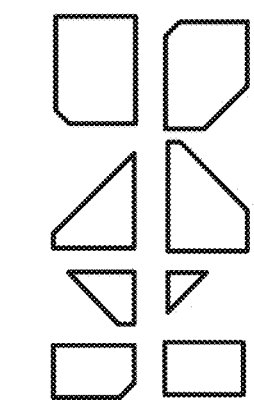
Figure 3G:
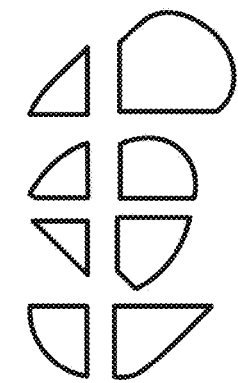
Figure 3H:
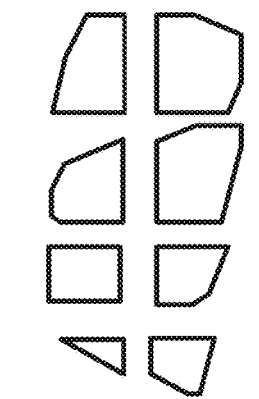

Likewise, FIG. 2 illustrates how 2D contours of eight notches in the perimeter of an octoshape may be selected to match the 2D outlines of eight 3D sub-shapes. In FIG. 2, the eight sub-shapes are located in a product shape.

The left side of FIG. 2 shows a product shape 200 that consists of eight 3D subshapes 201, 202, 203, 204, 205, 206, 207, 208. The middle of FIG. 2 shows eight 2D outlines. These eight outlines 211, 212, 213, 214, 215, 216, 217, 218 are the perimeters of projections, onto a geometric plane, of these eight 3D subshapes. The right side of FIG. 2 shows an octoshape 230 that has eight notches 221, 222, 223, 224, 225, 226, 227, 228. The 2D contours of these eight notches in octoshape 230 (in the right side of FIG. 2) match the eight 2D outlines (in the middle of FIG. 2), which are the perimeters of the projections of the eight subshapes that form product shape 200 (in the left side of FIG. 2). Specifically, the 2D contours of notches 221, 222, 223, 224, 225, 226, 227, and 228 match outlines 211, 212, 213, 214, 215, 216, 217, and 218, respectively, which are perimeters of projections of subshapes 201, 202, 203, 204, 205, 206, 207, and 208, respectively.

In FIG. 2, the contour of each notch in octoshape 230 encodes the geometric shape and orientation of the corresponding subshape in product shape 200, and vice versa. Put differently, the contour of a notch in octoshape 230 encodes the same information as do the geometric shape and orientation of a corresponding subshape in product shape 200. For instance, the contour of notch 221 encodes the geometric shape and orientation of subshape 201, and vice versa. In other words, the contour of notch 221 encodes the same information as do the geometric shape and orientation of subshape 201. In FIG. 2, the contour of each notch in octoshape 230 is associated (directly or indirectly) with the same information as is the geometric shape and orientation of the corresponding subshape in product shape 200. For example, the contour of notch 221 is associated (directly or indirectly) with the same information as is subshape 201.

FIG. 1-D and FIG. 2 illustrate a process whereby the allowed shapes of notches of an octoshape may be derived. However, this process may be omitted in practice. Instead, in some cases, the allowed shapes of notches are stored in memory. These allowed shapes of notches may be accessed from memory, when creating computer instructions for fabrication of a notched octoshape.

FIGS. 3A, 3B, 3C, 3D, 3E, 3F, 3G, and 3H each show outlines of eight sub-shapes that would result from dividing a mother shape into eight parts. In FIGS. 3A, 3B, 3C, 3D, 3E, 3F, 3G, and 3H, the mother shapes (from which the sub-shapes are created) are a sphere, a torus, cube, cone, ellipsoid, pyramid, cylinder and diamond, respectively.

Figure 4A:
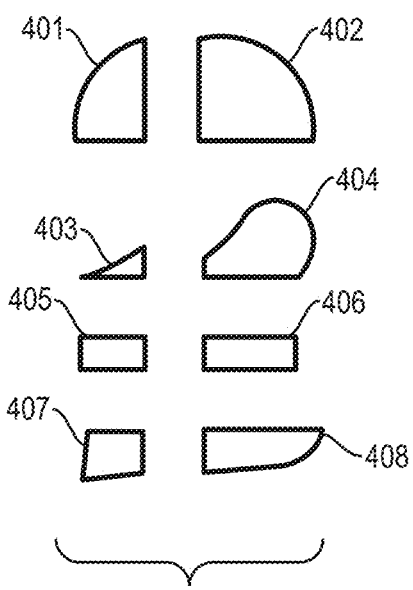
FIG. 4A shows outlines of eight 3D subshapes.

FIG. 4A shows outlines of eight 3D subshapes. These outlines are 2D perimeters of orthogonal projections, onto a geometric plane, of the subshapes. Specifically, in FIG. 4A: (a) two outlines 401, 402 are of subshapes of a sphere; (b) two outlines 403, 404 are of subshapes of a torus; (c) two outlines 405, 406 are of subshapes of a cube; and (d) two outlines 407, 408 are of subshapes of a cone.

Figure 4B:
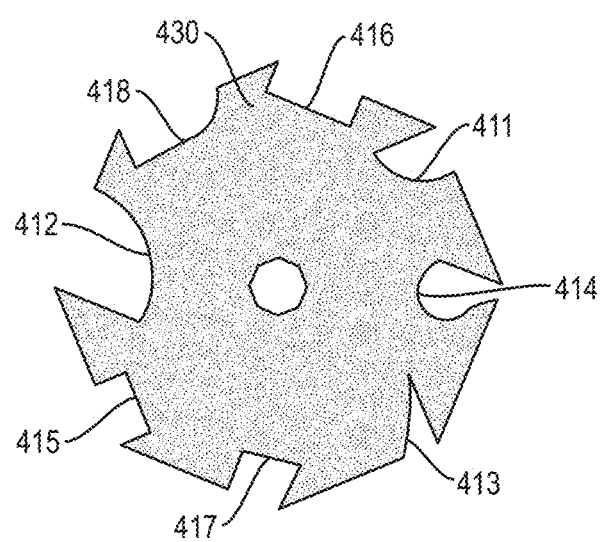
FIG. 4B shows an octoshape.

FIG. 4B shows an octoshape 430. In FIG. 4B, the 2D contours of eight notches 411, 412, 413, 414, 415, 416, 417, 418 in the perimeter of the octoshape match the outlines (shown in FIG. 4A) of the eight sub-shapes.

In some implementations, an octoshape encodes data. One or more cameras may capture image(s) of the octoshape. A computer may employ image recognition software to analyze the images and recover the encoded data.

In some implementations: (a) octoshapes may be physically produced by a variety of industrial techniques; (b) a diverse selection of materials may be by physically marked with an octoshape; and (c) octoshapes may be physically produced over a wide-range of length scales.

BaseOctagon

In illustrative implementations of this invention, an octoshape has a shape that would result from modifying a convex regular octagon. Specifically: (a) an octoshape may be created by cutting notches out of a convex regular octagon; but (b) the convex hull of the octoshape (even after the notches are cut) may be a convex regular octagon. As noted above, we sometimes call the octagonal convex hull of an octoshape the "base octagon" for the octoshape. The base octagon of an octoshape may have the same geometric shape as the original octagon, before the original octagon was modified by notches.

Let us briefly review convex regular octagons. The radius of a convex regular octagon is the distance between its center and any of its eight vertices or, equivalently, the radius of the circumscribed circle. We sometimes denote the radius of the octagon as $R_o$ and sometimes call it the base radius. We sometimes use this base radius as a standard distance reference. (This is synonymous with the unit radius when $R_o=1$.)

As is well known, a convex regular octagon with base radius $R_o$ has the following geometric properties:

| Property | Value | Approximation |
| --- | --- | --- |
| Radius of inscribed circle | $\cos(22.5°)R_o$ | $0.924\ R_o$ |
| Length of each side | $2\cos(67.5°)R_o$ | $0.765\ R_o$ |
| Arc angle of each octant | $45°$ | |

The vertices of a convex regular octagon may be described mathematically as a list of eight position vectors $\tilde{V}_j^{(b)}$ where adjacency denotes the existence of a connecting edge:

$$\{\tilde{V}_1^{(b)}, \tilde{V}_2^{(b)}, \ldots, \tilde{V}_7^{(b)}, \tilde{V}_8^{(b)}\}$$

In this notation, the superscript (b) indicates variables pertain to the base octagon. As each position vector is two-dimensional, that is, it is an x-y coordinate, the regular octagon is fully specified by an 8×2 array: the $j^{th}$ vertex is given by the $j^{th}$ row of this array or, equivalently, the two-dimensional position vector $$\tilde{V}_j^{(b)} = [X_j^{(b)}, Y_j^{(b)}] = \left[ \mathcal{R}e\exp\!\left(\frac{i\pi}{4}[3-j]\right),\ \mathcal{I}m\exp\!\left(\frac{i\pi}{4}[3-j]\right)\right],$$

$$j = 1, 2, \ldots, 8.$$

where "π" is Archimedes' constant.

For example, the first octagon vertex has x-y coordinates $$\tilde{V}_1^{(b)} = [X_1^{(b)}, Y_1^{(b)}] = (0, R_0).$$

In this notation, subsequent vertices are added clockwise as the index increments from j=1, 2, . . . , 8. Therefore, $\tilde{V}_8^{(b)}$ is the final unique vertex and, as a short calculation easily demonstrates, $\tilde{V}_9^{(b)} = \tilde{V}_1^{(b)}$.

In this document, we sometimes express rotations of vertices around the origin in complex numbers. This enables us to simplify both notation and calculations considerably.

Prototype A: Overview

We now describe a prototype of this invention, which we sometimes call "Prototype A". Specifically, each section herein that has a title which starts with "Prototype A:" describes Prototype A. Prototype A is a non-limiting example of this invention. This invention may be implemented in many different ways.

In Prototype A, an octoshape comprises a regular base octagon modified by notches, a keyhole and an orientation mark, each of which encodes data, as follows:

(1) Notches: In Prototype A, a notch is cut into each of the eight sides of the base octagon. The shape of each notch is drawn from a set of 192 allowed notch shapes. Discriminating between different notch shapes, each side of the octoshape therefore encodes one of 192 different values or, equivalently, at least seven bits of data. An octoshape contains eight notches.

(2) Keyhole: In Prototype A, an eight-sided hole (usually, an irregular and non-convex octagon) is cut into the center of the base octagon's interior. The keyhole contains the center of the base octagon. Each vertex of this keyhole corresponds to a notch in the outer perimeter of the octoshape and is allowed to be at one of eight allowed radial distances from the center. These radial distances encode color. (Alternatively, the shapes of different segments of the perimeter of keyhole may encode color). In either case, the keyhole encodes 8a values or, equivalently, 24 bits of data. In Prototype A, an octoshape contains one keyhole.

(3) Orientation mark: In Prototype A, a hole is cut in the base octagon's interior region. This hole may be an orientation mark that indicates ordinal position of notches in an octagon. In some versions of Prototype A, an octoshape contains one orientation mark. In other versions of Prototype A, the orientation mark is omitted.

Figure 5:
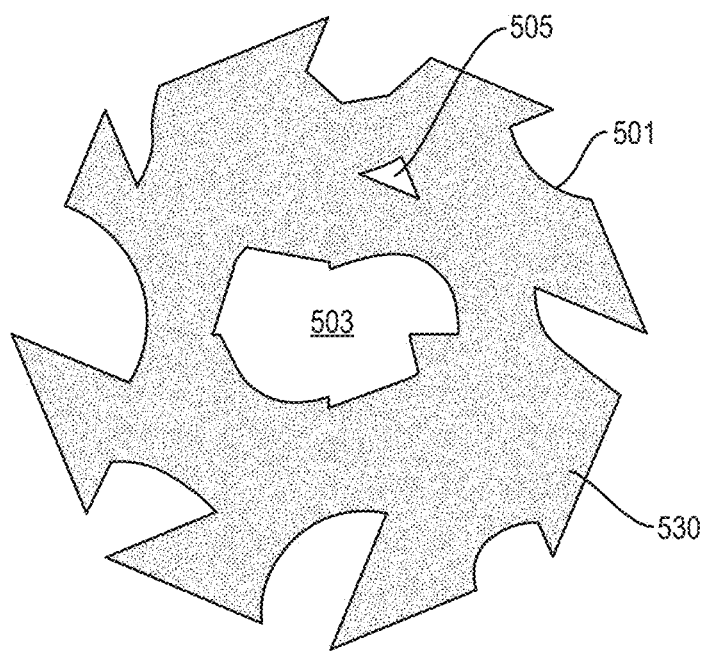
FIG. 5 shows two holes in anoctoshape.

FIG. 5 shows an example of two holes in an octoshape, in Prototype A. These two holes are: (1) a keyhole that encodes color; and (2) an orientation mark that encodes orientation of the octoshape. In FIG. 5, octoshape 530 has eight notches, including notch 501. A keyhole 503 in a central region of the octoshape may encode eight colors associated with: (a) eight subshapes (e.g., of a product shape or of a cubic cell); (b) eight outlines of the subshapes; (c) eight notches in the octoshape that correspond to the eight subshapes; and/or (d) eight 2D contours that correspond to the eight notches.

In FIG. 5, the shapes of different segments of the perimeter of keyhole 503 encode colors. Orientation mark 505 encodes a reference orientation of the octoshape. Equivalently, orientation mark 505 encodes an ordinal position of a notch. For instance: (a) orientation mark 505 may signify that the ordinal position of notch 501 is "first"; and (b) the ordinal number of the other notches may increase clockwise around the perimeter of the octoshape.

In Prototype A, the octoshape has an octagonal convex hull, which we sometimes call the "base octagon" for the octoshape. This base octagon may be recognized and exploited by a computer vision algorithm.

In Prototype A, the octoshape may be represented by an 8×4 array which we sometimes call a "product identification number" and which we sometimes denote mathematically by "PID". The base octagon may be represented by an 8×2 array. The other two columns of PID may consist of data that specifies the notches and keyhole of the octoshape.

In Prototype A, elements of the PID array are constrained to take certain values. For the first, second and fourth columns, elements are drawn from the set $\{0, 1, \ldots, 7\}$ only, that is, there exist eight allowed values for each element. For the third column, elements are drawn from the set $\{0, 1, 2\}$ only, that is, there exist three allowed values for each element. This means there are $8^8 \times 8^8 \times 3^8 \times 8^8 = 8^{24} \times 3^8$ allowed PID arrays which, therefore, represent slightly under 85 bits of data.

In Prototype A, each unique octoshape is associated with a unique PID. In other words, each unique octoshape encodes, or is encoded by, a unique PID. Three sample PIDs are as follows:

$$PID_{max} = \begin{bmatrix} 7 & 7 & 2 & 7 \\ 7 & 7 & 2 & 7 \\ 7 & 7 & 2 & 7 \\ 7 & 7 & 2 & 7 \\ 7 & 7 & 2 & 7 \\ 7 & 7 & 2 & 7 \\ 7 & 7 & 2 & 7 \\ 7 & 7 & 2 & 7 \end{bmatrix} PID_{rand} = \begin{bmatrix} 7 & 0 & 2 & 7 \\ 0 & 0 & 0 & 2 \\ 2 & 6 & 2 & 4 \\ 0 & 6 & 1 & 1 \\ 6 & 1 & 1 & 6 \\ 1 & 3 & 2 & 2 \\ 3 & 3 & 1 & 4 \\ 5 & 5 & 0 & 5 \end{bmatrix} PID_{min} = \begin{bmatrix} 0 & 0 & 0 & 0 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \end{bmatrix}$$

The subscript mar denotes the PID array with the maximum allowed values for each element. Conversely, the subscript min denotes the PID array with the minimum allowed values. Finally, the subscript rand denotes a random selection of allowed PID elements which produces a random octoshape.

FIG. 6 shows an example of a PID array 600 that may be employed in Prototype A. The fourth column 604 of PID array 600 encodes the keyhole. Each row of the fourth column 604 specifies one of the eight radial distance values that specify the keyhole (and thereby encode color, as discussed below).

In FIG. 6, subarray 601 consists of the first, second and third columns of PID array 600. The entries in subarray 601 together determine the contours of eight notches that are ranged around the perimeter of the octoshape. Each row in subarray 601 represents a single notch. There are eight rows in subarray 601, representing eight notches. The three elements in each row (e.g., row 607) of subarray 601 specify one of the 192 contours that a notch is allowed to have in Prototype A.

In FIG. 6, the rows of the array correspond in order to the notches ranged clockwise around the underlying base octagon. The notch represented by the first row of PID array 600 is immediately adjacent to the orientation mark.

In Prototype A, an octoshape comprises a base octagon modified in such a way that: (a) each of the eight sides contains a notch; (b) an octagonal keyhole is located in a central region of the octoshape and (c) another hole in the octoshape is an orientation mark that signifies ordinal position of the notches (e.g., the orientation mark may be located nearer to the notch that is in first ordinal position than to any other notch of the octoshape).

In Prototype A, the notches of the octoshape do not intersect. (This avoids disjoint octoshape regions, which would be an undesirable outcome for both fabrication and image recognition purposes). To ensure that the notches do not intersect, the base octagon may be divided into distinct regions (including distinct subregions in which particular notches are located). This may guarantee the desired non-intersection of notches.

FIG. 7 shows an example of division of an octoshape into different regions in Prototype A. In the example shown in FIG. 7, octoshape 730 has three regions 701, 702, 703. The keyhole, the orientation mark, and the eight notches (not shown in FIG. 7) are located in regions 701, 702, 703, respectively.

In FIG. 7, the keyhole is located in region 701. Region 701 is octagonal. Specifically, region 701 is a simple reduction of the base octagon about its center point. Each vertex of region 701 (i.e., the reduced octagon) is aligned with the base octagon's vertices along its long diagonals. (Alternatively, region 701 may be defined as the area enclosed by the mid-diagonals of the base octagon.) Note: Octagons contain three types of diagonal lines connecting pairs of vertices. Five diagonals emanate from each vertex: one long-diagonal connecting to the opposite vertex; two mid-diagonals connecting to the two vertices adjacent to the opposite vertex; and, two short-diagonals connecting to the vertices adjacent to the mid-diagonal vertices.

In FIG. 7, the radius of octagonal region 701 is $0.4R_0$ where $R_0$ is the base radius of the base octagon.

In FIG. 7, the orientation mark is located in region 702. Region 702 consists of eight triangular subregions 721, 722, 723, 724, 725, 726, 727, 728. These triangular subregions are the eight allowed locations for the orientation mark. Any one of these triangular subregions may be selected as the first octant and the remaining seven octants may be numbered consecutively in a clockwise direction. The eight triangular subregions are each enclosed by the mid-diagonals emanating from a trio of consecutive vertices taken from the base octagon.

In FIG. 7, the notches are located in region 703. This region 703 is split into eight identical octants. Each of these octants contains one of the eight notches.

In some versions of Prototype A, the orientation mark is a fiducial marker. The orientation mark is a shape that is easily recognizable by image recognition software. The orientation mark indicates the position of the "first" octant of the octoshape; the other seven octants are enumerated clockwise from this starting point. The orientation mark of an octoshape may enable a computer vision algorithm to analyze an image of an octoshape to determine ordinal position of notches of the octoshape, regardless of the angle from which the image is captured.

In some other versions of Prototype A, the orientation mark is omitted. For instance, the orientation mark may be omitted in some implementations, in which the shapes of different segments of the perimeter of the keyhole occur in a pattern that indicates ordinal positions of notches. Or, for instance, the orientation mark may be omitted in implementations where orientation is known a priori, such as an implementation in which the eight notches are always identical.

In Prototype A, the orientation mark may be a variety of shapes and sizes, and may occupy a variety of positions (e.g., any location within region 702 in FIG. 7). For instance, in Prototype A, the orientation mark may be triangular and right isosceles in shape with radius $0.06R_0$. In Prototype A, the orientation mark's center may lie $0.47R_0$ along the arc connecting the base octagon's center and the mid-point of the first octant's side.

In Prototype A, each notch has one of a set of 192 allowed geometric shapes. The geometric shape of any one or more of the notches may be the same as or different from the geometric shape of any one or more of the other notches.

In Prototype A, each of the 192 allowed geometric shapes of a notch is convex and is simply connected (i.e., contains no holes).

In Prototype A, the contour of each notch includes at least one right angle between two straight edges. The right angle may enable a notch of an octoshape to have a shape that matches an outline of a subshape in a shape matrix. This is because, in Prototype A, the 2D outline of each 3D subshape includes at least one right angle.

In Prototype A, one of the two straight edges (which form a right angle in the contour of a notch) may be the facet portion of the notch. (Facet portions are discussed above). In Prototype A, a computer may computationally orient the contour of the notch in a Cartesian coordinate system, in such a way that: (a) the vertex of the right angle is at the origin of the coordinate system; (b) the first of the two straight edges (that form the right angle) is coincident with a portion of the x-axis of the coordinate system; (c) the second of the two straight edges (that form the right angle) is coincident with a portion of the y-axis of the coordinate system; and (d) the notch lies in the first quadrant of the x-y plane.

In Prototype A, each of the notches is scaled in such a way that it is contained entirely within a unit square which has sides of length 1.

In Prototype A, image recognition software is able to distinguish between every pair of elements drawn from the set of allowed geometric shapes of notches. To achieve this, in Prototype A, all elements (of the set of allowed geometric shapes of notches) are unique subject to scaling. The scaling may be uniform in all directions.

In Prototype A, the contour of each notch includes two straight orthogonal edges that form a right angle. placed along the positive x and y axes of a coordinate system. Each notch may be scaled. For instance, each notch may be scaled to fit within a unit square which has sides of length 1.

In Prototype A, notches may be scaled and oriented, when creating (e.g., computationally calculating) an octoshape. Notches may be expressed as a single vector of complex numbers; again, the x-y coordinates of vertices are calculated as the real and imaginary parts of the corresponding complex number. Consecutive vertices in the vertex list are connected by edges. This significantly simplifies the expressions for translating and rotating each notch which helps to ensure they are located correctly on the octoshape.

In Prototype A, after the transformation for placing the first notch has been determined, the remaining seven notches of the octoshape are positioned using the same transformation followed by an additional rotation about the origin. This additional rotation, for a specific notch, is by an angle equal to the product of (a) 45 degrees and (b) the value of the ordinal position of the specific notch minus 1. For instance, for the notch in the third ordinal position, the angle of the additional rotation is equal to 90 degrees, which is the product of (a) 45 degrees and (b) two (because the value of the ordinal position is 3, and 3−1=2).

In Prototype A, for a notch represented by a complex vector $\tilde{C}$, the transformation placing the notch into the first position on the octoshape produces a new notch $\tilde{C}_1$ expressed as:

$$\tilde{C}_1 = [\lambda \tilde{C} - (\cos(22.5°) + i\cos(67.5°))R_o]\exp\left(-\frac{5\pi}{8}i\right)$$

In the preceding equation, $\lambda$ is a scaling factor that ensures notches fit within the appropriate region of the octoshape (e.g., region 703 in FIG. 7). For instance, the scaling factor may set such that $\lambda$=0.5. This prevents notches from exceeding the boundaries, provided that each x-y coordinate on the notch satisfies the additional inequality:

$$x+y < 2 \cos(67.5°)R_0$$

In Prototype A, positions for the remaining seven notches are obtained by performing a complex rotation from the first notch by an appropriate angle. To place notch vector $\tilde{C}_j$ at the $j^{th}$ position we rotate $\tilde{C}_1$ by applying the transformation:

$$\tilde{C}_j = \tilde{C}_1 \exp\left(-\frac{\pi}{4}i(j-1)\right).$$

In Prototype A, the contours of the notches of the octoshape are created from a set of eight 3D subshapes by following a set of transformations and manipulations. For this, a computer may employ a PID to determine the steps of the creation process. Each of the 192 notches created in this process may be a two-dimensional representation of the corresponding 3D subshape, in particular, the perimeter of the subshape's flat projection.

In Prototype A, a 3×1 sub-array encodes a single notch. In this sub-array, the first element is assigned to a three-dimensional shape called a mother shape. There are eight distinct mother shapes and each is assigned a number from 0 to 7 which are the allowed values for a mother shape.

In Prototype A, for each mother shape, three slicing operations are performed on the shape mesh across the x-normal, y-normal and z-normal planes, all centered at the origin. This produces eight subshapes for each mother shape, giving a total of 64 allowed subshapes. Each subshape is numbered first by its mother shape and second by the octant it occupies following the slicing process; this provides the first two elements of the 3×1 sub-array.

In Prototype A, a given subshape is placed into the first octant (so it lies in the positive x, y and z regions) by applying repeated rotations—first along the y-axis and then along the z-axis.

In Prototype A, once a given subshape is placed into the first octant, the given subshape may be further reoriented by rotations along the octant diagonal. These rotations (along the octant diagonal) position the shape in one of three distinct ways while simultaneously maintaining the same overall geometry and ensuring the three flat sides produced by the slicing process are co-planar with the three slicing planes.

FIGS. 8A, 8B and 8C illustrates three different orientations of a subshape, in Prototype A. Specifically, FIGS. 8A-8C show allowed orientations of a toroidal subshape 801. These allowed diagonal states for a toroidal subshape are diagonal state 0 (FIG. 8A); diagonal state 1 (FIG. 8B); and diagonal state 2 (FIG. 8C). In FIGS. 8A-8C, each position achieved by rotation, the diagonal state, may be achieved by rotating the subshape around the octant diagonal by 120° times the diagonal state number.

In Prototype A, for each mother shape there exist eight subshapes giving a total of 64 allowed subshape geometries. Each subshape may be placed in one of three orientations and be assigned one of eight colors. In a shape-matrix, groups of subshapes may be arranged into groups of eight to produce a particular product shape where repetition of a subshape within an arrangement is allowed. The eight subshapes in a product shape are placed in the eight octants following their selection number. Thus, eight subshapes in a product shape may be encoded by eight notches of an octoshape (where each notch is in a different octant of the base octagon for the octoshape).

In Prototype A, each unique product shape may be described by a unique PID wherein each row of the PID represents a single subshape with the following encoding: (a) r row element: mother shape from which subshape was selected; (b) $2^{nd}$ row element: indicates which of eight subshapes is selected from the given mother shape; (c) $3^{rd}$ row element: the diagonal state, the orientation into which the subshape is placed; and (d) $4^{th}$ row element: color (which has no effect on notches and is encoded by the keyhole).

In Prototype A, in some use scenarios, a PID encodes a 3D product shape. For instance, the following PID $$PID = \begin{bmatrix} 7 & 0 & 2 & 7 \\ 0 & 0 & 0 & 2 \\ 2 & 6 & 2 & 4 \\ 0 & 6 & 1 & 1 \\ 6 & 1 & 1 & 6 \\ 1 & 3 & 2 & 2 \\ 3 & 3 & 1 & 4 \\ 5 & 5 & 0 & 5 \end{bmatrix}$$

encodes the 3D product shape 200 shown on the left side of FIG. 2.

In Prototype A, three-dimensional subshapes are computationally converted into 2D contours of notches of an octoshape. To do this, a computer may use a mesh version of the subshapes rather than performing analytic calculations for the notches.

In Prototype A, the subshape mesh data includes both vertex data stored in a points array and edge (or face) data stored in a face array. To calculate contour in a computationally efficient manner, face data is discarded and only points data are used. This enables contour edges to be calculated using a boundary hull method, which is a special case of the convex hull method. This relies on specifying a shrink factor, denoted by α, which determines how compact the convex hull of the octoshape will be.

In Prototype A, depending on the projection dimension, all points in the mesh are flattened onto the plane of projection. A projection along the x-normal plane is thus equivalent to setting the x-coordinates of all points to zero. In Prototype A, all mother shapes are convex (with the exception of the torus). For convex mother shapes, a simple convex hull method (α=0 in the boundary hull method) may be employed.

In Prototype A, for the torus (which has a non-convex projection) the boundary hull method is used with a lower α. The α parameter is determined through trial and error until the inner region of the torus may be correctly determined. The outer edge of the torus is less smooth as the distance between points is greater and connections between more distant points tend to be missed. This may be resolved by picking slightly higher resolutions for the torus than for other mother shapes.

In Prototype A, in some cases, the contours of eight notches of a 2D octoshape may match outlines of eight 3D subshapes in a cubic cell of a shapematrix. Notches may be assigned the same color as the mother shape from which they originate. As a result, in Prototype A, an octoshape may be a unique 2D representation of a 3D cubic cell of a shape-matrix. Each notch may be rotated/mirrored into the first quadrant (top right) before placement into the octoshape.

Prototype A: Keyhole Version 1 (Irregular Polygon)

In a first version of the keyhole in Prototype A, the keyhole is an irregular polygon with eight vertices that encode colors. Specifically, the distance between each of the eight vertices of the polygonal keyhole and a reference point (e.g., the center of the base octagon) may encode color. Because the irregular polygon has eight vertices, it may encode eight colors.

In Prototype A, the colors encoded by a keyhole may be specified in any color model, such as RGB (red, green, blue), CMY (cyan, magenta, yellow), CMYK (cyan, magenta, yellow, black), (HSI (hue, saturation, intensity), or pseudo-color (in which different grayscale values map to different colors). The preceding sentence applies to Keyhole Version 1 (described in this section) and Keyhole Version 2 (described in the next section).

Figure 9:
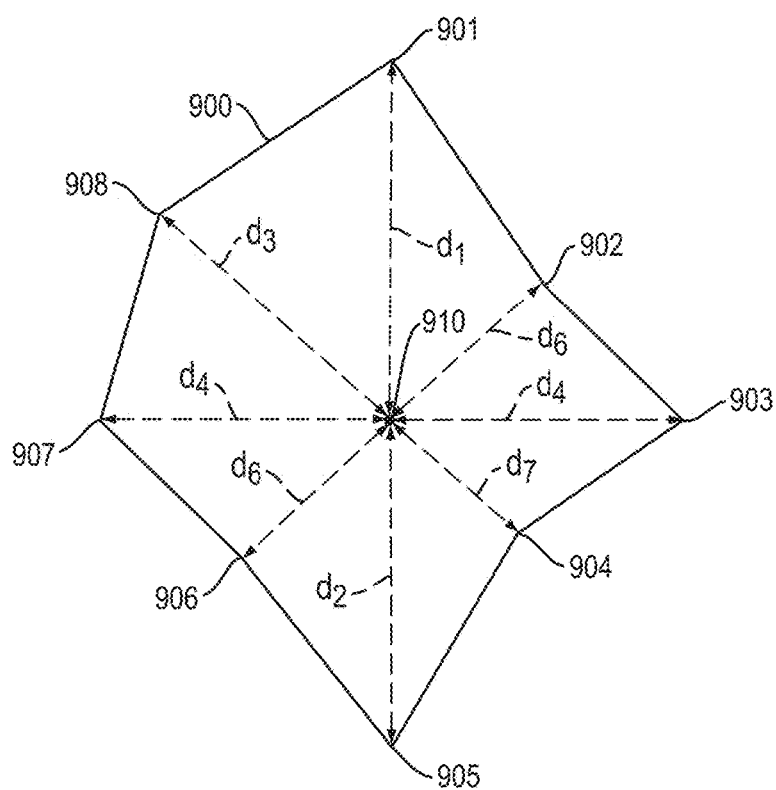
FIG. 9 shows a keyhole that is an irregular polygon.

FIG. 9 illustrates how distance may encode color, where the keyhole is an irregular polygon. In FIG. 9, keyhole 900 is located in an octoshape. Keyhole 900 is an irregular polygon that has eight vertices 901, 902, 903, 904, 905, 906, 907, and 908. Each of these eight vertices of the polygonal keyhole is allowed to be at any of eight distances from reference point 910. In FIG. 9, the first, second, third, fourth, fifth, sixth, seventh and eighth allowed distances encode (or are associated with) the colors white, purple, blue, green, yellow, orange, red, and black, respectively. Reference point 910 is at the center of the base octagon for the octoshape (and is also the origin in a 2D Euclidean coordinate system).

In FIG. 9, vertices 901, 902, 903, 904, 905, 906, 907, 901, 908 are located at distances d1, d6, d4, d7, d2, d6, d4, and d3, respectively, from reference point 910 and encode the colors white, orange, green, red, purple, orange, green and blue, respectively. The color associated with a particular vertex of the polygonal keyhole is also associated with: (a) a particular notch (in the octoshape) that is nearest to the particular vertex; and (b) any subshape that the particular notch represents.

In the first version of a keyhole in Prototype A, the keyhole is an irregular polygon that encodes color. This polygonal keyhole may be mathematically described, as set forth in the next four paragraphs:

The polygonal keyhole may be represented by the fourth column 604 of the PID array, that is, by an 8×1 sub-array of integers ranging from 0 to 7, as shown in FIG. 6. The elements of this sub-array are denoted as follows:

$$E_j^{(k)} = [PID]_{j4}, j=1,2,\ldots,8 \text{ such that } \forall j:E_j^{(k)} \in \{0,1,\ldots 7\}$$

where "4" indicates elements are in the fourth column of the PID array and the superscript (k) indicates variables relate to the keyhole.

For the polygonal keyhole, the keyhole vertex coordinates may be expressed as $\{\tilde{V}_1^{(k)}, \tilde{V}_2^{(k)}, \ldots, \tilde{V}_7^{(k)} \tilde{V}_8^{(k)}\}$, where each vertex coordinate is a complex number. The keyhole vertices preserve the complex arguments of the underlying base octagon's vertices, that is, they are aligned along the base octagon's four long-diagonals. However, the distance between the keyhole's vertices and the base octagon's center point varies. (Recall that the base octagon's vertices always lie at distance $R_0$ from the origin.) Indeed, this variation in distance from the origin that encodes the 8×1 sub-array. Specifically: (1) each of the eight keyhole vertices encodes a single element of the 8×1 PID sub-array; (2) vertex $\tilde{V}_j^{(k)}$ encodes for the $j^{th}$ row element $E_j^{(k)}$; (3) $E_j^{(k)}$ elements are drawn from the integer set $\{0, 1, \ldots, 7\}$; these values are encoded in the distance between the keyhole vertex and the base octagon's origin; and (4) adjacency in the vertex list indicates vertices are connected by an edge; further, $\tilde{V}_9^{(k)}= \tilde{V}_1^{(k)}$ and so the vertices may generate a closed irregular non-convex octagon.

In the polygonal keyhole, the distance between each vertex of the keyhole and a reference point (e.g., the origin at the center of the base octagon) may be specified as follows: (1) specify a maximum radius $R_{max}^{(k)}$ and a minimum radius $R_{min}^{(k)}$; (2) set $R_{max}^{(k)}=0.38R_0$ and $R_{min}^{(k)}= 0.1R_0$; and (3) impose the following constraints (a) $R_{max}^{(k)}<0.4R_0$, (b) $R_{min}^{(k)}>0$, and (c) $R_{max}^{(k)}\neq R_{min}^{(k)}$. In the preceding sentence, constraint (a) ensures the keyhole remains in the keyhole region of the octoshape (e.g., region 701 in FIG. 7) and constraints (b) and (c) guarantee the keyhole octagon is non-degenerate.

In the polygonal keyhole, the maximum and minimum radii determine the range of allowed radii for keyhole vertices. When encoding the variables $E_j^{(k)} \in (0, 1, \ldots, 7)$, each of these eight values is associated with a specific radius within the acceptable range. For the $j^{th}$ vertex, the position vector $\tilde{V}_j^{(k)}$ and the encoding element $E_j^{(k)}$ are related as follows:

$$\tilde{V}_j^{(k)} = \left[ D_j^{(k)} \cdot \mathcal{R}e \exp\left(\frac{i\pi}{4}[3-j]\right),\ D_j^{(k)} \cdot \mathcal{I}m \exp\left(\frac{i\pi}{4}[3-j]\right) \right], j = 1, 2, \ldots, 8,$$

where the radial dilation function $D_j^{(k)}$ is given as $$D_j^{(k)} = R_{min}^{(k)} + \frac{R_{max}^{(k)} - R_{min}^{(k)}}{7} E_j^{(k)}.$$

Note that: (a) when $$E_i^{(k)} = 0 \text{ then } D_i^{(k)} = R_{min}^{(k)} + \frac{R_{max}^{(k)} - R_{min}^{(k)}}{7}(0) = R_{min}^{(k)},$$

and (b) when $E_j^{(k)} = 7$ then $D_i^{(k)} = R_{min}^{(k)} + \frac{R_{max}^{(k)} - R_{min}^{(k)}}{7}(7) = R_{max}^{(k)}$.

This confirms that all keyhole vertices have acceptable radii: $R_{min}^{(k)} \leq D_j^{(k)} \leq R_{max}^{(k)}$, $\forall E_j^{(k)}$. Once the vertex coordinates have been determined, adjacent vertices are connected. This completes construction of the keyhole octagon.

Prototype A: Keyhole Version 2 (Coded Shape)

In a second version of a keyhole in Prototype A, the contours of different segments of the perimeter of the keyhole encode colors. Specifically: (a) the perimeter of the keyhole may consist of multiple segments; (b) the contour of each segment of the keyhole's perimeter may be constrained to be one of a set of allowed contours; and (c) each of the allowed contours may encode one or more colors.

For instance, in this second version of a keyhole in Prototype A: (a) the perimeter of the keyhole may consist of four quadrants; (b) the contour of each quadrant of the keyhole's perimeter may be one of a set of allowed contours; and (c) each allowed contour may encode two colors.

Figure 10:
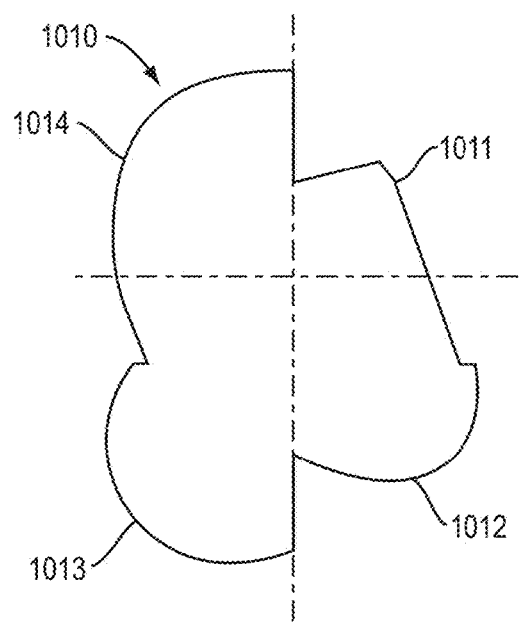
FIG. 10 shows a keyhole, where the contours of different segments of the perimeter of the keyhole encode colors.

FIG. 10 shows a keyhole in an octoshape, where the contours of different segments of the perimeter of the keyhole encode colors. In the example shown in FIG. 10, the perimeter of keyhole 1010 consists of four segments 1011, 1102, 1013 and 1014, in four quadrants of the keyhole. The contour of these four segments encode colors. Specifically: (a) in the pair of notches that is nearest segment 1011, one notch is associated with white and the other notch is associated with orange; (b) in the pair of notches that is nearest segment 1012, one notch is associated with green and the other notch is associated with blue; (c) in the pair of notches that is nearest segment 1013, one notch is associated with purple and the other notch is associated with orange; and (d) in the pair of notches that is nearest segment 1014, one notch is associated with green and the other notch is associated with red.

In this second version of a keyhole in Prototype A (where the contours of segments of the perimeter of the keyhole encode colors), the keyhole may be constructed as follows: Define an orthogonal grid with origin at the base octagon's center. On each grid quadrant, a single contour is used to encode two values of the keyhole vector. Each quadrant corresponds to two consecutive rows, with quadrant 1 corresponding to rows 1 and 2, quadrant 2 corresponding to rows 3 and 4, and so on. The contours are picked in the following manner: For quadrant j, the corresponding contour encodes elements $E_{2j-1}^{(k)}$, and $E_{2j}^{(k)}$ of the 8×1 PID sub-array. The contour picked is the same contour as the one encoding a 3×1 PID sub-array where the mother shape number is given by $E_{2j-1}^{(k)}$ and the subshape number is given by $E_{2j}^{(k)}$. $E_j^{(k)}$ elements are again drawn from the integer set $\{0, 1, \ldots, 7\}$; these values are encoded by the chosen contour.

A benefit of using this second keyhole type is that a neural network trained on 192 allowed contours of notches may be able to classify the keyhole contours with little or no additional training (at least where the only contours allowed for the segments of the perimeter of the keyhole are the same as, or are subregions of, the 192 contours allowed for notches).

Prototype A: Similarity Matrix for Computer Vision

In Prototype A, an octoshape may encode a product identification number. One or more cameras may capture one or more images of this octoshape. A computer may perform a computer vision program to recover a product identification number. To facilitate this computer vision, it is desirable that the set of 192 allowed contours of notches have shapes that are very dissimilar to each other (at least from the perspective of the computer vision algorithm), so as not to produce erroneous or conflicting results. This is because adverse effects (such as image perspective warping, shadows, and pixilation) may otherwise make it difficult to identify particular notches.

Alternatively, in other versions of Prototype A: (a) a sensor module other than a camera takes measurements; and (b) a computer analyzes the measurements to recover a product identification number. For instance, the sensor module may comprise one or more spectrometers, interferometers, x-ray sensors, capacitive sensors, resistive sensors, magnetic sensors, proximity sensors, contact sensors, radar (e.g., millimeter wave radar), infrared sensors, thermal sensors, or thermometers.

In Prototype A, a similarity matrix $\tilde{\tilde{M}}$ quantifies how similar the 192 allowed contours of notches are to each other. The matrix is of size 192 by 192, triangular and with zero diagonal. Each element (i,j) is a distance value between 0 and 1 (0 being exactly equal and 1 being the maximum possible difference) for the similarity between the i'th and j'th notches. The "distance" may be calculated in different ways and signify at least slightly different things. For instance, "distance" may be calculated as a discrete approximation of an integral of radial distance differences from the origin across the whole contour minus all axial points (i.e., minus all contour points located on the X or Y axis, which form the perpendicular straight edges). The origin is defined as the corner point. Each point in the contour expressed as a complex vector $\tilde{C}$ may be converted into polar coordinates ($\tilde{R}$, $\tilde{\theta}$), where $\tilde{R}$ is the distance from the origin and $\tilde{\theta}$ the angle from the X-axis, between 0 and $\pi/2$. The conversion from Cartesian (in the form of complex X and Y coordinates) to polar may be done in the following manner:

$$\tilde{R} = \sqrt{Re(\tilde{C})^2 + Im(\tilde{C})^2}$$

$$\tilde{\theta} = \arctan\left(\frac{Im(\tilde{C})}{Re(\tilde{C})}\right)$$

In Prototype A, all operations on similarity matrix $\tilde{M}$ may be performed array element by element. Disregarding the discrete nature of these vectorized contours of notches (as resolution may be increased as needed, and contours easily interpolated), each contour of a notch may be expressed as a function of the polar angle $\tilde{R}=R(\tilde{\theta})$, where R is the function that determines the distance of a point from the origin at a given angle. In order to return a unique radial value for each different angle, some notches may be disregarded in the calculations. Specifically, a notch may be disregarded if two possible points exist at the intersection between the notch and lines passing through the origin. For this purpose, notch edges that follow the X and Y axes are removed and are not included in the calculations. This helps ensure uniqueness of radial values. In any case, the contour edges that follow the X and Y axes do not significantly affect distances as they are shared between all notches.

Figure 11:
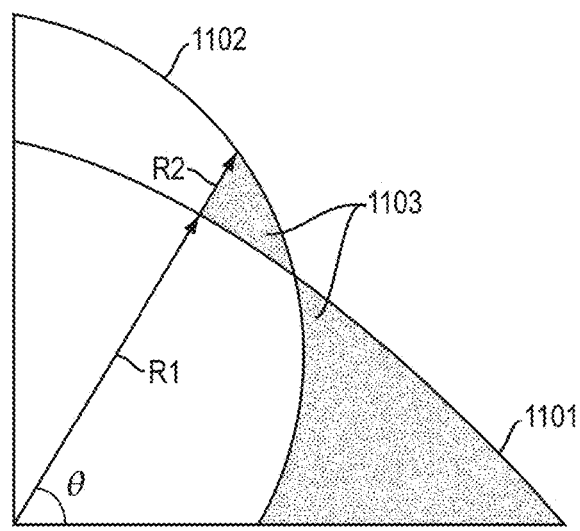
FIG. 11 is a graph of distance between the contours of two notches, where the distance is a metric of similarity between the two contours.

FIG. 11 is a graph of "distance" (as described above) between the contours of two notches in Prototype A, where the distance is a metric of similarity between the two contours. In FIG. 11, radius R1 is the radius $\tilde{R}=R(\tilde{\theta})$ of the contour (expressed in polar coordinates) 1101 of a first notch of an octoshape and radius R2 is the radius $\tilde{R}=R(\tilde{\theta})$ of the contour (expressed in polar coordinates) 1102 of a second notch of the octoshape. The area of stippled region 1103 visually represents the "distance" between the two contours (which "distance" is a discrete approximation of an integral as described above). For two identical notches, the stippled region 1103 would have zero area. The greater the dissimilarity between two contours, the greater the area of stippled region 1103.

In Prototype A, for two notches defined by radius functions $R_i(\theta)$ and $R_j(\theta)$, similarity matrix element at indices (i,j) is defined as:

$$M_{ij}=\int_0^{\pi/2}[R_i(\theta)-R_j(\theta)]^2 d\theta.$$

In Prototype A, a similarity matrix may be employed to optimize the allowed set of 2D outlines of subshapes (or to optimize the location of the intersection points that are used when dividing the mother shapes into subshapes). The optimization may maximize the dissimilarity between 192 contours, which 192 contours are the contours of the 64 allowed geometric shapes of subshapes in each of three allowed rotational positions.

In some versions of Prototype A, the 2D outline of a 3D subshape always includes: (a) two perpendicular edges (along the positive X and Y axes); and (b) the origin. In these versions of Prototype A, the following steps may be employed to create a similarity matrix. For each 2D outline of a subshape, the perpendicular edges and the origin may be removed. The remainder of the outline may be expressed in polar form, as a radius from the origin (corner) for values of the angle going from 0 to 90 degrees. For instance, the radius may be sampled at chosen angular values (e.g., at uniform angular intervals between 0 and 90 degrees). The "distance" between two contours (of two notches) may be defined as the square sum of the differences in radius at the chosen angular values. This may be a discrete approximation of the integral of the difference squared of the radii of the two contours between 0 and 90 degrees. A computer may perform an optimization to maximize the sum of the distances among allowed contours (e.g., among allowed 2D outlines of 3D subshapes). For instance, to achieve this optimization, a computer may select an optimal combination of mother shapes and slice positions (for slicing the mother shapes into subshapes).

Prototype A: Error Checking and Correction

As noted above, an octoshape may encode data. One or more cameras may capture one or more images of the octoshape. A computer may perform a computer vision program to recover the data. We sometimes call this process (described in the preceding two sentences) "optical decoding".

In Prototype A: one or more error checking and correction methods may be employed, in order to mitigate the effect of inaccuracies in the optical decoding of an octoshape. The error checking may determine when an octoshape has been incorrectly optically decoded (e.g., the data returned is not as expected).

Error Checking with Notches: Here is a non-limiting example of how error checking may be performed for notches, in Prototype A. Each notch has a contour that is one of 192 allowed contours of notches. These 192 allowed contours are associated with 192 "contour numbers". The contour numbers are from 0 to 191, one number per allowed contour. During optical decoding, a computer calculates the contour number of each of the eight notches. In Prototype A, the notch in position 7 is reserved for error checking, and "correct" octoshapes must follow a specific data pattern. Namely, while the notches in positions 0 to 6 may take any value, but the number of the final notch in position 7 Cn(7) must be equal to the sum of all the other notch numbers modulo 192:

$$Cn(7)=\Sigma_{i=0}^{6}Cn(i)(\mathrm{mod}\ 192)$$

Error Checking With Keyholes: Here is a non-limiting example of how error checking may be performed with keyholes, in Prototype A. Two error checking mechanisms for keyholes may be employed in Prototype A (either alone or together). First, since 64 out of the 192 allowed contours are permitted for a given color pair (or for a given group of two color pairs), the choice of contour may be employed as an additional check. The first color pair is allowed contour values between 0 and 63, the second color pair is allowed contour values between 64 and 127, and the 3rd and 4th color pairs are allowed contour values between 128 and 191. If a contour value for a specific color pair is calculated that is outside of the range of allowed contour values for the specific color pair, then the contour value for the specific color pair may be flagged as incorrect, and the decoding of the keyhole may be repeated until a correct value is returned in this first error check for keyholes. (Recall that in a version of Prototype A, the shape of each of four segments of the perimeter of a keyhole may encode a pair of colors). Second, a modulo check may be employed on the colors, to determine whether the final color C(7) is equal to the sum of all other colors modulo 8: that is, $Cn(7)=\Sigma_{i=0}^{6} C(i)$ (mod 8). If it is not equal, then the color may be flagged as incorrect, and the keyhole may be decoded again until a correct color is returned for this second error check for keyholes.

As noted above, in some versions of Prototype A: (a) a sensor module other than a camera takes measurements of an octoshape; and (b) a computer analyzes the measurements to recover data that is encoded by the octoshape. For instance, the sensor module may comprise one or more spectrometers, interferometers, x-ray sensors, capacitive sensors, resistive sensors, magnetic sensors, proximity sensors, contact sensors, radar (e.g., millimeter wave radar), infrared sensors, thermal sensors, or thermometers. We sometimes call the process described in the first sentence of the paragraph "shape decoding". Error checking with notches and/or keyholes may be performed for shape decoding, in the same manner as described above for optical decoding.

Prototype A: Meshes and Transformations of Meshes

Figure 12G:
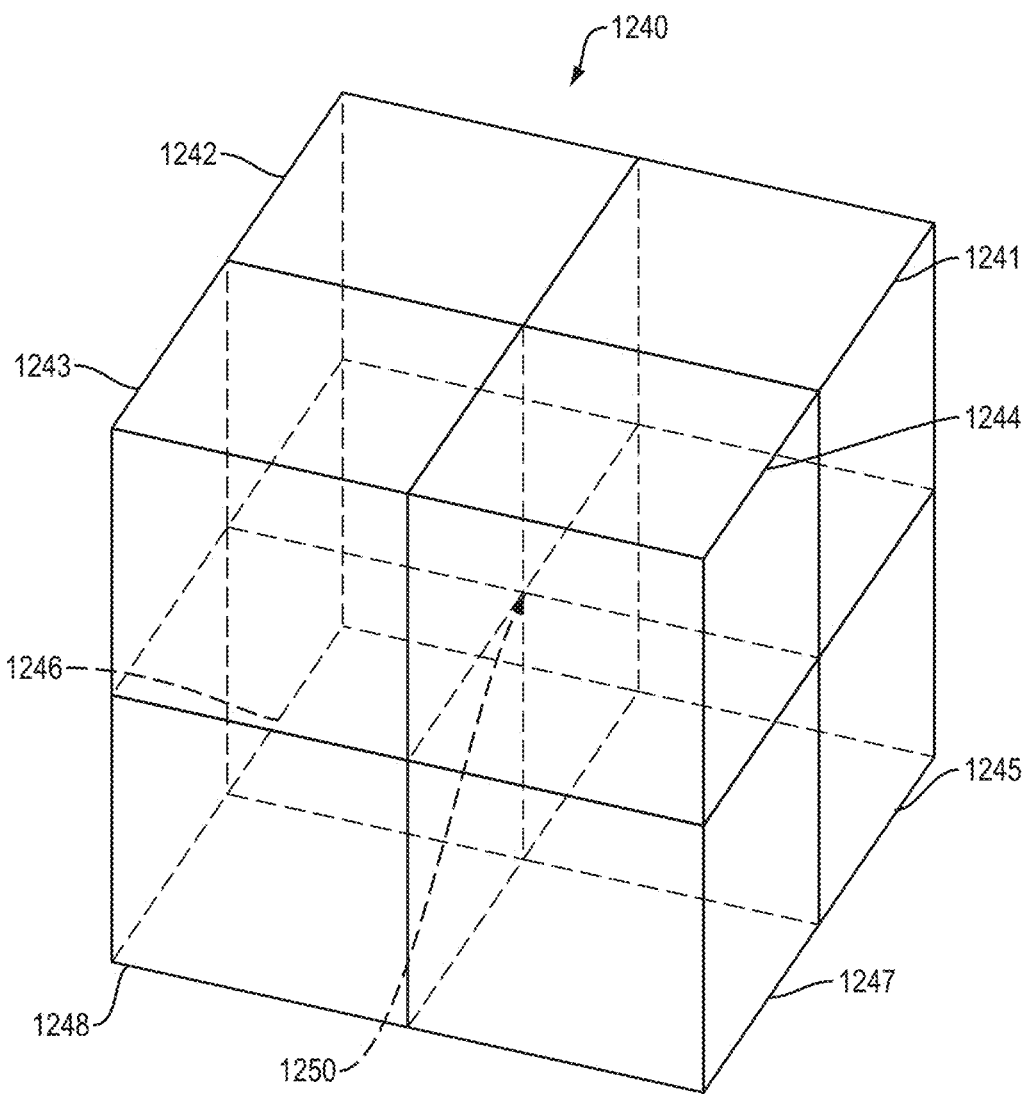
FIG. 12G and FIG. 13 each show a shape matrix that consists of eight cubic cells.
Figure 13:
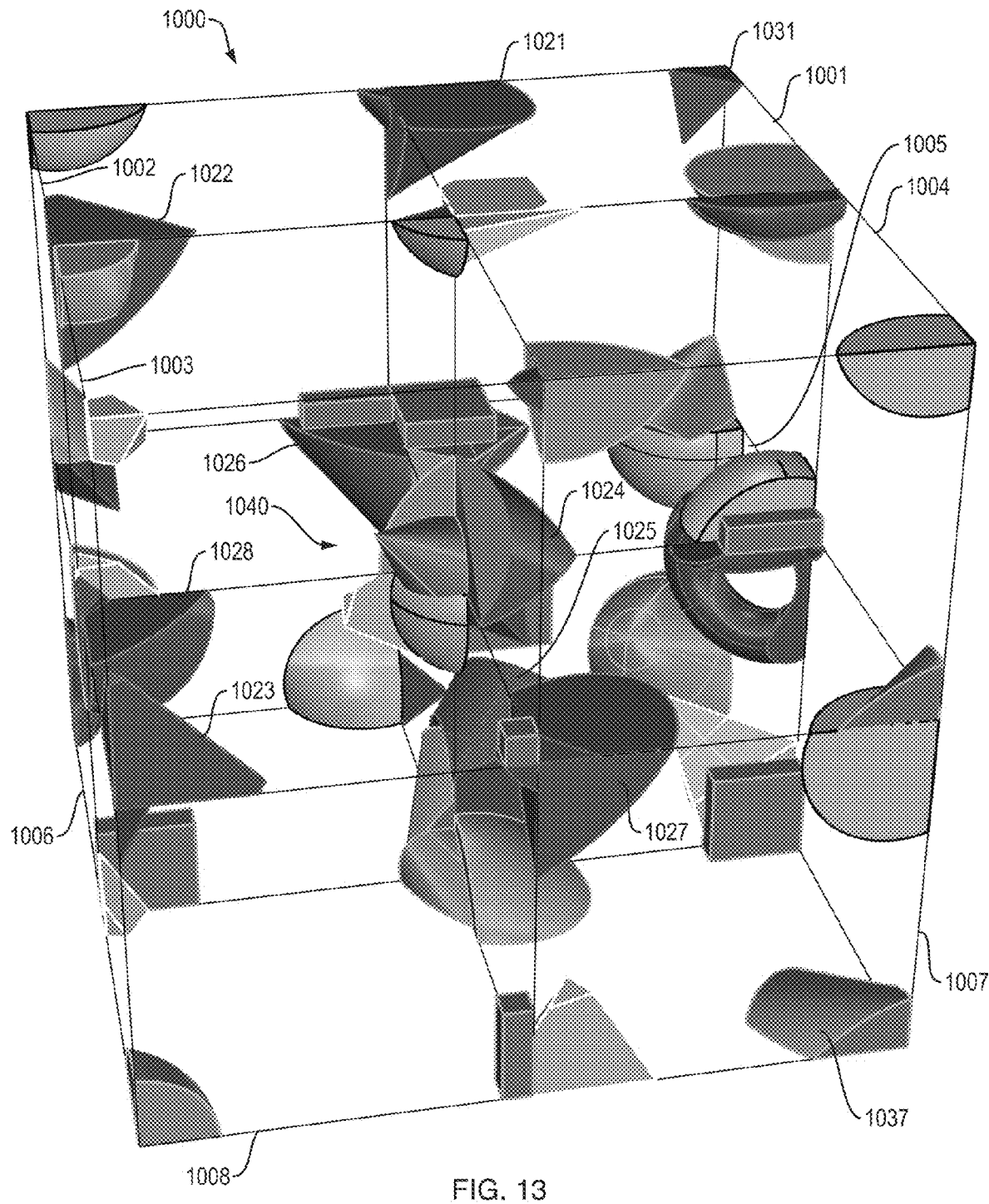

As noted above, in Prototype A, a 2D octoshape may encode information that specifies eight 3D subshapes. For instance, the eight 3D subshapes (which are encoded by the octoshape), may together form a product shape, as shown in left side of FIG. 2. Or, for instance, the eight 3D subshapes (which are encoded by the octoshape) may be located in eight corners of a cubic cell, as shown in FIG. 12A. Eight cubic cells may, in turn, form a shape matrix, as shown in FIGS. 12G and 13.

As noted above, in Prototype A, a set of sixty-four 3D subshapes may be created from eight mother shapes, by dividing each mother shape into eight subshapes. In Prototype A, each subshape may be in any of three allowed orientations, as shown in FIGS. 8A-8C. Thus, in Prototype A, the total number of allowed outlines of subshapes is 64×3=192.

In Prototype A, meshes may be computationally created, transformed, sliced and capped, in order to generate virtual models of mother shapes and subshapes. For instance, the virtual models may comprise CAD (computer-aided design) models.

In Prototype A, it is desirable to select an appropriate frame for creating a virtual mesh to represent an object. For instance, it may be desirable to select an appropriate position and/or orientation of one or more features (e.g., center, axis of symmetry, diagonal, or edge) of the object (to be represented by the mesh) relative to the coordinate axes and/or origin of a spatial coordinate system that describes the mesh.

In Prototype A, frame transformation may facilitate the creation of meshes that are rotated or translated in space. Appropriate mesh frames may be selected for each mother shape. For instance, a cylindrical mother shape may be represented by a cylindrical mesh with its axis of revolution aligned with one of the three main spatial axes (X, Y, or Z, arbitrarily chosen), and with its center at the origin. Any cylindrical mesh may then be obtained by rotating or translating the base cylinder. More generally, a mother shape with at least one axis of symmetry may be computationally generated by: (a) specifying the mother shape's center of gravity (or centroid) as the origin; and (b) aligning an axis of symmetry of the mother shape with the Z-axis. For a mother shape that does not have an axis of symmetry, the frame may be selected in such a way that either edges or diagonals are aligned with the frame axes.

In Prototype A, for a mesh composed of a 3 by N array of points defined by their coordinates $(\tilde{X}, \tilde{Y}, \tilde{Z})$, translations and rotations to a new mesh $(\tilde{X}', \tilde{Y}', \tilde{Z}')$ are applied as follows:

Translation by $(X_0, Y_0, Z_0)$:

$$(\tilde{X}',\tilde{Y}',\tilde{Z}')=(\tilde{X},\tilde{Y},\tilde{Z})+(X_0,Y_0,Z_0)$$

Rotation by α degrees about the positive X-axis:

$$\tilde{Y}=\cos(\pi\alpha/180)\tilde{Y}-\sin(\pi\alpha/180)\tilde{Z}$$

$$\tilde{Z}=\sin(\pi\alpha/180)\tilde{Y}+\cos(\pi\alpha/180)\tilde{Z}$$

Rotation by α degrees about the positive Y-axis:

$$\tilde{X}=\cos(\pi\alpha/180)\tilde{X}+\sin(\pi\alpha/180)\tilde{Z}$$

$$\tilde{Z}=-\sin(\pi\alpha/180)\tilde{X}+\cos(\pi\alpha/180)\tilde{Z}$$

Rotation by α degrees about the positive Z-axis:

$$\tilde{X}=\cos(\pi\alpha/180)\tilde{X}-\sin(\pi\alpha/180)\tilde{Y}$$

$$\tilde{Y}=\sin(\pi\alpha/180)\tilde{X}+\cos(\pi\alpha/180)\tilde{X}$$

In Prototype A, multiple transformations may be applied to a single mesh. For instance, a mesh may be centered, then rotated about the X or Y axis, then rotated about the Z axis, and finally translated to a desired position.

In Prototype A, each mesh for a shape is made to appear smooth to a user. In some cases, in Prototype A, meshes that represent shapes are generated in accordance with the following four constraints: (1) for a shape (e.g., cube, cone, pyramid, diamond) with one or more vertices, the mesh must include a corresponding set of one or more vertices (i.e., for each vertex of the shape, there must be a corresponding vertex of the mesh); (2) for a shape with a sharp edge, the mesh must include a vertex at each end of this edge; (3) for a shape with a curved 2D edge, the mesh must represent the curved edge with as many vertices as resolution permits; and (4) for a shape with a curved 3D surface (e.g., sphere), the mesh must represent the curved surface with vertices that are spread along the curved face and that are approximately uniformly spaced from each other.

In Prototype A, the meshes are constructed programmatically. By setting a number $N_{res}$, a user may control the resolution of the mesh being created. Typically, higher values of $N_{res}$ yield meshes with better visual quality, whereas lower values yield meshes that are more easily handled computationally as they contain less points.

In Prototype A, meshes are defined by their vertices and their faces. Vertices may be an array of all the points composing the mesh. Faces may be defined by an array that determines which points are connected by edges.

Prototype A: Sphere Mother Shape

In Prototype A, the sphere of radius $R_0$ is created by uniformly spacing azimuth and co-latitude angles across the entire spherical space. The mesh is described as 3 matrices of points coordinates. Edges are determined by the adjacency of the points in the matrix. For matrix indices i and j, the point $P_{i,j}$ is given by coordinates $(X_{i,j}, Y_{i,j}, Z_{i,j})$ in Cartesian coordinates, or $(\psi_{i,j}, \theta_{i,j}, r_{i,j})$ in spherical coordinates. The number of points across a 180° arc is chosen to be $N_{res}$. The angle delta (angle between adjacent points) is $180/N_{res}$, in degrees, both in azimuth and co-latitude. This produces $2N^{res}$ points across the azimuth, and $N_{res}$ points across the co-latitude. The total number of points composing the spherical mesh is therefore approximately $2N_{res}^2$. A mesh face $F_{i,j}$ is the quad (or 2 triangles) with edges joining vertices: $P_{i,j}$, $P_{i+1,j}$, $P_{i+1,j+1}$ and $P_{i,j+1}$. The mesh vertices are expressed in spherical coordinates ($\psi_{i,j}$, $\theta_{i,j}$, $r_{i,j}$) where:

$$\psi_{i,j} = \frac{180°}{N_{res}} i \text{ for } i = 0 \text{ to } 2N_{res}$$

$$\theta_{i,j} = \frac{180°}{N_{res}} j \text{ for } j = 0 \text{ to } N_{res}$$

$$r_{i,j} = R_0$$

Prototype A: Torus Mother Shape

In Prototype A, the torus is defined in terms of both its toroidal radius $R_0$, which is the distance from its axis of revolution to the center of the circular tube, and its poloidal radius $r_0$, which is the radius of the smaller circle composing the outer tube. For the torus, the mesh is defined as a matrix of points $P_{i,j}$, where adjacency in the matrix determines edges. In this case, the mesh is defined by first dividing the larger circle of radius $R_0$ into $2N_{res}$ smaller circles of radius $r_0$ that are constrained on azimuthal planes, with equal azimuthal angles between the planes. Those smaller circles are then divided into $2*N^{res}$ points with uniform angular distance with respect to the small circle's center. The total number of points in the torus mesh is hence $4N_{res}^2$. The coordinates for a point $P_{i,j}$ may thus be determined by its toroidal azimuth angle $\psi$ (same as the azimuth in spherical coordinates), its poloidal co-latitude $\theta'$, which is the co-latitude relative to the center of smaller circle. Specifically $$\psi_{i,j} = \frac{180°}{N_{res}} i \text{ for } i = 0 \text{ to } 2N_{res} \text{ and } \theta'_{i,j} = \frac{180°}{N_{res}} j \text{ for } j = 0 \text{ to } 2N_{res}.$$

These coordinates may be transformed into Cartesian coordinates by employing the known toroidal and poloidal radii: $X_{i,j}=\cos(\theta'_{i,j})(R_0+\cos(\psi_{i,j})r_0)$; and $Y_{i,j}=\sin(\theta'_{i,j})(R_0+\cos(\psi_{i,j})r_0)$; and $Z_{i,j}=\sin(\psi_{i,j})r_0$. As in the sphere case, a mesh face $F_{i,j}$ is the quad (or 2 triangles) with edges joining vertices: $P_{i,j}$, $P_{i+1,j}$, $P_{i+1,j+1}$ and $P_{i,j+1}$.

Prototype A: Cube Mother Shape

In Prototype A, the vertices of the cubic mesh coincide with the cube's vertices. In this case, there is no need to select a resolution $N_{res}$ as the number of vertices is fixed at 8. The vertices for a cube of unit side length are given in Cartesian coordinates (X,Y,Z) by the array:

$$(\tilde{X}, \tilde{Y}, \tilde{Z}) = 0.5 \begin{bmatrix} 1 & 1 & 1 \\ 1 & -1 & 1 \\ -1 & -1 & 1 \\ -1 & 1 & 1 \\ 1 & 1 & -1 \\ 1 & -1 & -1 \\ -1 & -1 & -1 \\ -1 & 1 & -1 \end{bmatrix}$$

where each row corresponds to one vertex.

In Prototype A, if each vertex of a cube is numbered based on its row index in the preceding array, then the array of square faces of the cube is:

$$\tilde{F} = \begin{bmatrix} 1 & 2 & 3 & 4 \\ 5 & 6 & 7 & 8 \\ 1 & 2 & 6 & 5 \\ 2 & 3 & 7 & 6 \\ 3 & 4 & 8 & 7 \\ 4 & 1 & 5 & 8 \end{bmatrix}$$

where: (a) each face is defined by a single row in the array; (b) each face may be obtained by connecting the corresponding vertices (based on their assigned number) with their neighbors; and (c) the first and last vertex in each row are also connected.

Prototype A—Cone Mother Shape

In Prototype A, the cone mesh is defined first in cylindrical polar coordinates, with a single vertex corresponding to the cone's tip, and $2N_{res}$ vertices forming the circular base. An additional vertex is placed at the circular base center. The cone's axis of symmetry is made to align with the Z-axis. For a cone of length $L_0$ and circular radius $R_0$, the cone's tip vertex $P_{tip}$ has Cartesian coordinate (0,0,L), while the base's center vertex $P_{base}$ is at the origin (0,0,0). In order to conveniently have the center of gravity of the cone at the origin, the mesh is shifted downwards by $$\left(1 - \frac{1}{\sqrt{2}}\right)$$

of L. The base and tip points hence have their Z coordinate shift to $$Z_{tip} = \frac{L}{\sqrt{2}} \text{ and } Z_{base} = \left(1 - \frac{1}{\sqrt{2}}\right)L.$$

The base's circular edge is formed by spacing $2*N_{res}$ points equally along a circle of radius $R_0$, so that each point $P_i^c$ forming the circle is defined in cylindrical polar coordinates by: (a)

$$\rho_i = R_0, (b) \psi_i = \frac{180°}{N_{res}} i$$

for i=0 to $2N_{res}$; and (c) $Z_i=Z_{base}$. Corresponding Cartesian coordinates for the base circle vertices are: (a) $X_i=\cos(\psi_i)R_0$; (b) $Y_i=\sin(\psi_i)R_0$; and (c) $Z_i=Z_{base}$. The total number of points forming the cone mesh is hence $2N_{res}+2$. Mesh edges are obtained by joining each circle base point $P_i^c$ to its two neighbors ($P_{i+1}$ and $P_{i-1}$) and to both the tip vertex $P_{tip}$ and central vertex $P_{base}$.

Prototype A: Ellipsoid Mother Shape

In Prototype A, for an ellipsoid, the mesh has cylindrical polar coordinates where the Z-axis is the ellipsoid's most elongated axis. This often produces results that are visually more accurate for lower values of $N_{res}$. In Prototype A, the ellipsoid shape depends on 3 arbitrarily chosen parameters: $R_X$, $R_Y$, and $R_Z$. When these are equal, the special case of the sphere is recovered. For a Z-axis elongated ellipsoid, we pick $R_Z$ to be much greater than $R_X$ and $R_Y$. The ellipsoid mesh is defined by a matrix of points, where edges connect points that are adjacent in the matrix. To create the matrix, the Z-axis and azimuthal angle are each divided into $2*N_{res}$ pieces, so that point $P_{i,j}$ in the mesh matrix may be expressed in cylindrical polar coordinates as:

$$\psi_{i,j} = \frac{180°}{N_{res}} i \text{ for } i = 0 \text{ to } 2N_{res}$$

$$Z_{i,j} = -R_Z + \frac{R_Z}{N_{res}} j \text{ for } j = 0 \text{ to } 2N_{res}$$

$$\rho_{i,j} = \sqrt{1 - \frac{Z_{i,j}^2}{R_Z^2}} * \sqrt{R_X^2 \cos^2(\psi_{i,j}) + R_Y^2 \sin^2(\psi_{i,j})}$$

In Prototype A, the corresponding Cartesian coordinates for the ellipsoid are:

$$Z_{i,j} = -R_Z + \frac{R_Z}{N_{res}} j \text{ for } j = 0 \text{ to } 2N_{res}$$

$$X_{i,j} = R_X \cos(\psi_{i,j}) \sqrt{1 - \frac{Z_{i,j}^2}{R_Z^2}}$$

$$Y_{i,j} = R_Y \sin(\psi_{i,j}) \sqrt{1 - \frac{Z_{i,j}^2}{R_Z^2}}$$

In Prototype A, the total number of vertices for the ellipsoid is $4N_{res}^2$. For the ellipsoid, mesh face $F_{i,j}$ is the quad (or 2 triangles) with edges joining vertices: $P_{i,j}$, $P_{i+1,j}$, $P_{i+1,j+1}$ and $P_{i,j+1}$.

Alternatively, in Prototype A, spherical polar coordinates (instead of cylindrical coordinates) are employed to specify an ellipsoid.

Prototype A: Pyramid Mother Shape

In Prototype A, the pyramid mesh is specified by the pyramid's four vertices and four faces. The vertices for a pyramid with vertices coinciding with those of the unit cube are given in Cartesian coordinates (X,Y,Z) by the array:

$$(\tilde{X}, \tilde{Y}, \tilde{Z}) = 0.5 \begin{bmatrix} 1 & 1 & 1 \\ -1 & -1 & 1 \\ 1 & -1 & -1 \\ -1 & 1 & 1 \end{bmatrix}$$

where each row corresponds to one vertex.

In Prototype A, if each vertex of a pyramid is numbered based on its row index in the preceding array, then the array of triangular faces is:

$$\tilde{F} = \begin{bmatrix} 1 & 3 & 2 \\ 1 & 2 & 4 \\ 3 & 1 & 4 \\ 2 & 3 & 4 \end{bmatrix}$$

In Prototype A, each face of the pyramid is defined by a single row in the array and may be obtained by connecting the corresponding vertices (based on their assigned number) with their neighbors. The first and last vertex in each row are also connected.

Prototype A: Cylinder Mother Shape

In Prototype A, the cylindrical mesh for a cylinder of length $L_0$ and radius $R_0$ is defined using cylindrical polar coordinates. The Z-axis is placed along the cylinder's axis of revolution, and the circular edge bases on either side are defined using $2N_{res}$ points. A central point at the center of each circular base is specified, with Cartesian coordinates $P_{base}^{top}=(0, 0, L/2)$ and $P_{base}^{bottom}=(0, 0, -L/2)$. The points $P_i^{top}$ and $P_i^{bottom}$ on either circular base are given in cylindrical polar coordinates by:

$$\psi_i = \frac{180°}{N_{res}} i \text{ for } i = 0 \text{ to } 2N_{res}$$

$$Z_i = \begin{cases} -L/2 & \text{if bottom} \\ L/2 & \text{if top} \end{cases}$$

$$\rho_i = R_0$$

The corresponding Cartesian coordinates (for points $P_i^{top}$ and $P_i^{bottom}$ in the top and bottom circular bases of the cylinder) are:

$$X_i = \cos(\psi_i) R_0$$

$$Y_i = \sin(\psi_i) R_0$$

$$Z_i = \begin{cases} -L/2 & \text{if bottom} \\ L/2 & \text{if top} \end{cases}$$

In Prototype A, the total number of vertices of the cylinder is $4N_{res}+2$. Mesh edges of the cylinder are obtained by joining each circle base point $P_i^{t/b}$ to its two neighbors ($P_{i+1}^{t/b}$ and $P_{i-1}^{t/b}$) and to both the central vertex $P_i^{t/b}$ and the equivalent point on the opposite base $P_i^{bit}$.

Prototype A: Diamond Mother Shape

In Prototype A, the pyramid mesh is specified by the diamond's six vertices and eight faces. The vertices for the diamond are arbitrarily chosen to be:

$$(\tilde{X}, \tilde{Y}, \tilde{Z}) = 0.1 \begin{bmatrix} 2.25 & 2.25 & 2.25 \\ -1.25 & 2.25 & 1.25 \\ 2.25 & 0.25 & 2.25 \\ 1.25 & -2.25 & -1.25 \\ -2.25 & 0.25 & -2.25 \\ -2.25 & -2.25 & 2.25 \end{bmatrix}$$

where each row corresponds to one vertex.

In Prototype A, if each vertex of a diamond is numbered based on its row index in the preceding array, then the array of triangular faces is:

$$\tilde{F} = \begin{bmatrix} 1 & 2 & 3 \\ 1 & 3 & 4 \\ 6 & 4 & 3 \\ 6 & 3 & 2 \\ 5 & 2 & 1 \\ 2 & 5 & 6 \\ 5 & 4 & 6 \\ 4 & 5 & 1 \end{bmatrix}$$

In Prototype A, each face of the diamond is defined by a single row in the array and may be obtained by connecting the corresponding vertices (based on their assigned number) with their neighbors. The first and last vertex in each row are also connected.

Prototype A: Mesh Slicing for Subshape Generation

In Prototype A, the subshapes are obtained directly from the mother shape meshes (described above) by slicing them 3 times, first across the X normal plane, second across the Y normal plane, and third across the Z normal plane. To do this, a computer performs a mesh-slicing algorithm.

In Prototype A, the mesh slicing algorithm: (1) slices the original mesh into two pieces; and (2) then creates and merges a new mesh to cap both resulting mesh pieces, in order to form a closed surface. These two steps may be performed one after the other, first by slicing the mesh across a single straight plane, and second by determining the edge section points and creating a new surface that is bounded by those points and is also constrained by the cutting plane.

In Prototype A, the mesh is defined by a N by 3 array $\tilde{P}$ of three dimensional points and a 2N−4 by 3 array $\tilde{F}$ of point indexes for triangular faces definitions. This assumes that the mesh is fully closed and contains no self-intersections. For a non-closed and self intersecting mesh, pre-processing removes self-intersections and closes off any holes in the mesh before trying to slice it. The algorithm slices along the X-normal plane. Slicing along a plane with a different normal is done by rotating the entire mesh, performing an X-normal slice, and rotating both mesh pieces back. The resulting pieces keep the same format as the original mesh, with points arrays $\tilde{P}_{left}$ and $\tilde{P}_{right}$ and faces arrays $\tilde{F}_{left}$ and $\tilde{F}_{right}$. The points forming the cap are kept track of in a separate $\tilde{P}_{section}$, that is fully contained in both $\tilde{P}_{right}$ and $\tilde{P}_{left}$.

In Prototype A, for each triangle face defined by the vector $F_i$ containing points $P^1$, $P^2$, and $P^3$, the mesh-slicing algorithm checks the position of these three points relative to the cutting plane, and performs one of the operations described for cases 1 to 10 below:

Case 1: Position of the Three Points: all 3 points are to the left of the cutting plane. For all points P in $F_i$ with Cartesian coordinates $(P_X, P_Y, P_Z)$, $P_X<0$. Operation: Face is placed in $\tilde{F}_{left}$ entirely.

Case 2: Position of the Three Points: all 3 points are to the right of the cutting plane. For all points P in $F_i$ with Cartesian coordinates $(P_X, P_Y, P_Z)$, $P_X>0$. Operation: Face is placed in $\tilde{F}_{left}$ entirely.

Case 3: Position of the Three Points: 2 points $P^1$ and $P^2$ are to the left of the cutting plane. $P^3$ is on the cutting plane. $P_X^{1,2}<0$, $P_X^3=0$. Operation: Face is placed in $\tilde{F}_{left}$ entirely. $P^3$ is placed in $\tilde{P}_{section}$.

Case 4: Position of the Three Points: 2 points $P^1$ and $P^2$ are to the right of the cutting plane. $P^3$ is on the cutting plane. $P_X^{1,2}>0$, $P_X^3=0$. Operation: Face is placed in $\tilde{F}_{left}$ entirely. $P^3$ is placed in $\tilde{P}_{section}$.

Case 5: Position of the Three Points: 1 point $P^1$ is to the left of the cutting plane. Two points $P^2$ and $P^3$ are on the cutting plane. $P_X^1<0$, $P_X^{2,3}=0$. Operation: Face is placed in $\tilde{F}_{left}$ entirely. $P^{2,3}$ are placed in $\tilde{P}_{section}$.

Case 6: Position of the Three Points: 1 point $P^1$ is to the right of the cutting plane. Two points $P^2$ and $P^3$ are on the cutting plane. $P_X^1>0$, $P_X^{2,3}=0$. Operation: Face is placed in $\tilde{F}_{right}$ entirely. $P^{2,3}$ are placed in $\tilde{P}_{section}$.

Case 7: Position of the Three Points: all 3 points $P^{1,2,3}$ are on the cutting plane, $P_X^{1,2,3}=0$. Operation: Face is placed in both $F_{left}$ and $F_{right}$. All points added to $\tilde{P}_{section}$.

Case 8: Position of the Three Points: 2 points $P^{1,2}$ are to the left of the cutting plane, 1 point $P^3$ is to the right. $P_X^{1,2}<0$ and $P_X^3>0$. Operation: New points $P^a$ and $P^b$ are created on the $[P^1, P^3]$ and $[P^2, P^3]$ segments respectively, with $P_X^{a,b}=0$. Triangle is split into two left-side ($\in \tilde{F}_{left}$) triangles with vertices $[P^1, P^2, P^3]$ and $[P^b, P^a, P^1]$ and a right-side ($\in \tilde{F}_{right}$) triangle with vertices $[P^a, P^b, P^3]$. Points $P^a$ and $P^b$ are placed in $\tilde{P}_{section}$.

Case 9: Position of the Three Points: 2 points $P^{1,2}$ are to the right of the cutting plane, 1 point $P^3$ is to the left. $P_X^{1,2}>0$ and $P_X^3<0$. Operation: New points $P^a$ and $P^b$ are created on the $[P^1, P^3]$ and $[P^2, P^3]$ segments respectively, with $P_X^{a,b}=0$. Triangle is split into two right-side ($\in \tilde{F}_{right}$) triangles with vertices $[P^1, P^2, P^b]$ and $[P^b, P^a, P^1]$ and a left-side ($\in \tilde{F}_{left}$) triangle with vertices $[P^a, P^b, P^3]$. Points $P^a$ and $P^b$ are placed in $\tilde{P}_{section}$.

Case 10: Position of the Three Points: 1 point $P^1$ is to the left of the cutting plane, 1 point $P^2$ is to the right of the cutting plane, and 1 point $P^3$ is on the cutting plane. $P_X^1<0$, $P_X^2>0$ and $P_X^3=0$. Operation: New point $P^a$ is created on the $[P^1, P^2]$ segment with $P_X^a=0$. Triangle is split into a left-side ($\in \tilde{F}_{left}$) triangle with vertices $[P^1, P^a, P^3]$ and a right-side ($\in \tilde{F}_{left}$) triangle with vertices $[P^a, P^2, P^3]$. Points $P^a$ and $P^3$ are placed in $\tilde{P}_{section}$.

In Prototype A, the mesh-slicing algorithm outputs two distinct pieces that share a common boundary, which contains all the points that were created during the slicing process.

In Prototype A, after a closed mesh has been sliced, the cross section of the mesh and the cutting plane remains empty. The points saved in the $\tilde{P}_{section}$ array may be used to close off this newly formed hole using a triangulation. This cap is added to both left and right mesh pieces to close it off.

In Prototype A, in order to create the cap, the Delaunay triangulation for the set of points in the section array is calculated. Connections that existed between section points prior to slicing, or connections that were formed during the slicing process, are preserved and used as constraints for the Delaunay triangulation. This allows for the capping of non-convex meshes.

In Prototype A, the mesh slicing algorithm is performed three times, with capping, on each mother shape mesh, making use of rotation transformations to cut across arbitrary planes. The following steps are performed: Step 1: slice across an X-normal plane centered at the origin, yielding two new mesh pieces. Step 2: slice each of the two mesh pieces across a Y-normal plane centered at the origin, yielding four new mesh pieces. Step 3: slice each of the four mesh pieces across a Z-normal plane centered at the origin, yielding eight new mesh pieces. Each of these eight mesh pieces constitute one subshape.

Thus, in Prototype A, each of the eight mother shape produces eight distinct subshape meshes, for a total of 64 subshapes. In some cases: (a) there are 64 corners of cubic cells in a shape matrix; and (b) the 64 subshapes may fit into these 64 corners.

Prototype A, which is described above, is a non-limiting example of this invention. This invention may be implemented in many other ways.

Octoshape: Encoding Subshapes Located in a Product Shape

As discussed above, in some implementations, an octoshape encodes information about eight subshapes that are located in a product shape. The product shape may consist of eight subshapes. This is illustrated in FIG. 2. A product shape 200 is illustrated on the left side of FIG. 2. Also, FIGS. 14A-14J illustrate a product shape, and text accompanying FIGS. 14A-14J describe a product shape.

An octoshape may directly or indirectly specify the geometric shape, orientation and color of each of the eight subshapes in a product shape. For instance, the octoshape may indirectly specify this information by encoding one or more values that is (or are) associated, in a lookup table, with this information. Or, for example, if there are only 192 allowed outlines of a subshape, then a contour (of a notch in an octoshape) may encode a number between 0 and 191, and may thereby encode (a) an outline of a subshape and (b) the specific geometric shape and specific orientation of the subshape that would, when projected, create the outline.

In the example shown in FIG. 2 above, the notches in octoshape 230 encode the geometric shape and orientation of the eight subshapes in product shape 200, because: (a) each notch has a 2D contour that matches one of the allowed outlines of 3D subshapes; and (b) each allowed outline is associated with a specific allowed geometric shape and specific allowed orientation of a subshape. Furthermore, in FIG. 2, keyhole 260 (which is in a central region of octoshape 230) encodes the colors of the eight subshapes in product shape 200. In some cases, this is because: (a) the keyhole encodes a color for each of the eight notches of the octoshape; and (b) each of these notches is associated with one of the subshapes in product shape 200.

In some implementations, each octoshape represents data that specifies a unique product shape, including the geometric shape, rotational position and color of each of the eight subshapes in the product shape. To achieve this, constraints may be placed on the product shape and the permitted subshapes. Specifically, in some cases, these constraints are: (A) each product shape is a permutation of eight subshapes out of a set of 64 permitted geometric shapes of subshapes; (B) the 64 permitted subshapes consist of 8 subshapes for each of 8 mother shapes; (C) the 8 mother shapes are sphere, torus, cube, cone, ellipsoid, pyramid, cylinder, and diamond; (D) each mother shape is divided into 8 subshapes that each have a unique geometric shape; and (E) each subshape may have one of three allowed orientations.

In some cases, to avoid non-unique subshapes, the following two constraints may be imposed: (1) First, the cutting planes are not planes of symmetry of the mother shapes. This may be guaranteed by simply having the centroid not belong to any of the orthogonal cutting planes; and (2) Second, if the mother shape has an axis of symmetry by rotations of (2*pi/3), it must not both contain the octasection point and be aligned with the vectors (1, 1, 1), (−1, 1, 1), (−1, −1, 1) or (1, −1, 1). This latter constraint is due to the fact that new subshapes and notches may be obtained by rotating the cubes along their diagonals. In effect, mother shapes may be unique up to permutations of the X, Y and Z axes.

In some cases: (a) the 8 subshapes in a product shape are selected from a set of permitted subshapes that have permitted geometric shapes, permitted rotational positions and permitted colors; and (b) the total number of permitted subshapes (defined by their geometric shape, rotational position and color) is 64 geometric shapes ×3 angular positions ×8 colors=1,536.

Octoshape: Encoding Subshapes Located in Cubic Cell of Shape Matrix

Alternatively, an octoshape may encode eight subshapes that are in the eight corners of a cubic cell of a shape matrix.

In some implementations, an octoshape encodes information about eight subshapes that are located in the eight corners of a cubic cell of a shape matrix. Specifically, the octoshape may directly or indirectly encode the geometric shape, orientation and color of each of the eight subshapes. For instance, the octoshape may indirectly encode this information by encoding one or more values that is (or are) associated, in a lookup table, with this information. Or, for example, if there are only 192 allowed outlines of a subshape, then a contour (of a notch in an octoshape) may encode a number between 0 and 191, and may thereby encode (a) an outline of a subshape and (b) the specific geometric shape and specific orientation of the subshape that would, when projected, create the outline.

In some implementations, eight octoshapes encode information about 64 subshapes in a shape matrix, and thereby specify the shape matrix completely. This is because, in some implementations, (a) there are eight subshapes in each cubic cell, one in each corner of the cubic cell; (b) there are eight cubic cells in a shape matrix; and (c) thus there are 64 subshapes in a shape matrix.

FIGS. 12A, 12B, 12C, 12D, 12E and 12F illustrate how an octoshape may encode information about eight subshapes in eight corners of a cubic cell. FIGS. 12A-12F show how 2D contours of eight notches in the perimeter of the octoshape may be selected in such a way as to match 2D outlines of eight 3D subshapes, where the eight subshapes are located in eight corners of a cubic cell. In FIGS. 12A-12F, the notches in the octoshape encode the geometric shape and orientation of the eight subshapes, because: (a) each notch has a 2D contour that matches one of the allowed outlines of 3D subshapes; and (b) each allowed outline is associated with a specific allowed geometric shape and specific allowed orientation of a subshape. Furthermore, the keyhole in the octoshape encodes the colors of the eight subshapes. In some cases, this is because: (a) the keyhole encodes a color for each of the eight notches of the octoshape; and (b) each of these notches is associated with one of the subshapes in the cubic cell.

In FIG. 12A, the eight subshapes 1201, 1202, 1203, 1204, 1205, 1206, 1207, and 1208 are located in eight corners of a cubic cell 1220.

FIG. 12B is a top orthogonal view of cubic cell 1220. In FIG. 12B, subshapes 1205, 1206, 1207 and 1208 (which are in the bottom corners of cubic cell 1220) are partially occluded by subshapes 1201, 1202, 1203, and 1204, respectively (which are in the top corners of cubic cell 1220).

FIG. 12C is a top view of cubic cell 1220 and of the subshapes in the top corners of the cubic cell, specifically subshapes 1201, 1202, 1203, and 1204.

FIG. 12D is a bottom view of cubic cell 1220 and of the subshapes in the bottom corners of the cubic cell, specifically subshapes 1205, 1206, 1207 and 1208.

FIG. 12E shows eight outlines 1211, 1212, 1213, 1214, 1215, 1216, 1217, and 1218. These eight outlines are the perimeters of orthogonal projections, onto a geometric plane, of the 3D subshapes 1201, 1202, 1203, 1204, 1205, 1206, 1207, and 1208 shown in FIG. 12A.

FIG. 12F shows an octoshape 1230 with eight notches in its perimeter. The 2D contours of these eight notches in FIG. 12F match the 2D outlines in FIG. 12E, which are the perimeters of the projections of the eight subshapes that form cubic cell 1220 in FIG. 12A. Specifically, the 2D contours of notches 1221, 1222,1223,1224,1225,1226,1227, and 1228 match outlines 1211, 1212,1213,1214,1215,1216, 1217, and 1218, respectively, which are perimeters of projections of subshapes 1201, 1202,1203,1204,1205,1206, 1207, and 1208, respectively.

In FIGS. 12A-12F, the contour of each notch in octoshape 1230 encodes the geometric shape and orientation of the corresponding subshape in cubic cell 1220, and vice versa. Put differently, the contour of a notch in octoshape 1230 encodes the same information as do the geometric shape and orientation of a corresponding subshape in cubic cell 1220. For instance, the contour of notch 1221 encodes the geometric shape and orientation of subshape 1201, and vice versa. In other words, the contour of notch 1221 encodes the same information as do the geometric shape and orientation of subshape 1201. In FIGS. 12A-12F, the contour of each notch in octoshape 1230 is associated (directly or indirectly) with the same information as is the geometric shape and orientation of the corresponding subshape in cubic cell 1220. For example, the contour of notch 1221 is associated (directly or indirectly) with the same information as is the geometric shape and orientation of subshape 1201.

In FIG. 12F, octoshape 1230 includes keyhole 1260. This keyhole encodes the color of each of the eight subshapes in cubic cell 1220. In some cases, this is because: (a) the keyhole encodes a color for each of the eight notches of the octoshape; and (b) each of these notches is associated with one of the subshapes in cubic cell 1220.

FIG. 12G shows a shape matrix 1240 that consists of eight cubic cells 1241, 1242, 1243, 1244, 1245, 1246, 1247, and 1248. In FIG. 12G, these eight cubic cells come together at vertex 1250. Put differently, in FIG. 12G, these eight cubic cells have a shared vertex 1250.

FIG. 13 also shows a shape matrix that consists of eight cubic cells. In FIG. 13, each cubic cell has eight corners, and a subshape is located in each corner.

In FIG. 13, shape matrix 1000 that has an overall shape of a cube. Shape matrix 1000 consists of eight cubic cells 1001, 1002, 1003, 1004, 1005, 1006, 1007, 1008. These eight cubic cells meet at a shared vertex in the interior of shape matrix 1000. Each cubic cell in shape matrix 1000 has eight vertices and eight corresponding corner regions. In FIG. 13, each corner region of a cubic cell includes a vertex of the cubic cell (e.g., a vertex of cube 1001, 1002, 1003, 1004, 1005, 1006, 1007, or 1008) and also includes a region that is in that cube and is within a specified distance from that vertex. For instance, the specified distance may be less than or equal to % of the length of an outer edge of the cubic cell. A subshape is located in each of the 64 corner regions in shape matrix 1000. Thus, there are a total of 64 subshapes in shape matrix 1000.

For instance, in FIG. 13: (a) subshape 1031 is located in a corner region of cube 1001; and (b) subshape 1037 is located in a corner region of cube 1007. In FIG. 13, subshapes 1021, 1022, 1023, 1024, 1025, 1026, 1027, 1028: (a) are eight different portions of a purple cylinder mother shape; (b) each have a different geometric shape; and (c) are located in a corner region in cubic cell 1001, 1002, 1003, 1004, 1005, 1006, 1007, and 1008, respectively.

In some implementations: (a) each of the 64 subshapes in a shape matrix may independently have any of 192 allowed combinations of geometric shape and orientation and may have any of eight allowed colors; and (b) it is allowed (but in most cases, unusual) for multiple subshapes in a shape matrix to have identical geometric shape, color and orientation.

In many implementations, each specific subshape (in a specific cubic cell of a shape matrix) is different than: (a) all or some of the other subshapes in the specific cubic cell, and (b) all or some of the other subshapes in the entire shape matrix. For example, the subshapes in a cubic cell (and in an entire shape matrix) may differ from each other in one or more of the following features: color, geometric shape and orientation.

For instance, in FIG. 13: (a) subshape 1031 is a blue portion of a pyramid; (b) subshape 1037 is a green portion of a cone; and (c) subshapes 1031 and 1037 differ from each other in both color and geometric shape.

In the example shown in FIG. 13, the 64 subshapes are portions of eight different mother shapes, eight subshapes per mother shape. In FIG. 13, for any given mother shape, the eight subshapes for the given mother shape are all the same color, but each have a different geometric shapes. For instance, in FIG. 13, subshapes 1021, 1022, 1023, 1024, 1025, 1026, 1027, 1028: (a) are fragments of a single cylindrical mother shape; (b) are all purple; and (c) each have a different geometric shape. Alternatively, in a shape matrix, subshapes for a single mother shape may have different colors.

In FIG. 13, each of the 64 subshapes in shape matrix 1000 has a different geometric shape than all of the other subshapes in shape matrix 1000. In FIG. 13, there are a total of eight different colors of subshapes.

We sometimes call a cubic cell that is encoded by an octoshape an "octocell".

In some implementations, eight octoshapes together encode a unique shape matrix, including the geometric shape, rotational position and color of each of the 64 subshapes in the shape matrix.

In some alternative implementations, a notched 2D shape encodes one or more triangular pyramids that is (or are) part of a shape matrix. For instance, the shape matrix may comprise an icosahedron that consists of twenty triangular pyramids. In some cases: (a) a notched 2D shape completely specifies one or more triangular pyramids of a shape matrix and vice versa; and (b) the notched 2D shape and the one or more triangular pyramids represent identical data.

Octoshape: Error Detection and Correction

This section (titled "Octoshape: Error Detection and Correction") describes a method of decoding, error detection and correction ("DEDC"), in some implementations of this invention. For instance, this DEDC method is used in some, but not all, versions of Prototype A. This DEDC method is a non-limiting example. Many other methods of decoding, error detection and error correction may be performed in this invention.

In this DEDC method, two contours of an octoshape are employed for error detection and control. These two contours consist of an inner contour and an outer contour of the octoshape (see definitions in next paragraph). The inner contours of the octoshape and the outer contours of the octoshape are discrete sets; thus using both an inner contour and an outer contour for error control makes the encoding more resilient to error.

As used herein: (a) an "outer contour" of an octoshape means the shape of a notch in the perimeter of an octoshape; and (b) an "inner contour" of an octoshape means the shape of a portion of the perimeter of a hole in the octoshape.

In this DEDC method, a trained machine learning (ML) classifier may predict (based on one or more images of an octoshape) the eight outer contours of the octoshape. The numerical value of the eighth predicted contour (which is an integer in the range 0-191) may be used to check whether the first seven predicted outer contours are correct. Likewise, in this DEDC method, a trained ML classifier may predict (based on one or more images of an octoshape) eight colors for the octoshape. The octoshape has four inner contours. Two predicted colors (a color tuple) are associated with each inner contour. The numerical value of the eighth predicted color may be used to check whether the first seven predicted colors are correct. Loosely speaking, in the DEDC method, an eighth value functions in a manner similar to parity bits.

In this DEDC method, the following setup steps may be performed: (1) Get 64 3D subshapes from eight 3D mother shapes. (2) Make 192 2D contours by taking outlines of each of the 64 subshapes as seen from each of three orthogonal perspectives X, Y, and Z. (3) Give 192 contours a value of 0 or 1. Store this in a lookup table. (4) Assign each of the 192 contours into what we call a "perspective group". In this DEDC method, there are three perspective groups corresponding to perspectives X, Y and Z (or equivalently perspectives 0, 1, and 2, respectively). The contours may be numbered in such a way that the perspective of each contour is its contour number (which is an integer between 0 and 191) modulo 3—that is, the perspective of a contour may be 0, 1, or 2 (or equivalently X, Y or Z, respectively.

In this DEDC method, there are eight locations for outer contours (of notches of the octoshape). The eighth contour is used for detecting errors.

In this DEDC method, the following steps may be performed to encode outer contours: (1) get the octoshape's first seven contour values, index into the lookup table, and concatenate the resulting bits together; (2) turn that 7-bit number into an integer; (3) use that number for the eighth contour; and (4) computationally place the eight outer contours (shapes of notches) in order along the perimeter of the octoshape.

In this DEDC method, there are four locations for inner contours but eight colors to encode. The eighth color is used to check whether the first seven colors are correct (again, similar to a parity bit).

In this DEDC method, the following steps may be performed to encode inner contours: Step 1: Get the octoshape's first seven color values, then sum them. Make the eighth color value equal to the sum modulo 8. For example, if the first seven color values were (0, 1, 0, 4, 6, 1, 7), then the eighth color value would be 3 because (0+1+0+4+6+1+7) modulo 8=3. Step 2: Create four color tuples using the eight color values in order. For example, if the first eight color values were (0, 1, 0, 4, 6, 1, 7, 3), then the four color tuples would be (0, 1) (0, 4) (6, 1) (7, 3). Step 3: Assign each color tuple to a new contour 0-192 using the following formula: new contour=(c0*24)+(c1*3)+perspective group number, where c0 and c1 for a given color tuple are the first and second values, respectively, in the given color tuple. As there are only three perspective groups reuse X (or 0) for quadrant 4. For example, if the first seven color values were (0, 1, 0, 4, 6, 1, 7), then: (a) the first quadrant contour would be 3 because (0*24)+(1*3)+0=3; (b) the second quadrant contour would be 13 because (0*24)+(4*3)+1=13; (c) the third quadrant contour would be 149 because (6*24)+(1*3)+2=149; and (d) the fourth quadrant contour would be 185 because (7*24)+(3*3)+0=177. Step 4: Computationally place the four inner contours (i.e., four segments of the perimeter of a hole in the octoshape) in order along the perimeter of the hole.

In this DEDC method, a computer may employ only inner contours of an octoshape to orient the octoshape. Specifically, a computer may determine a default orientation of the octoshape in a 2D Cartesian coordinate system, in such a way that: (a) the inner contours are aligned with the X and Y axes of the coordinate system; and (b) inner contour number 1 (i.e., the contour number in the first ordinal position) is in the top right quadrant. As used herein, to say that a contour is "aligned with the X and Y axes" of a coordinate system means that: (a) a first straight line segment of the contour is aligned with the x-axis of the coordinate system and a second straight line segment of the contour is aligned with the y-axis of the coordinate system; and (b) the first and second straight line segments form a right angle, the vertex of which is the origin of the coordinate system.

In this DEDC method, a computer takes, as an input, a binarized image of an octoshape and then computationally reorients the image into the default orientation discussed in the preceding paragraph. To do so, the computer may perform a first rotation and a second rotation.

In this DEDC method, a computer may perform the first rotation (i.e., the first of two rotations that achieve the default orientation) as follows: (1) get the binarized image of the octoshape; (2) crop and center the image; (3) eliminate any perspective warping; (4) add any padding needed to have padding on all sides equal to 10% of the octoshape's bounding box width; (5) get the octoshape's outline as a single contour (the "octoshape outline"), do this by searching for the largest contour in the image; (6) calculate the angle between a first line segment (from a central point to the point in the octoshape outline that has the largest y-coordinate) and a second line segment (from the central point to a point in the octoshape outline that is directly above the central point); and (7) rotate the binarized image by this angle, about the central point. For purposes of the paragraph, the "central point" means the center of the convex hull of the octoshape outline. After the first rotation, the octoshape is oriented in such a way that: (a) the central point is located at the origin of the coordinate system; and (b) the highest point (i.e., the point with the largest y-coordinate) of the octoshape is a vertex of octoshape which is on the y-axis of the coordinate system. Furthermore, after the first rotation, the inner contours are either aligned along the X and Y axes, or are instead 45 degrees off. This is because there are four possible outside axes (and eight corners), and two possible inside axes.

In this DEDC method, a computer may also perform a second rotation to ensure that the inner contours are aligned with X and Y axes and to achieve the default orientation. For instance, the computer may perform the second rotation as follows: (1) get the image that results from the first rotation, and then segment out the inner shape contour; (2) find all corner points in this contour; (3) get the image that results from the first rotation, and find four extreme points (i.e., the top, right-most, bottom, and left-most corner points) of the whole octoshape; (4) create a "match score" which indicates whether all four of these extreme points occur within five pixels of two lines, specifically, a first line (left most, right most) which is the X axis and a second line (top most, bottom most) which is the Y axis; (4) rotate the entire image by 45°, and re-run steps 1-4; and (5) compare the first "match score" with the second, and return whichever orientation has the higher score.

In this DEDC method, after the image is oriented into the default orientation, contours are fed into a trained ML classifier.

In this DEDC method, a computer decodes, error checks and corrects colors that are represented by inner contours of an octoshape. To do so, a computer may perform the following steps: Step 1: Employ a trained ML classifier to analyze one or more image(s) of an octoshape and to output a list of predicted inner contours of the octoshape. Specifically, when an input contour is fed into the ML classifier, the ML classifier outputs a list of contour numbers and, for each particular contour number in the list, a probability that the input contour matches the particular contour number. For each of the four classes (i.e., for each of the four inner contours of the octoshape), there are a set of fifty top predictions. The top predictions are the contour numbers that the ML classifier determines are the most likely matches. Step 2: For each of the four top predictions, take the contour number (for that prediction) modulo 3. The resulting value is the perspective group number for that prediction. If the octoshape has the correct orientation, the array of perspective groups will be [0, 1, 2, 0]. If not, then the octoshape is not in its default orientation. Step 3: If the calculated array of perspective groups is not the desired array of [0, 1, 2, 0], then calculate the offset between these two arrays, which offset is a number 1, 2 or 3. Use this offset to update the larger prediction array, so that the larger prediction array is in the correct quadrant order. Save the offset, for rotating the actual octoshape later. (The larger prediction array is an array of predicted contour numbers along with probabilities for each position on the octoshape. In that array, each row corresponds to the set of possible contour values and probabilities for a single quadrant position. These rows are in the correct order but not necessarily starting with the correct row. The offset is used to shift the rows cyclically so that they have the correct starting row: i.e. the contour for quadrant 1 corresponds to quadrant 1 of the octoshape.) Step 4: Calculate the error as follows: Convert the top 4 predictions into 8 colors. For each prediction, color 1=prediction/24 and color 2=(prediction % 24)/3, where "%" means modulo and "/" means integer floor division, not floating point division. This is the reverse of how they were encoded. Step 6: Then check for errors by calculating the sum of the first 7 colors modulo 8. If that sum is equal to the last color, then there are no errors, and colors are correct. Step 7: If there are errors, then they are corrected as follows: For each of the 4 contours, there are five other top predictions. Loop through and try each of the five other top predictions, until the error calculation returns true. The output of this decoding and error algorithm for inner contours is a list of eight colors (unless an error cannot be corrected).

In this DEDC method, a computer predicts, error checks and error corrects outer contours of an octoshape. To do so, a computer may perform the following steps: Step 1: Employ a trained ML classifier to analyze one or more image(s) of an octoshape and to output a list of predicted outer contours of the octoshape. For each of the eight classes (i.e., each of the eight respective outer contours of the octoshape), there are five top predictions. Step 2: Reduce that list into just the eight top predictions (i.e., a top prediction for each of eight outer contours of the octoshape). Step 3: Calculate the error. To do so, convert the first 7 contours to binary by indexing into a lookup table and concatenating the bits. Then XOR this value with the 8th contour as binary (prediction of parity bit). If 0, then the set of contours is correct. If not, do error correction. Step 4: To correct any errors, determine which of the bits are errors. The XOR'ed value above gives the index of the wrong contours. As a non-limiting example, if topidx=[156, 70, 163, 54, 169, 101, 188, 20], firstSevenToBinary=0110100, parityToBinary=0010100 (20), and xor=0100000, then contour 6 (which has the erroneous value 101) is wrong. (This is because the sixth bit (counting from right to left) of the xor'ed value here is 1. As another non-limiting example, if topidx=[156, 70, 163, 54, 169, 101, 188, 20], firstSevenToBinary=0100100, parityToBinary=0010100 (20), and xor=0110000, then contours 5 and 6 (which have erroneous values of 169 and 101) are wrong. (This is because, in the example in the preceding sentence, the fifth and sixth bits (counting from right to left) of the xor'ed value 0110000 are 1. Once the erroneous bits are known, use the other top four predictions for the class in question and run them through the above calculation. Then use the contours which XOR to make 0000000.

In this DEDC method, if the XOR'ed value (calculated when error checking predicted outer contours) has more than two errors, then a computer concludes that the eighth "parity" contour is itself wrong: This is because more than two errors are not expected in practical use scenarios. As a non-limiting example of when the eighth "parity" bit is itself wrong: if topidx=[156, 70, 163, 54, 169, 24, 188, 27], firstSevenToBinary=0010100 (20), parityToBinary=0011011 (27), and xor=0001111, then the xor'ed value suggests that there are four errors (in the first, second, third and fourth contours, because the first four bits—from right to left—of the xor'ed value are 1). But more than 2 errors are not expected, so the eighth (so-called "parity") contour is wrong! If the prediction for the eighth (so-called "parity") contour is wrong, replace it with the next best prediction in the list of top predictions for that contour. Check again. If the error is resolved in two or less replacements, pass error correction. Otherwise throw the error for "Failed to do error correction".

The output of the decoding and error algorithm described in the preceding two paragraphs is a list of eight outer contours (unless an error cannot be corrected).

Optical Decoding/Smartphone Application

As discussed above, optical decoding may be performed as follows: (a) one or more cameras may capture one or more images of a notched 2D shape, and (b) a computer may analyze the one or more images to recover information that is encoded by the notched 2D shape.

For instance, in some cases: (a) a camera in a smartphone captures one or more images of an octoshape; and (b) one or more computers (e.g., in the smartphone and/or a remote server) perform a computer vision program to analyze the image(s) to ascertain a unique identifier that is encoded by the octoshape. The one or more computers may then employ the unique identifier to access data that is associated with the unique identifier. For example, the data (which is associated with the unique identifier) may comprise information about a physical product that displays or is attached to the octoshape.

Figure 15:
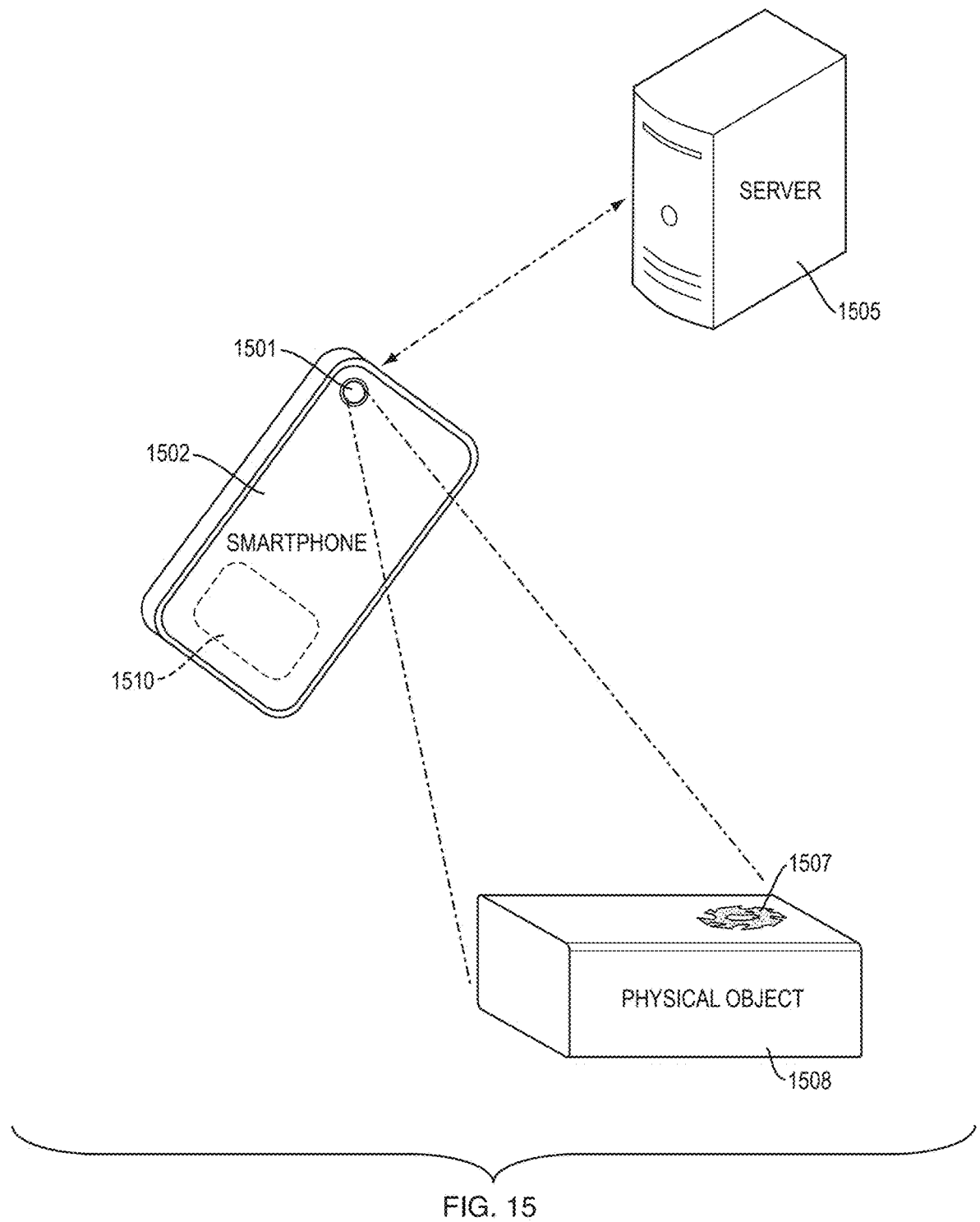
FIG. 15 shows a camera in a smartphone capturing an image of an octoshape.

FIG. 15 shows a camera 1501 in a smartphone 1502 capturing an image of an octoshape 1507 that is attached to a physical object 1508. The smartphone 1502 may transmit and receive wireless signals to communicate with a remote server 1505. For instance, a computer 1510 onboard the smartphone 1502 may recover, from image(s) of octoshape 1507, a unique identifier, and may cause the unique identifier (or data derived at least in part therefrom) to be transmitted to remote server 1505. The remote server 1505 may access data associated with that unique identifier, and may cause the associated data (or data derived at least in part therefrom) be transmitted to the smartphone 1502. Alternatively, instead of a smartphone, any other mobile computing device (e.g., tablet) may be employed.

In some cases, a software program includes instructions that enable the one or more computers to accept the images as input, to perform the computer vision program and to access the associated data. In some cases, the software also includes instructions that control the operation of one or more cameras (e.g., in a smartphone), in such a way as to cause the camera(s) to capture the image(s) and/or to cause the resulting images to be fed as input into the computer vision algorithm.

In some use scenarios, the octoshape is between 0.5 mm and 25 mm in diameter, or larger. The speed of the image capture, optical decoding, and subsequent returning of cross-referenced values may be optimized. The computer vision program may retrieve (from the captured image(s)) a unique identifier associated with the octoshape. In some cases, the unique identifier is a product key, primary key or an MD-5 hash value.

In some implementations, a computer (e.g., housed in a smartphone): (a) analyzes one or more images of an octoshape to ascertain a unique value associated with the octoshape; and (b) communicates the unique value (or data derived at least in part from the unique value) in a secure manner to another computer (e.g., a remote server). For instance, the other computer may employ the unique identifier (or data derived at least in part from the unique identifier) to access a database of cross-referenceable data or to perform computations that involve a shape matrix or a product shape.

In some implementations, a web application allows a user to snap a picture of an octoshape (e.g., an octoshape printed on paper). The web app may send this picture to a server (backend) which may respond by sending back decoded information. The uploaded picture may be stored on the server, and decoded information may be stored for future use.

The web app may allow the user to indicate whether the decoded information was correct or not (e.g., by pressing a button). This feedback may be recorded on the server. Inaccurate images may be analyzed to improve the backend. A simple rest API (application programming interface) may govern the app with the server.

In some cases, information encoded by an octoshape may be decoded in the following steps: (1) Detection: A computer vision algorithm may detect an octoshape in an image. A machine learning algorithm may have been trained, on thousands of synthetic images of octoshapes, to locate a bounding box around an octoshape. Once trained, the trained machine learning algorithm: (a) may take, as an input, an image containing an octoshape; and (b) locate a bounding box around the octoshape. A computer may then crop the image, by using the bounding box coordinates (e.g., by deleting the portion of the image outside the bounding box). (2) Binarization: The image may be binarized so the octoshape is completely black and the background is white. (3) Find Octagon: An octagon that encloses the octoshape may be found. In some cases, because of perspective distortion, the octagon is not a regular octagon with equal sides. (4) Rectify Image: In this step, a transformation (a homography) may transform the octagon to a regular octagon. In addition, this step may correct for in-plane rotation based on the detection of the notch. (5) Sub-shape Extraction: In this step, the contours of eight notches (in the perimeter of the octoshape) may be extracted from the rectified octoshape. (6) Color extraction: In this step, the keyhole shape may be analyzed to extract color information for each subspace. (7) Decoding: This step may map each of the contours (of notches in the perimeter an octoshape) to one of the 192 unique shapes in the database based on a contour matching algorithm. The mapping, along with the color information, may uniquely decode the octoshape.

YOLO: In some implementations, a CNN (convolutional neural network) is trained to analyze an image of an octoshape, to determine a unique product shape which the octoshape represents. For instance, a YOLO (you only look once) neural network may be employed. For example, a YOLO v3 network may be employed. The YOLO CNN may include 24 convolutional layers. The activation function for all layers in the YOLO network may be Leaky RELU (rectified linear unit), except the final layer, which may use a linear function.

In some cases, one or more of the following machine learning algorithms are employed to analyze an image of an octoshape, to detect a unique product identifier that is represented by the octoshape: decision tree, GAN (generative adversarial network), CNN (convolutional neural network), RNN (recurrent neural network), a neural network that includes LSTM (long short term memory) units, any other neural network, any machine learning that performs linear regression or regression, ensemble learning, MTL (multi-task learning) or any other method of supervised or unsupervised machine learning.

In some cases, the neural network (or other machine learning model) is trained on computer generated images of octoshapes. The training images may be distorted (e.g., by image analysis software) in ways that would naturally occur if the training images were printed on paper and photographed (such as perspective change, angle of view, shadows, and non-uniform background).

In some implementations, a keyhole of an octoshape is decoded as follows: A central point in the octoshape (e.g., the center of the base octagon of the octoshape) may be determined once detection is confirmed. The distances to each of the keyhole vertices may be estimated. Since the keyhole vertices are aligned with the central point and the larger octagon's vertices, the distance from the center to the keyhole vertices may be accurately calculated in proportion to the octagon's dimensions. This may yield the color values directly, as they may be encoded as discrete increments in distance between octagon center and corresponding keyhole vertex point.

Omitting Orientation Marker

In some implementations of this invention, the orientation marker is omitted. The orientation of an octoshape (or, equivalently, the ordinal positions of the notches in the octoshape) may instead be encoded by the perimeter of a hole in the octoshape. For instance, the shape of the perimeter of the keyhole in the first quadrant of the keyhole may be limited to only a first set of allowed contours and the shape of the perimeter of the keyhole in each of the other three quadrants of the keyhole may be limited to only a second set of allowed contours. A computer: (a) may analyze an image (or other measurements) of an octoshape to recognize a portion of the perimeter of the octoshape's keyhole which has a shape that is one of the first set of allowed contours; and (b) may identify that portion as being in the first quadrant of the octoshape.

In some cases, a computer: (a) analyzes one or images (or other measurements of a keyhole) to identify the vertices of the octoshape; and (b) determines, based on the location of these vertices, eight possible orientations of the octoshape. The computer may reduce the number of possible orientations to four, by checking that the inner shapes are placed correctly into four quadrants and are not split. If the inner shapes are split, then the computer may rotate the vertices by 45 degrees to place the inner shapes into the four quadrants. The preceding check may be performed with corner detection, without employing a trained convolutional neural network (CNN).

Following this extra check, the trained CNN may predict the four inner shape contour numbers, regardless of whether the orientation is the correct one or not. This provides a list of four contour numbers, which may be permuted cyclically four times. Any of these four permutations may be the "true" orientation. In order to determine which of these four possible permutations of the four inner contour numbers is the correct one, the inner contour numbers are chosen in such a way that they form a specific pattern when the octoshape is correctly oriented. The permutation that follows the chosen pattern is the true permutation. A computer may: (a) determine the true permutation of inner contours; and (b) then permute predicted outer contours accordingly.

In a prototype of this invention, the contour numbers IC1, IC2, IC3, and IC4 of four respective inner contours are selected in such a way that: (a) IC1 mod 3=0; (b) IC2 mod 3=1; (c) IC3 mod 3=2; and (d) IC4 mod 3=0. In this prototype, if mod 3 of the predicted inner contours yields: [0, 0, 1, 2], then: (a) the contour list is adjusted by permuting it backwards; (b) the outer contour list is adjusted by performing a 90 degree rotation counterclockwise. (In the preceding sentence, to permute backwards is to circular shift to the right: i.e., to shift each item in a vector to the right with wrap-around, so that the rightmost item in the vector shifts to leftmost position in the vector. For instance, when the vector [1 2 3 4] is permuted backwards, the result is [4 1 2 3]) This method is resilient to a single error in the inner shape prediction result.

In some implementations, a computer may computationally re-orient an octoshape to a new (e.g., correct) orientation by permuting decoded data (e.g., contour numbers) that specifies inner or outer contours, rather than by rotating an image of the octoshape. This is helpful, because rotating an image may be much more computationally intensive than permuting decoded data (such as decoded contour numbers).

Notched 2D Shape: More Details

This invention is not limited to a single octoshape.

Figure 16:
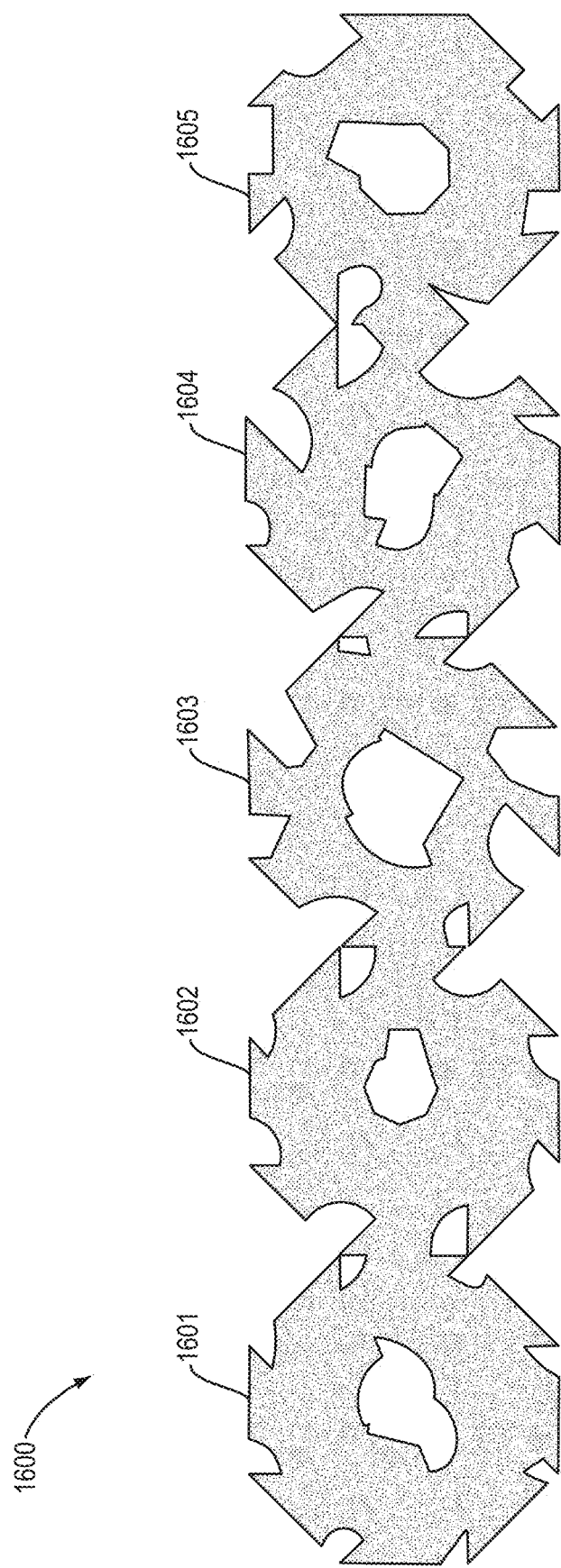
FIG. 16 shows a 2D geometric shape that consists of multiple octoshapes.

FIG. 16 shows a 2D geometric shape that consists of multiple octoshapes. The multiple octoshapes in FIG. 16 together may encode more data than a single octoshape. In the example shown in FIG. 16, a 2D geometric shape 1600 consists of a set of five octoshapes 1601, 1602, 1603, 1604, 1605. The five octoshapes in this set are arranged in a row, in such a way that each octoshape in the set touches, and is joined to, one or two other octoshapes in the set. Alternatively, a set of multiple octoshapes may be arranged in any pattern (e.g., any array of one or more rows and one or more columns of octoshapes), in such a way that each octoshape in the set touches, and is joined to, one or more other octoshapes in the set. The multiple octoshapes may encode data, such as data that specifies an entire shape matrix or entire super-shape-matrix.

Figure 17:
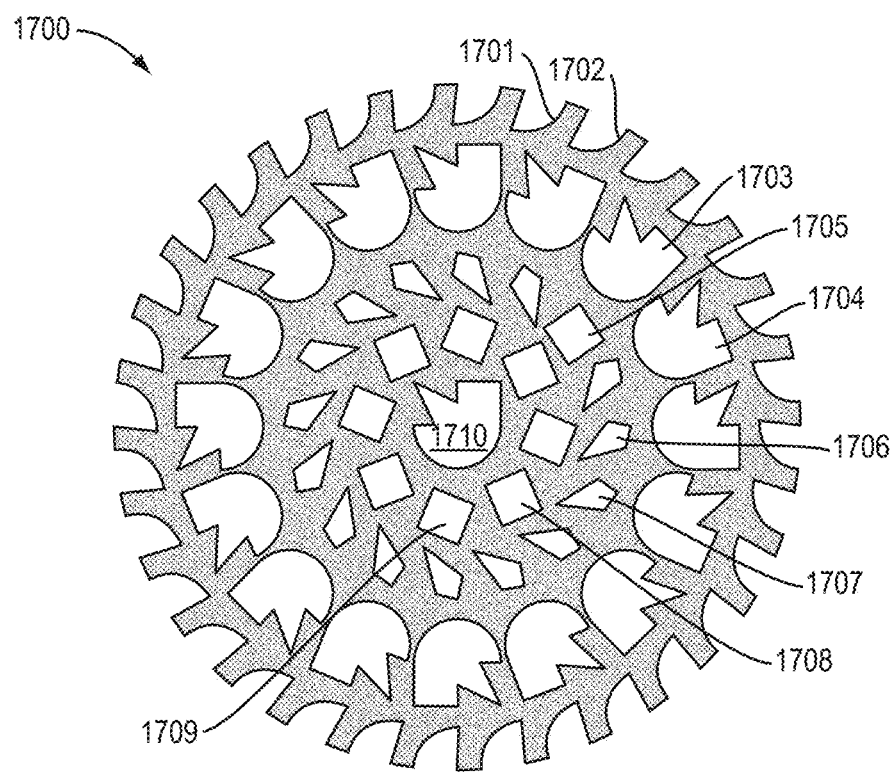
FIG. 17 shows a circular 2D shape that has been modified with both notches and holes.

FIG. 17 shows a roughly circular 2D shape 1700 that has been modified with both notches and holes. In the example shown in FIG. 17, the shapes of the both the notches and holes encode data. The outer perimeter of shape 1700 is roughly circular and is indented by multiple notches (e.g., 1701, 1702). Furthermore, holes in the interior of 2D shape 1700 are arranged in circular patterns. These circular patterns are nested one within the other. For instance, a central hole 1710 is located inside a first circular layer of holes (including holes 1708, 1709), which is inside a second circular layer of holes (including holes 1705, 1706, 1707), which is inside a third circular layer of holes (including holes 1703, 1704), while is inside the outer, notched perimeter of shape 1700. The notches and holes of roughly circular 2D shape 1700 together may encode more data than a single octoshape. For instance, in FIG. 17, the roughly circular 2D shape 1700 has layers of contours, where each of the contours is a contour of a hole or notch.

Figure 18:
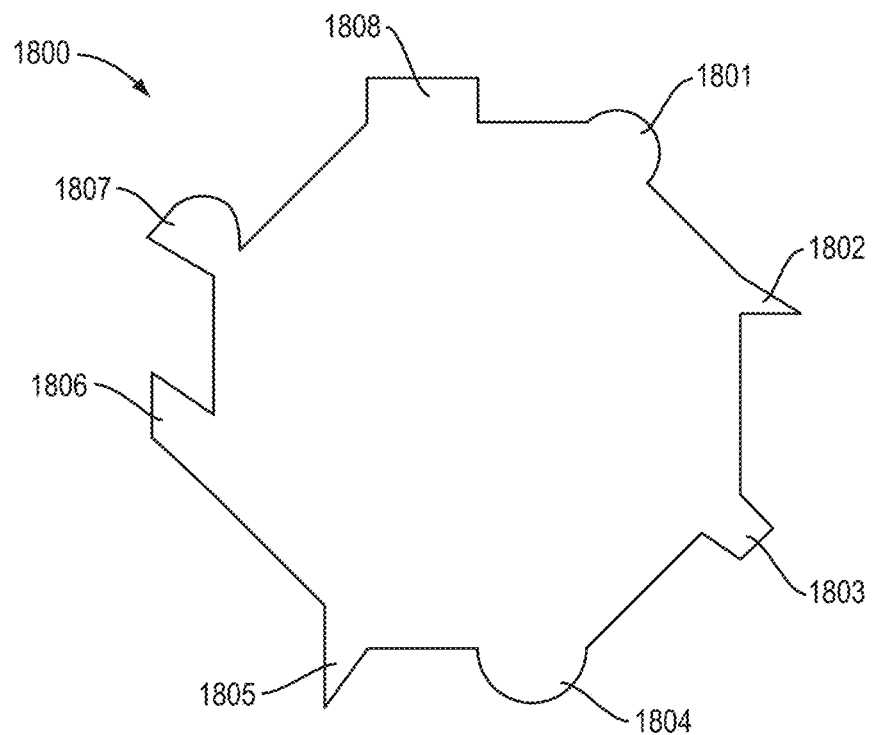
FIG. 18 shows an "inside-out" version of an octoshape, in which notches are replaced by protuberances.

This invention is not limited to notches. FIG. 18 shows an "inside-out" version of an octoshape, in which notches are replaced by protuberances. In the example shown in FIG. 18, the perimeter of an inside-out octoshape 1800 has eight protuberances instead of eight notches. These eight protuberances 1801, 1802, 1803, 1804, 1805, 1806, 1807, 1808 each form a "bump" or concave curve in the perimeter of the inside-out octoshape 1800. These eight protuberances each encode data. In some cases, the eight protuberances together specify the geometric shape and orientation of eight subshapes: (a) in a product shape; or (b) in respective corners of a cubic cell of a shape matrix.

As noted above, each notched 2D shape that is mentioned herein may comprise: (a) an octoshape; (b) a polygon that is modified by notches; (c) a solid 2D shape that has a notched perimeter; (d) a solid 2D shape that has a notched perimeter, which perimeter is at least partially curved including in regions outside of the notches; (e) an irregular polygon that is modified by notches; (f) a regular polygon that is modified by notches; (g) a convex regular polygon that is modified by notches; or an "inside-out" version of any of the foregoing. The shapes mentioned above in this paragraph are non-limiting examples of notched 2D shapes that may encode information, in illustrative implementations of this invention.

Scaling: In some implementations, a 2D contour of a notch in the perimeter of a notched 2D shape (e.g., an octoshape) has a scaled but otherwise identical shape as the 2D outline of a corresponding 3D subshape. For instance, the former (2D contour of notch) may be smaller or larger than the latter (2D outline of 3D subshape). The scale of a notch in a perimeter of an octoshape may be selected in such a way that notches of the octoshape: (a) do not overlap each other; (b) do not overlap any keyhole or orientation mark in the octoshape; and (c) remain in a specific, outer 2D region of the octoshape. The same scaling (from 2D outline of subshape to 2D contour of notch, or vice versa) may be employed for every notch. For instance, every 2D contour of a notch may be x times larger or smaller than the 2D outline of the corresponding 3D subshape. Notches in a perimeter of an octoshape may vary in size, relative to each other.

Physical Octoshape: A notched 2D shape may be displayed on or by a physical object. For instance, a notched 2D shape pattern may be laser-printed on paper (e.g. polyester paper or matte photo paper) or on foil (e.g., metallic foil). A pattern that appears (from at least one perspective) to be a notched 2D shape may be embossed, engraved, or etched in or on a metal object. For instance, the object may be a flat, metallic tag that is attached to or partially embedded in another physical object, such as a physical, commercially-sold product). Alternatively, a 3D printer may fabricate an object (e.g., a thermoplastic or metal object) that includes a pattern that appears (from at least one perspective) to be a notched 2D shape.

Orthogonal View: In some cases, the only geometric transformations that are employed (when transforming a 2D outline of a 3D subshape into a 2D contour of a notch in the perimeter of an octoshape, or vice versa) are translation, scaling and rotation. The notch edge chosen to match the base octagon's edge may depend on chosen orthogonal views.

Obscured Notches: A 2D outline of a specific 3D subshape in a product shape may be encoded by a 2D contour of a notch in the perimeter of an octoshape, even though the specific 3D subshape may be partially occluded by one or more other subshapes in the product shape (when the product shape is viewed from the perspective from which the outline was created). The 2D outline of a subshape in a product shape may be generated after the subshapes have been separated from each other and placed in distinct non-overlapping regions.

Mother Shapes: In some implementations, the mother shapes are sphere, torus, cube, cone, ellipsoid, pyramid, cylinder, and diamond. The cylinder may be a right circular cylinder. In some cases, the diamond is formed of two equal regular squared based pyramids but is not a regular octahedron. However, the shapes may vary, depending on the particular application. In some implementations, the torus is a torus of revolution. Put differently, the torus may be a torus in which the axis of revolution is located in an empty "donut hole" in the middle of the torus.

Multistep, Multi-Layer, Verification

In some implementations, a group of octoshapes is positioned in multiple layers and is employed for multistep verification or multistep authentication. For instance, each octoshape in the group may be printed on a different substrate and may be covered by an opaque film (e.g., label). This opaque film may cover the printed octoshape, may extend beyond the printed octoshape, and may attach (e.g., by adhesion or chemical bonding) to the substrate (e.g., in regions of the substrate where the octoshape is not printed). The substrates may be positioned, one on top of the other, to form a stack of the substrates. The octoshapes may be initially hidden from view inside the stack. The stack of substrates may be attached to a physical object (e.g., a drug package). A user may expose the octoshapes in the stack one-by-one. To do so, the user may peel off or scratch off substrate layers one-by-one, to reveal all of the octoshapes in the stack, one-by-one. After each specific octoshape in the stack is revealed—and before the next (if any) octoshape in the stack is revealed: (a) a camera may capture an image of the specific octoshape; (b) then a computer may analyze the image to decode the specific octoshape; and (c) then an input/output device may present, to the user, data that is associated with the specific octoshape.

Here is a non-limiting example of multi-layer, multistep verification. In this example, a stack of layers that contain octoshapes is attached to packaging for a drug (e.g., a box that contains pills). A user may scratch or peel off a first layer of the stack to reveal a first octoshape, which may be optically decoded to recover the name of the manufacturer of the drug. An I/O device may present this information (name of manufacturer) to the user. Then, the user may then scratch or peel off a second layer of the stack, to reveal a second octoshape. The second octoshape may be optically decoded to recover the name and dose of drug. An I/O device may present this information (name and dose of drug) to the user. Then, the user may then scratch or peel off a third layer of the stack, to reveal a third octoshape. The third octoshape may be optically decoded to recover the lot number, date, and ingredients of the drug. An I/O device may present this information (lot number, date, and ingredients of drug) to the user. Each time that information decoded from the octoshape is presented to the user, the user may compare it to other of data (e.g., information printed on the packaging of the drug), in order to verify the accuracy or authenticity of the other data. In this example, each layer in the stack may comprise: (a) a substrate on which an octoshape is printed; or (b) a film or label that attaches to the substrate and covers a printed octoshape.

Encoding

In some implementations of this invention, a computer associates each specific shape, in a set of allowed shapes, with specific data, in a set of data. For instance, a computer: (a) may map each specific shape in a set of allowed shapes to a unique group of data in a dataset; and (b) may map each specific group of data in the dataset to a unique shape in the set of allowed shapes. Put differently, this mapping (from a specific shape to a group of data, and vice versa) may be one-to-one. A computer may store this mapping (e.g., in a lookup table). A computer may recognize a specific shape, may retrieve the stored mapping, may employ the mapping to determine which specific group of data maps to the specific shape, and may then access the specific group of data.

For instance, in some cases, one or more computers: (a) analyze an image of (or other measurements of, or a digital representation of) a notched 2D shape; (b) recognize contours of respective notches or/and holes in the notched 2D shape; (c) calculate, based on the recognized contours, one or more numerical values (e.g., a vector, array, matrix or product identification number); (e) associate, based on the mapping, the one or more numerical values with a specific group of data; and (f) access the specific group of data. In some cases, the specific group of data comprises information about: (a) a first physical object that displays, includes, or forms the notched 2D shape; or (b) a second physical object that is attached to (or is part of, or includes) the first physical object.

In some cases, the forward mapping is indirect. For instance, a specific 2D contour (e.g., of a 2D notch or hole) may encode a specific 3D shape that in turn encodes other information. For example, in some cases, one or more computers employ a first mapping to associate 2D contours with the geometric shape, color and orientation of respective 3D subshapes. These 3D subshapes may in turn encode, represent or specify other information (such as, in some cases, a password or authentication value that allows access to yet other data). For instance, one or more computers may employ a second mapping to associate the 3D subshapes with this other information. The 3D subshapes may located in: (a) a product shape, (b) a cubic portion of a shape matrix; or (c) a pyramidal portion of a shape matrix.

In other cases, a computer employs a reverse mapping that: (a) takes, as an input, a group of data; and (b) outputs a virtual notched 2D shape. For instance, one or more computers: (a) may take, as an input, a group of data; (b) may retrieve a stored mapping; and may (c) employ the mapping to determine a contour of a notch or hole in notched 2D shape.

In some cases, the reverse mapping is indirect. For example, in some cases, one or more computers: (a) take, as an input, a group of data; (b) employs a first stored mapping to determine a unique 3D shape (in a set of 3D shapes) which the computer associates with the unique group of data; (c) calculates the outline of a 2D orthogonal projection of the unique 3D shape onto a geometric plane; and (c) employs a second stored mapping to determine a unique 2D contour (in a set of 2D contours) that the computer associates with the outline. For instance, the unique 3D shape may be a subshape that is located in and is part of: (a) a product shape, (b) a cubic portion of a shape matrix; or (c) a pyramidal portion of a shape matrix.

Furthermore, after calculating a specific contour of a 2D notch (or 2D hole), a computer may output digital instructions for fabricating a physical object that displays or includes the specific contour.

In some cases, the encoding scheme is facilitated by a set of unique 2D contours (e.g. of notches or holes). Each 2D contour in the set may have a shape that is different from any other 2D contour in the set. A computer may associate each 2D contour in the set with a unique group of data.

In some cases, a computer may associate 2D contours (e.g., of notches or holes) with groups of data in such a way that the association is not one-to-one. For instance, in some cases, a computer may: (a) associate a specific 2D contour (e.g., of a notch or hole) with multiple groups of data; or (b) associate a specific group of data with more than one 2D contours. In situations where a computer associates a specific 2D contour with multiple groups of data, the computer may employ the specific 2D contours and other information to determine which specific group of data to access.

Here are non-limiting examples of a shape "encoding" data: (a) the shape encodes the data; (b) the shape represents the data; or (c) the shape specifies the information. Also, a non-limiting example of a shape "encoding" information occurs when a computer: (a) associates the shape with the information; or (b) associates the information with the shape.

This invention is not limited to any particular encoding scheme. In illustrative implementations: (a) any number (e.g., any integer number less than 100,000) of allowed contours may be employed; and (b) each of the allowed contours may encode (or be associated with) different information. For instance, in some cases, these allowed contours are contours of: (a) 2D notches; (b) 2D protuberances; (c) one or more holes; or (d) one or more subregions of 2D notches, 2D protuberances, or hole(s). Alternatively or in addition, positions of one or more 2D notches, 2D protuberances, or 2D holes (relative to each other or relative to one or more other points) may encode information.

In some implementations, an encoding scheme involves mother shapes, subshapes, notches, and an octoshape, but the encoding is different than in Prototype A. For instance: (a) different types of mother shapes may be used, in addition to or in instead of the eight mother shapes described in Prototype A; (b) the number of mother shapes may be different than eight; (c) the number of subshapes per mother shape may be different than eight; (d) the manner in which each subshape is sliced may be different than in Prototype A; (e) the number of allowed 2D outlines of 3D subshapes may be different than 192; (f) the number of allowed contours of notches may be different than 192; (g) the allowed orientations, allowed colors, and allowed geometric shapes of the contours of the notches may be different than in Prototype A; (h) different colors of subshapes may be allowed, in addition to or in instead of the eight allowed colors described in Prototype A; and (h) the number of allowed colors may be different than eight.

Alternative Implementations

This invention is not limited to encoding sub-shapes (e.g., in a product shapes or in a cubic cell). Instead, this invention may directly encode any type of information. For instance, the contour of a notch of an octoshape may itself encode any type of information. Likewise, the geometric shape of a keyhole may itself encode any type of information. Likewise, the position of an orientation mark, relative to an octoshape as a whole, may encode any type of information.

This invention is not limited to octoshapes. Other notched polygons may be used instead. For instance, the notched polygon: (a) may (disregarding notches and any holes) be a regular convex polygon such as a pentagon, hexagon, heptagon, or decagon; (b) may have a notch in each otherwise straight edge of the perimeter of the notched polygon; and (c) may have none, one or more holes. For instance, the contour of a notch of a notched polygon may encode any type of information. Likewise, the geometric shape or position of one or more holes in a notched polygon may encode, represent, or be associated with any type of information. In some cases, the contour of a notch of a notched polygon encodes the geometric shape and orientation of a subshape, where the subshape is part of a product shape or located in a cubic cell of a shape matrix.

This invention is not limited to polygons. In some implementations, a set of 2D contours each encode information. The set of 2D contours may be notches in, or protuberances from, any geometric shape. For instance, the set of 2D contours may occur in a larger 2D shape, which has a straight edge that is modified by notches or protuberances. A computer may determine that each of these notched or protruding 2D contours is bounded (in one direction) by a line segment that is parallel to this straight edge.

This invention is not limited to keyholes and orientation marks, as described above. In some implementations, a 2D object has one or more holes. The 2D contours of these one or more holes and/or the positions of these one or more holes (relative to each other or relative to one or more other points) may encode information. These holes may be in addition to notches or protuberances in the 2D object which also encode information.

In some implementations of this invention, an octoshape is a virtual 2D geometric shape that is part of a computer model (e.g., CAD model). Likewise, in some implementations of this invention, a virtual notched polygon (or other virtual information-encoding 2D geometric shape) may be part of a computer model. The virtual octoshape (or virtual notched polygon or other virtual 2D geometric shape) may be calculated by a computer, may exist in digital format, and may encode any kind of data.

In some implementations of this invention, the octoshape is a 2D geometric shape that is formed by, displayed by, or part of, a 3D physical object. Likewise, in some implementations of this invention, a notched polygon (or other information-encoding 2D geometric shape) may be formed by, displayed by, or part of, a 3D physical object. The octoshape (or notched polygon or other 2D geometric shape) may encode any kind of data.

We sometimes call an octagon, notched polygon, notched 2D shape or other information-encoding 2D geometric shape a "Coded Shape".

In some cases, one or more Coded Shapes: (a) occur in or are displayed by an embossed, impressed, engraved, or etched pattern in a physical object; (b) are printed onto a surface of a physical object; (c) occur in or are displayed by a fabricated object (e.g., occur in a 2D cross-section of a fabricated object); or (d) are displayed by a holographic media. For instance, in the preceding sentence, the fabricated object may have been molded, pressed, injected, 3D printed, cut, carved or otherwise subtractively fabricated.

Any kind of information may be encoded by this invention. For instance, all or part of one or more Coded Shapes may encode, represent, or be associated with, one or more of the following types of information: product identification code, sku (stock keeping unit), lot number, unique label associated with a single object, password, authentication code, verification value, primary key, encryption key, banknote number, personal identification number, and any data associated with any of the foregoing information. For instance, an octoshape may encode a product identification number that is associated with a product and with information (such as manufacturer, ingredients, lot number, and expiration date) regarding the product.

In illustrative implementations, any one or more of the neural networks or other machine learning models mentioned herein may be employed to analyze image(s) of a Coded Shape and to extract information encoded by a Coded Shape.

Product Shape

As noted above, an octoshape may encode information about eight subshapes that together form a product shape.

This section titled "Product Shape" discusses product shapes.

A product shape may be formed by eight subshapes that come to together at a common vertex in the interior of a subshape. For instance, the corners of eight cubic cells may meet at a shared vertex in the center at the shape matrix. This in turn may cause eight subshapes (one in each cubic cell) to meet at this shared vertex (because there is a subshape in each corner of each cubic cell). These eight subshapes may form a product shape.

A product shape may encode a password or other information.

In some implementations: (a) each of the eight subshapes in a product shape may independently have any of 192 allowed combinations of geometric shape and orientation and may have any of eight allowed colors; and (b) it is allowed (but in most cases, unusual) for multiple subshapes in a product shape to have identical geometric shape, color and orientation. Alternatively, the number of allowed combinations of geometric shape and orientation may be different than 192, and the number of allowed colors may be different.

In some implementations, a product shape comprises multiple subshapes. Each subshape in the product shape may be different than all or some of the other subshapes in the product shape. For example, the subshapes in a product shape may differ from each other in color or in geometric shape.

Each subshape in the product shape may be a fragment (portion) of a different mother shape. For instance, in some use scenarios: (a) mother shapes include a cylinder, torus and pyramid; and (b) a product shape includes subshapes that each comprise a portion of a cylinder, or a portion of torus, or a portion of a pyramid.

Figure 14A:
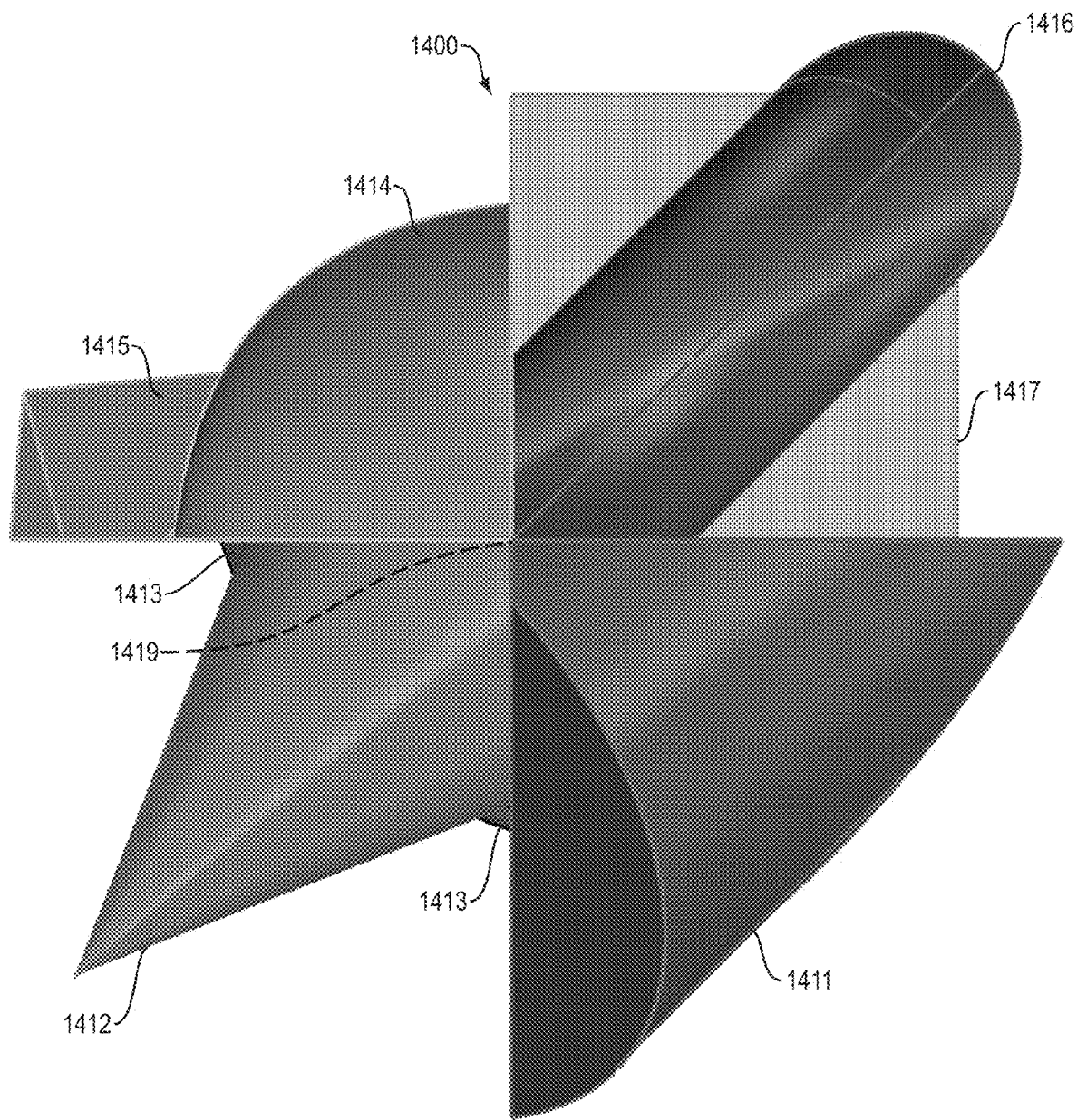
FIG. 14A shows a side orthogonal view of an illustrative product shape.

In the example shown in FIG. 14A, product shape 1400 comprises eight subshapes.

In FIG. 14A: (a) subshape 1411 is a portion of a cylinder; (b) subshape 1412 is a portion of a cone; (c) subshape 1413 is a portion of a sphere; (d) subshape 1414 is a portion of an ellipsoid; (e) subshape 1415 is a portion of an octahedron; (f) subshape 1416 is a portion of a torus, (g) subshape 1417 is a portion of a cube; and (h) subshape 1418 is a portion of a pyramid. Subshape 1418 is obscured from view in FIG. 14A, but is visible in FIGS. 14B, 14C and 14D. Subshape 1417 is a portion of a cube, and is itself a cube.

Put differently, in FIG. 14A: (a) subshape 1411 is a portion of a mother shape, where the mother shape is a cylinder; (b) subshape 1412 is a portion of a mother shape, where the mother shape is a cone; (c) subshape 1413 is a portion of a mother shape, where the mother shape is a sphere; (d) subshape 1414 is a portion of a mother shape, where the mother shape is an ellipsoid; (e) subshape 1415 is a portion of a mother shape, where the mother shape is an octahedron; (f) subshape 1416 is a portion of a mother shape, where the mother shape is a torus, (g) subshape 1417 is a portion of a mother shape, where the mother shape is a cube; and (h) subshape 1418 is a portion of a mother shape, where the mother shape is a pyramid.

Figure 14B:
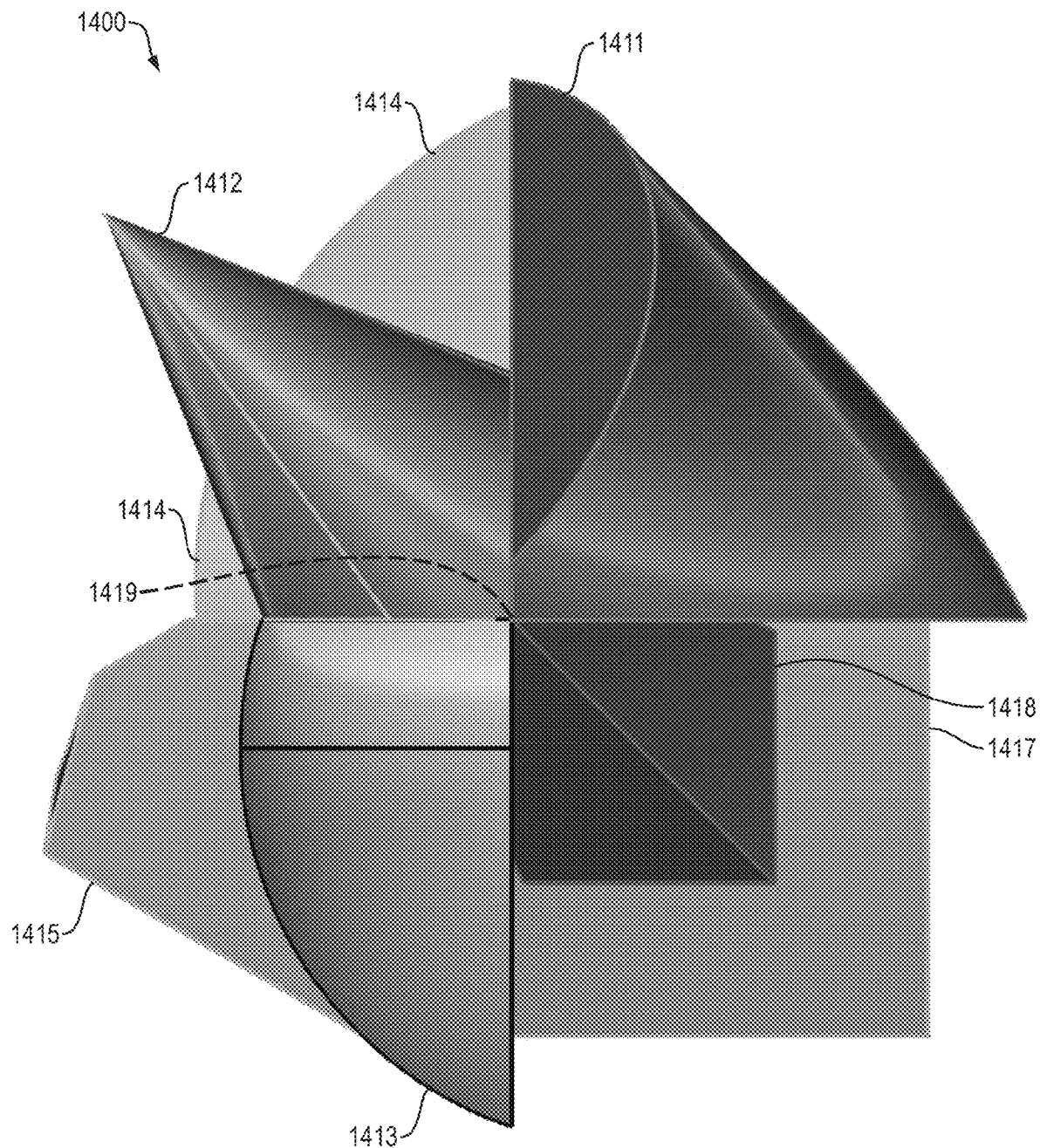
FIG. 14B shows a front orthogonal view of the same product shape.
Figure 14C:
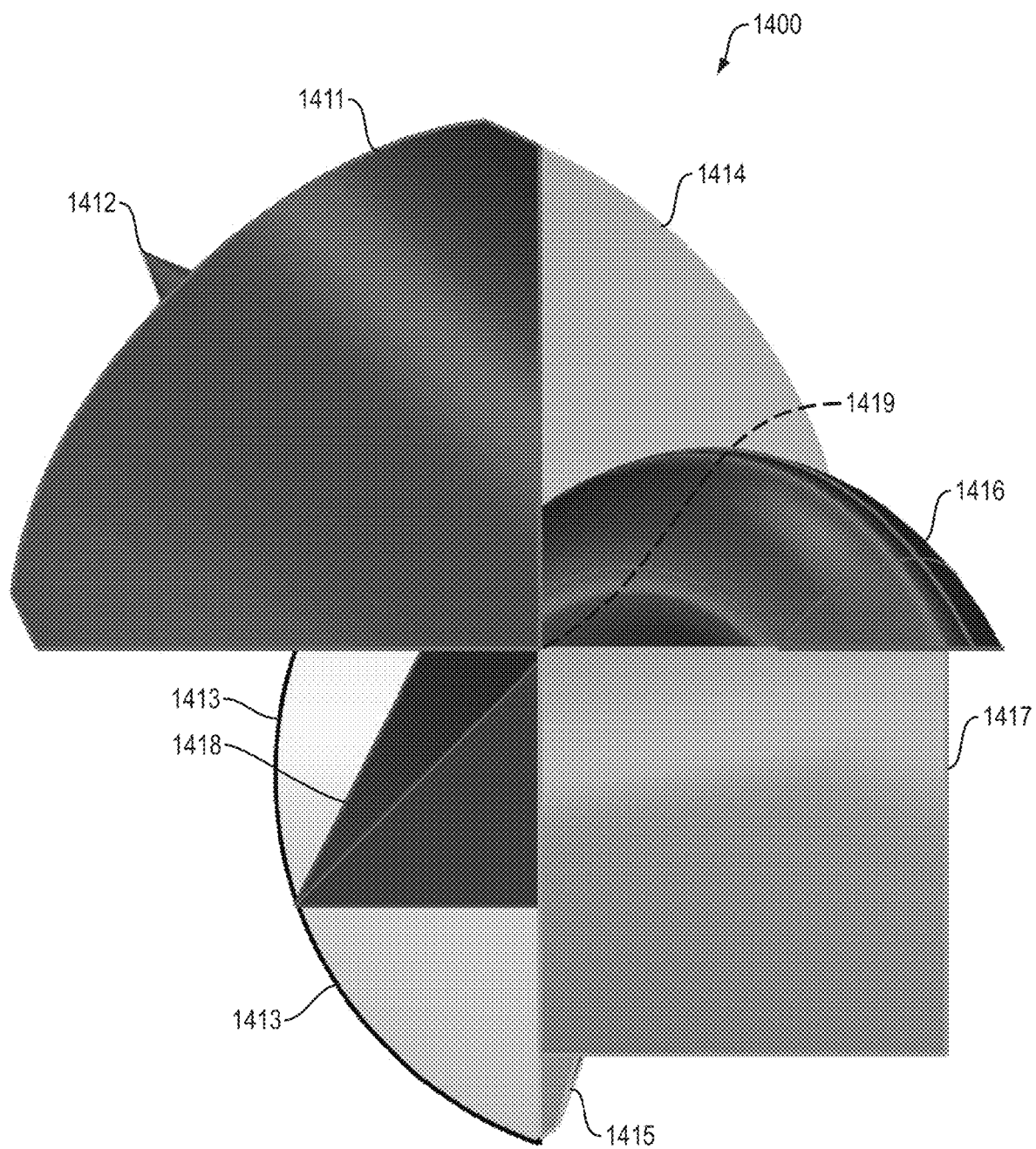
FIG. 14C shows a top orthogonal view of the same product shape.
Figure 14D:
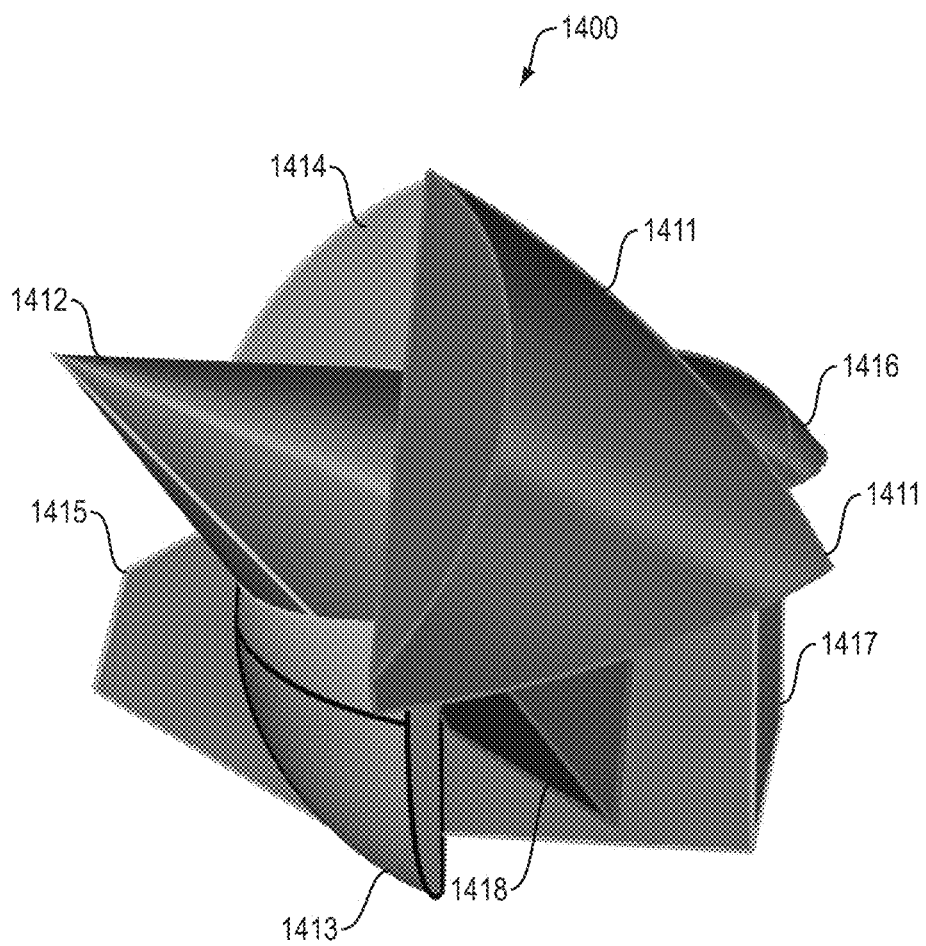
FIG. 14D shows a perspective view of the same product shape.

In FIG. 14A, the product shape is shown in side orthogonal view. FIGS. 14B, 14C and 14D show the same product shape from other vantage points. Specifically, the same product shape is shown: (a) in front orthogonal view in FIG. 14B; (b) in top orthogonal view in FIG. 14C; and (c) in perspective view in FIG. 14D.

FIGS. 14E, 14F, 14G and 14H each show an exploded view of the same product shape. Each of these exploded views is rotated by a different amount. By viewing FIGS. 14E, 14F, 14G and 14H sequentially, a viewer may see snapshots of the exploded view as it is being rotated counterclockwise.

As will be discussed in more detail below, a product shape has many different permutations.

Color: In many permutations of a product shape, each subshape in the product shape is different in color than all or some of the other subshapes in the product shape. For instance, in FIGS. 14A-14D, subshapes 1411, 1413, 1414, 1415, 1416, 1417 and 1418 are purple, gray, green, white, red, orange and blue, respectively.

Geometric Shape: In many permutations of a product shape, each subshape in the product shape is different in geometric shape than all or some of the other subshapes in the product shape.

In illustrative implementations, the subshapes in the product shape are tessellated. The tessellation may be achieved by the subshapes fitting flat against each other. For instance, each subshape in the product shape may include at least one planar surface that fits flat against a planar surface of another subshape in the product shape.

In the product shape shown in FIGS. 14A-14D, each subshape includes (in addition to other surfaces) three planar surfaces that each fit flat against a planar surface of another subshape.

Figure 14E:
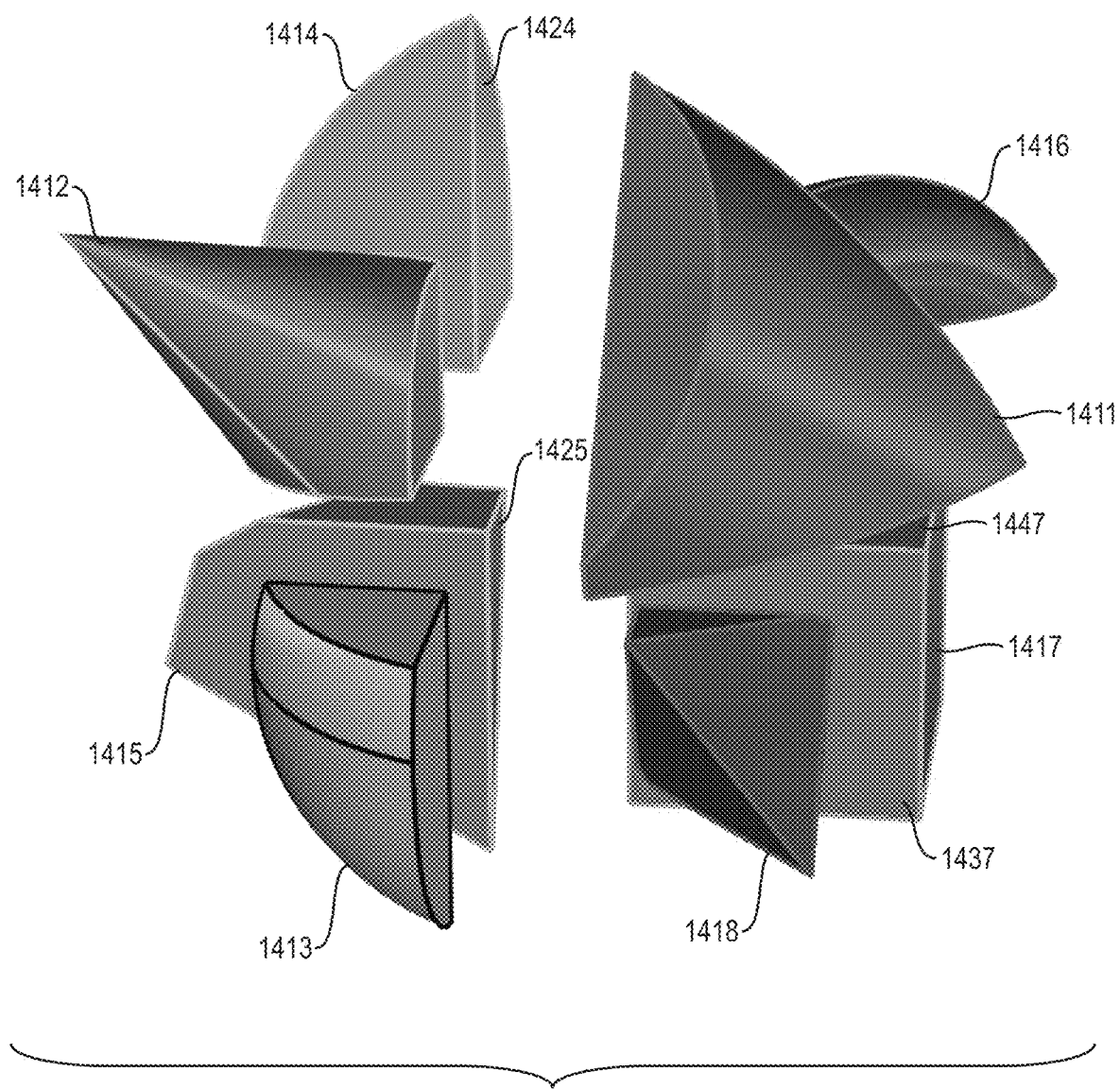
FIGS. 14E, 14F, 14G and 14H each show an exploded view of the same product shape. These exploded views are rotated by different amounts in FIGS. 14E, 14F, 14G and 14H.
Figure 14F:
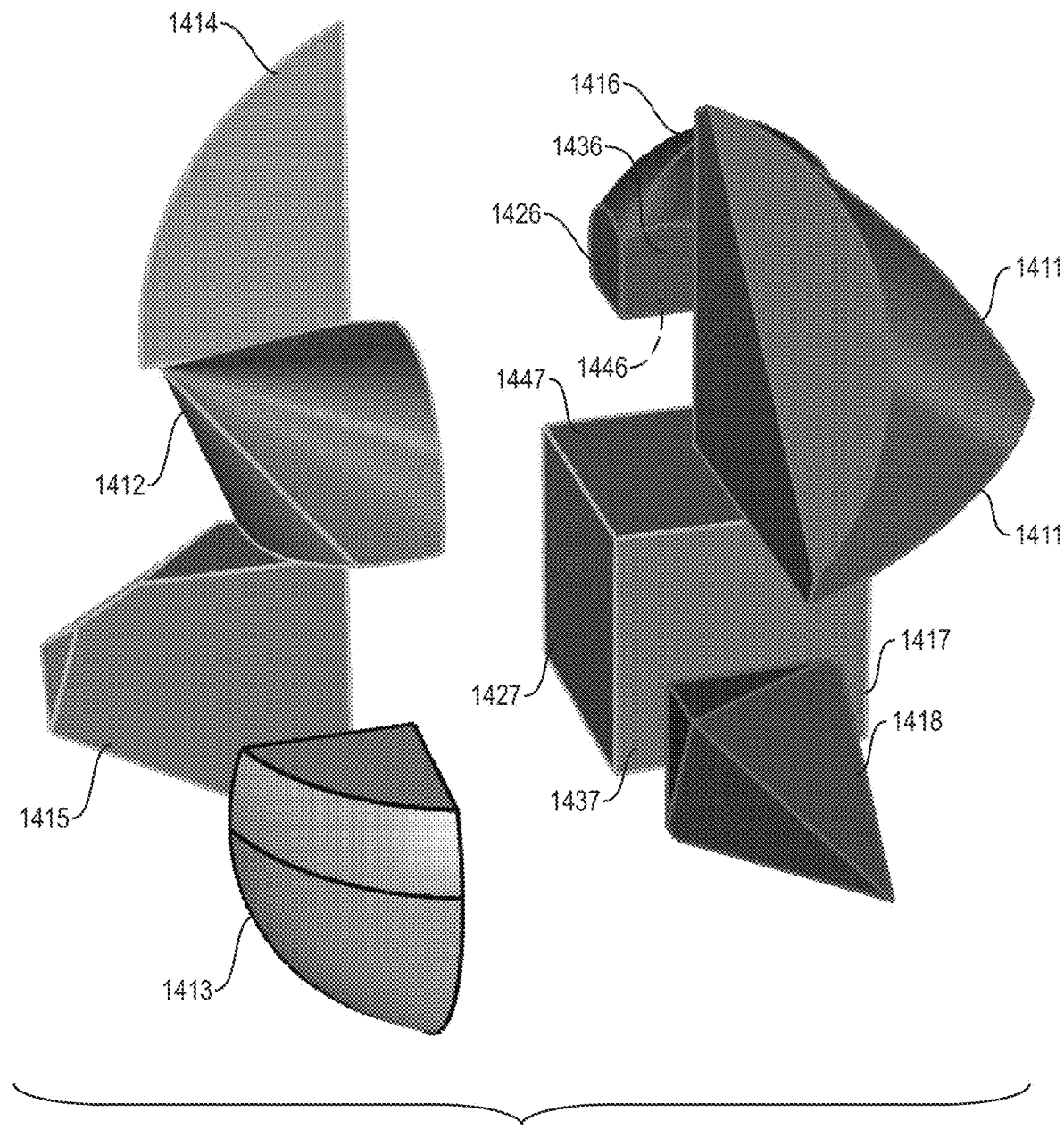
Figure 14G:
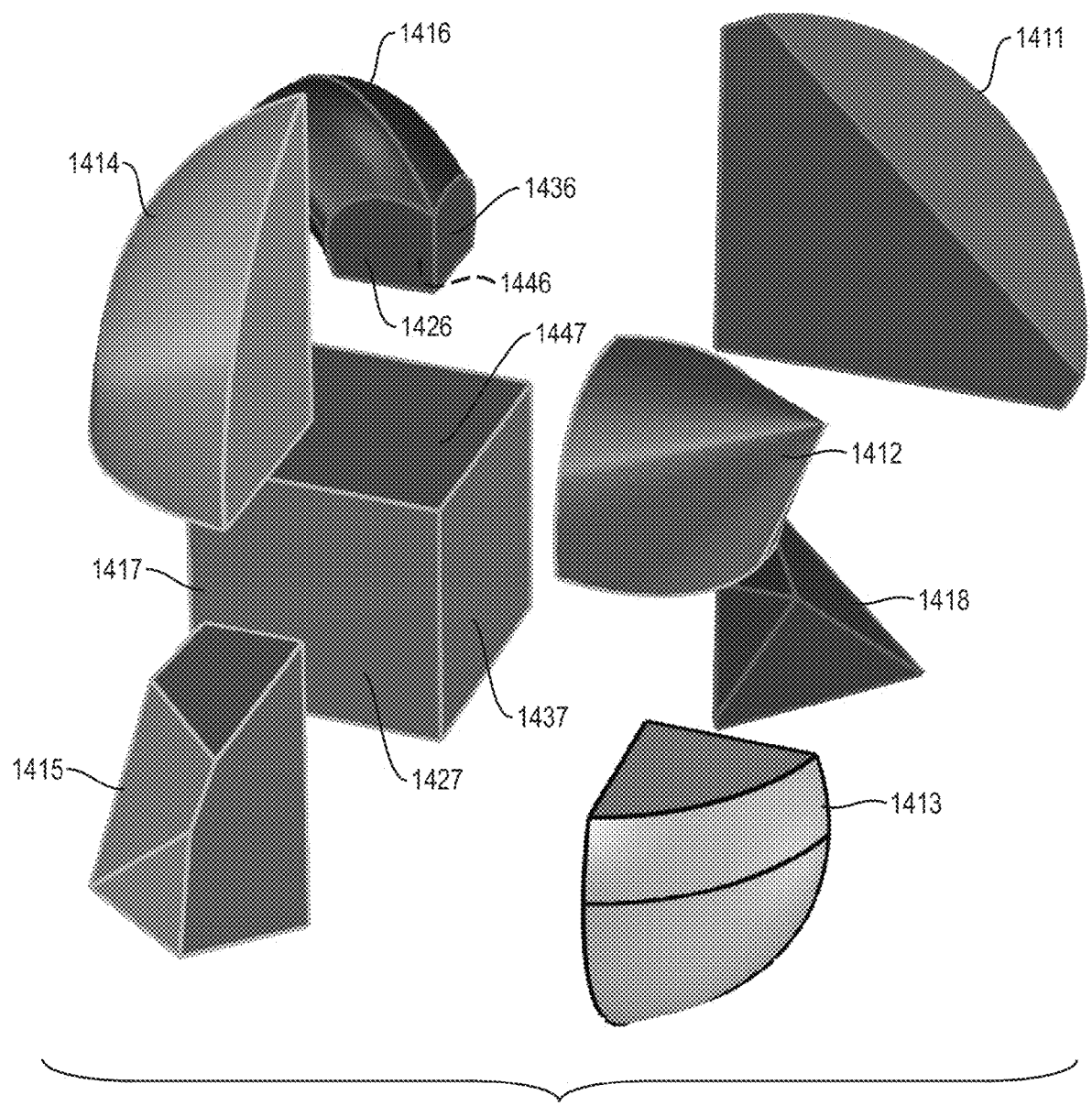
Figure 14H:
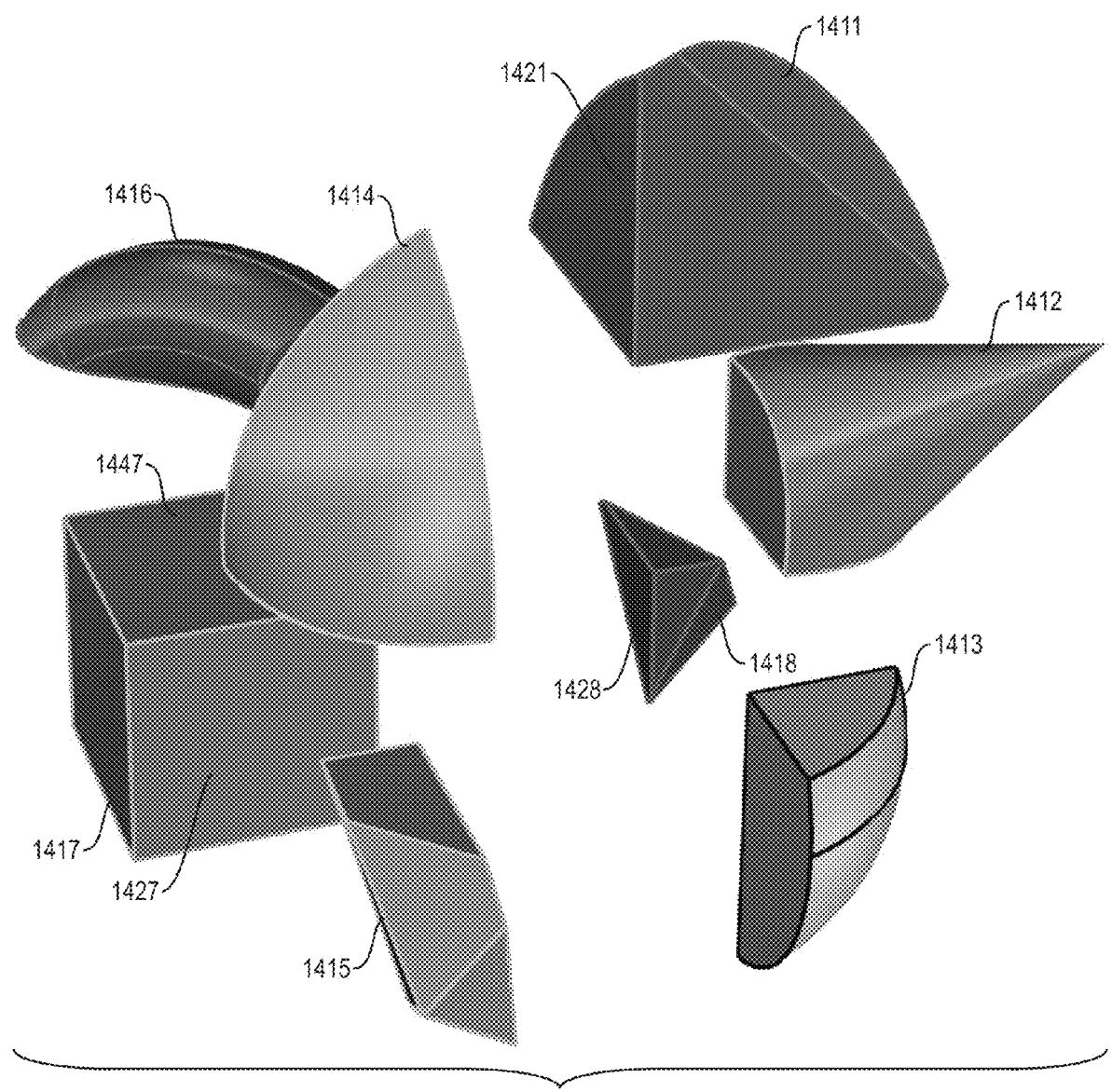

For instance, subshape 1416 is a portion of a toroid and has three planar surfaces, in addition to its curved surfaces. These three planar surfaces (1426, 1436, 1446) of subshape 1416 are shown in FIG. 14G. They each fit flat against a planar surface of another subshape in the product shape. Specifically: (1) Surface 1426 fits flat against surface 1424 (which is a planar surface of subshape 1414 and is shown in FIG. 14E). (2) Surface 1436 fits flat against surface 1421 (which is a planar surface of subshape 1411 and is shown in FIG. 14H). (3) Surface 1446 fits flat against surface 1447 (which is a planar surface of subshape 1417 and is shown in FIGS. 14E-14H).

Likewise, subshape 1417 is a portion of a cube and has six planar faces, including three planar faces (1427, 1437, 1447) that touch other subshapes. Surface 1427 is shown in FIGS. 14F-14H; surface 1437 is shown in FIG. 14E-1G; and surface 1447 is shown in FIGS. 14E-14H. Specifically: (1) Surface 1427 fits flat against surface 1425 (which is a planar surface of subshape 1415 and is shown in FIG. 14E). (2) Surface 1437 fits flat against surface 1428 (which is a planar surface of subshape 1418 and is shown in FIG. 14H). (3) Surface 1447 fits flat against surface 1446 (which is a planar surface of subshape 1416 and is shown in FIGS. 14F and 14G).

The subshapes in a product shape may be tessellated because planar surfaces of subshapes fit flat against each other. In some cases, when two planar surfaces fit flat against each other, the two surfaces touch each other and are parallel to each other. In other cases, when two planar surfaces fit flat against each other, the two surfaces are very close to each other and are parallel (or substantially parallel) to each other.

In many cases, each subshape in a product shape: (a) includes one, two or three planar surfaces that each fit flat against a planar surface of another subshape in the product shape, and (b) also includes one or more curved or planar surfaces that do not touch any surface of another subshape.

In some implementations of this invention, tessellation is achieved in other ways. Here are some non-limiting examples:

In some cases, tessellation is achieved by curved surfaces that conform to each other or fit together. For example: (a) a first subshape in the product shape may have a first curved surface; (b) a second subshape in the product shape may have a second curved surface; and (c) the first and second curved surfaces may fit together (or conform to each other) in a region. In some cases, when two curved surfaces fit together (or conform to each other) in a region, the two curved surfaces touch each other throughout the region. In other cases, when two curved surfaces fit together (or conform to each other) in a region, the two curved surfaces are very close to each other throughout the region.

In many implementations, the subshapes in a product shape share a common vertex. For instance, the subshapes of a product shape may come together at a single point that is a vertex of each of the subshapes. This single point may be inside the product shape.

FIGS. 14A-14C, 14I and 14J together show an example, in which the subshapes of a product shape share a common vertex.

Figure 14I:
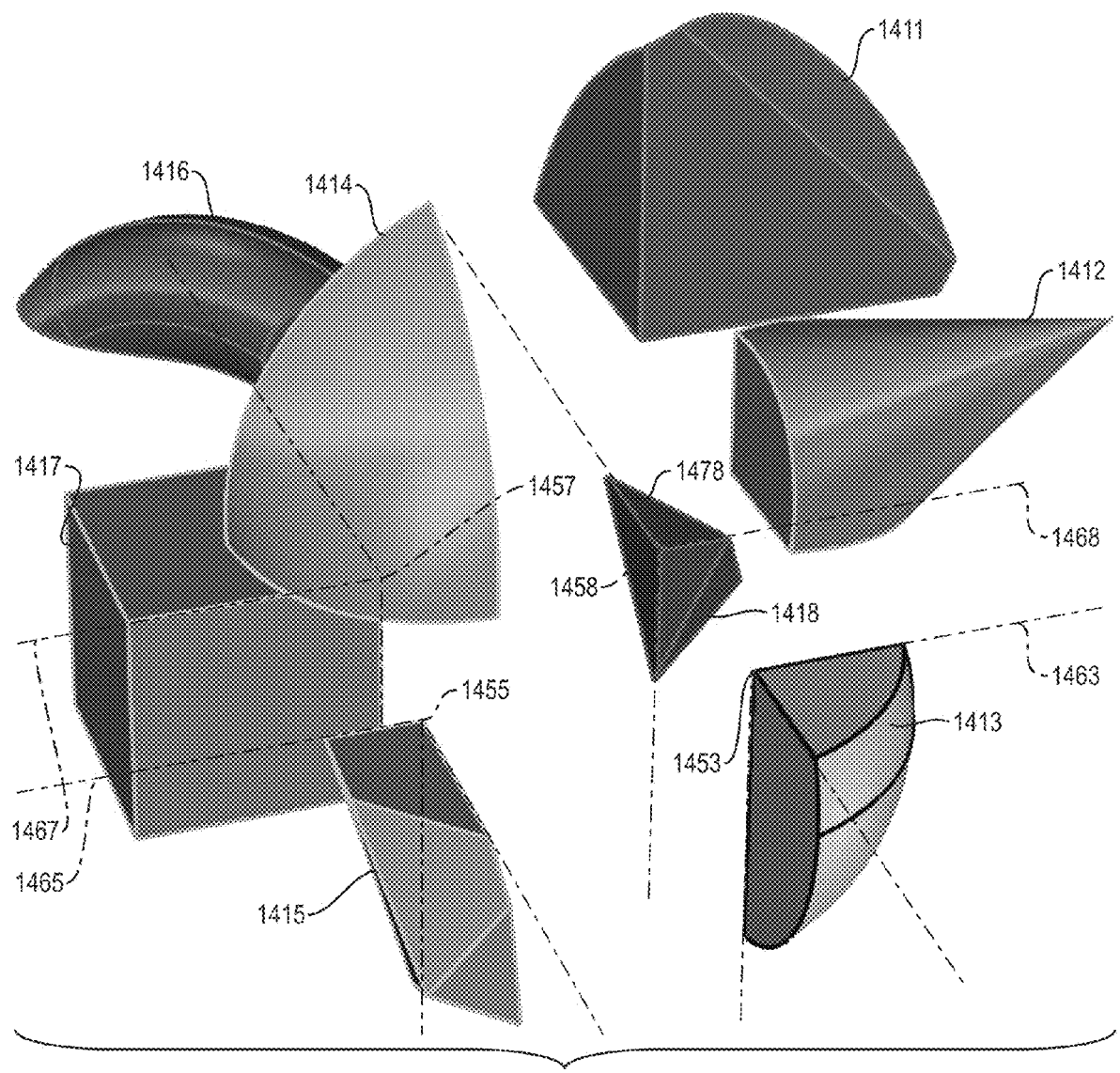
FIGS. 14I and 14J together show an example, in which all of the subshapes of a product shape share a common vertex.
Figure 14J:
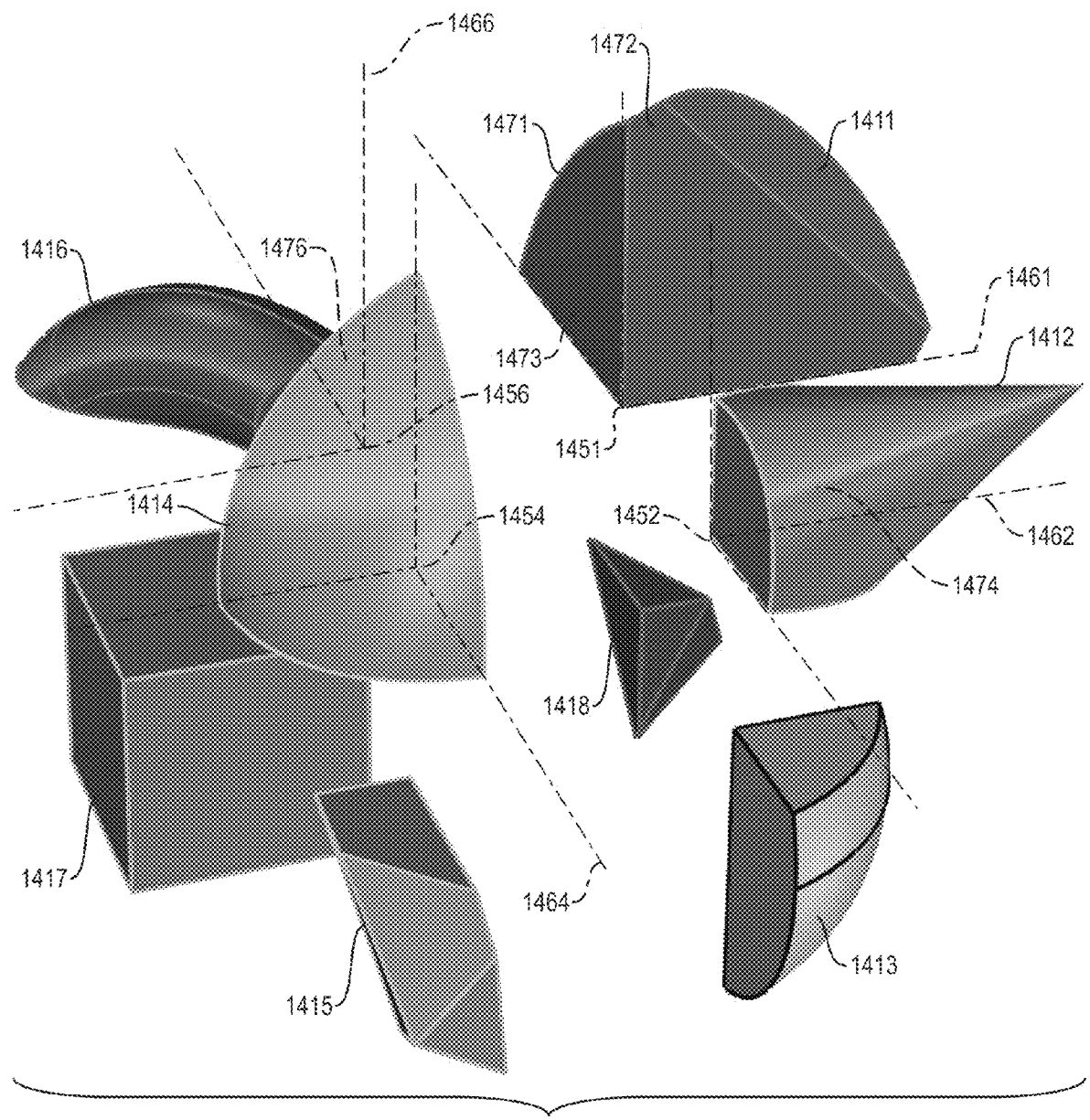

In FIG. 14I: (a) subshape 1413 includes vertex 1453; (b) subshape 1418 includes vertex 1458; (c) subshape 1415 includes vertex 1455; and (d) subshape 1417 includes vertex 1457. In FIG. 14J: (a) subshape 1411 includes a vertex 1451; (b) subshape 1412 includes vertex 1452; (c) subshape 1414 includes vertex 1454; and (d) subshape 1416 includes vertex 1456.

FIGS. 14I and 14J are exploded views of the product shape shown in FIGS. 14A to 14C. These exploded views cause vertices 1451, 1452, 1453, 1454, 1455, 1456, 1457, 1458 to appear to be in different locations. However, in actuality (when the product shape is not exploded), vertices 1451, 1452, 1453, 1454, 1455, 1456, 1457, 1458 are co-located at a single spatial point. Thus: (a) subshapes 1411, 1412, 1413, 1414, 1415, 1416, 1417, 1418 share a common vertex which is shown as vertex 1419 in FIGS. 14A-14C.

In many implementations, subshapes in a product shape share a common vertex. For example, each subshape in a product shape may include a vertex, at which three planar surfaces of the subshape intersect. A set of such vertices (one vertex from each subshape in the product shape) may be co-located at a single spatial point.

Alternatively, all of the subshapes in a product shape may meet in a compact region, in such a way that a vertex of each of the subshapes, is located in the compact region, even though at least one subshape in the product shape does not touch any other subshape in the product shape. For instance, in some cases, the compact region (in which a vertex of each of the subshapes in the product shape is located): (a) consists of all points in a sphere with radius r, where r is less than or equal to ½5th of the maximum dimension of the convex hull of the product shape; or (b) consists of all points in a sphere with volume v, where v is less than or equal to one fiftieth of the volume of the convex hull of the product shape.

As noted above, the subshapes in a product shape may be tessellated.

Alternatively, or in addition, the subshapes of a product shape may be located in corner regions that are tessellated. These tessellated corner regions may meet at a shared vertex in the interior of the product shape.

Put differently, tessellation may be achieved by tessellating corner regions in which subshapes of a product shape are located. This tessellation of corner regions may be done even if one or more of the subshapes are not tessellated—and even if one or more of the subshapes do not touch any other subshape.

In the example shown in FIGS. 14I and 14J, subshapes are located in corner regions that are tessellated and that meet at a shared vertex in the interior of the product shape: Specifically, eight corner regions are shown in FIGS. 14I and 14J. These eight corner regions are: (a) a first corner region that includes vertex 1451 and is in cubic cell 1461; (b) a second corner region that includes vertex 1452 and is in cubic cell 1462; (c) a third corner region that includes vertex 1453 and is in cubic cell 1463; (d) a fourth corner region that includes vertex 1454 and is in cubic cell 1464; (e) a fifth corner region that includes vertex 1455 and is in cubic cell 1465; (f) a sixth corner region that includes vertex 1456 and is in cubic cell 1466; (g) a seventh corner region that includes vertex 1457 and is in cubic cell 1467; and (h) an eighth corner region that includes vertex 1458 and is in cubic cell 1468.

In FIGS. 14I and 14J, subshapes 1411, 1412, 1413, 1414, 1415, 1416, 1417, 1418 are located in the first, second, third, fourth, fifth, sixth, seventh and eighth corner regions described in the preceding paragraph, respectively. Thus, in FIGS. 14I and 14J, there is one subshape per corner region.

In FIGS. 14I and 14J, these eight corner regions meet at a shared vertex in the interior of the product shape. As noted above, FIGS. 14I and 14J are exploded views, which cause vertices 1451, 1452, 1453, 1454, 1455, 1456, 1457, 1458 to appear to be in different locations. However, in actuality (when the product shape is not exploded), vertices 1451, 1452, 1453, 1454, 1455, 1456, 1457, 1458 are co-located at a single spatial point that is in the interior of the product shape. Thus, cubic cells 1461, 1462, 1463, 1464, 1465, 1466, 1467, 1468 all meet at a shared vertex, which is shown as vertex 1419 in FIGS. 14A-14C. Likewise, the first, second, third, fourth, fifth, sixth, seventh, and eighth corner regions described in the preceding two paragraphs all meet at the same point, which is shown as vertex 1419 in FIGS. 14A-14C.

In FIGS. 14I and 14J, these eight corner regions are tessellated.

Specifically, in FIGS. 14I and 14J, the eight corner regions are tessellated in such a way that each of the corner regions includes three planar faces, each of which fits flat against a planar face of another corner region. For instance, the first corner region (which is part of cubic cell 1461 and includes vertex 1451) includes three planar surfaces 1471, 1472, 1473. Out of these three surfaces: Surface 1471 fits flat against planar surface 1476 (of the sixth corner region which is part of cubic cell 1466). Surface 1472 fits flat against planar surface 1474 (of the second corner region which is part of cubic cell 1462). Surface 1473 fits flat against surface 1478 (of the eighth corner region which is part of cubic cell 1468).

In some cases, the corner region for a specific vertex of a polyhedron consists of all, or a subset of all, of the points in the polyhedron that are closer to the specific vertex than to any other vertex of the polyhedron. In some cases, the corner region for a specific vertex of a polyhedron consists of all, or a subset of all, of the points in the polyhedron that are y times closer to the specific vertex than to any other vertex of the polyhedron, where y is a non-zero, positive real number. For example, in some cases, y may be equal to 1, 2, 3, 4, 5, 6, 7, 8, 9, 10, 11, 12, 13, 14, 15, 16, 17, 18, 19 or 20. In some other cases, the corner region for a specific vertex of a convex polyhedron consists of all, or a subset of all, points in the polyhedron that are at a distance d from the specific vertex, where distance d is greater than or equal to zero and less than or equal to 50% of the length of the shortest edge of the polyhedron that connects directly to the specific vertex. In yet other cases, the corner region for a specific vertex of a convex polyhedron consists of all, or a subset of all, points in the polyhedron that are within a distance k of the specific vertex, where distance k is greater than or equal to zero and less than or equal to the product of x and the maximum dimension of the polyhedron. In some cases, the volume of each corner region in a polyhedron may be greater than zero and less than or equal to the product of x and the total volume of the polyhedron. In the preceding two sentences, x is a positive real number that is greater than zero and less than or equal to 0.30. For example, x may be equal to 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20. The examples described in this paragraph are non-limiting, other corner regions may be employed. The examples described in this paragraph may apply to any vertex shown in Figures II to IL.

In FIGS. 14I and 14J, certain faces of the subshapes fit flat against certain faces of the cubic cells. For instance, surface 1421 of subshape 1411 is co-planar with surface 1471 of cubic cell 1461.

Software

In the Computer Program Listing above, four computer program files are listed. These four computer program files comprise software employed in a prototype of this invention.

In order to submit these four programs to the U.S. Patent and Trademark Office, the four program files were converted to ASCII .txt format. In each of these four programs, these changes may be reversed, so that the four programs may be run. Specifically, these changes may be reversed by changing each filename extension from ".txt" to ".m".

createShapetag: The Matlab® function create Shapetag.m reads from the separate contour data file (named 'altShapetagContours.mat' in this instance) and places the appropriate contour onto the octagon based on 'outerContours' and 'innerContours'. Contour numbers (rather than a Product ID array) are inputted. Conversion from Product array to contour numbers may be done prior to function use.

errorCorrection: The Matlab® function errorCorrection.mreads a lookup table (which is ecc-lookuptable.csv file in this instance) and ensures input contour numbers match a chosen error correction scheme.

createShapetagSets: The Matlab® script createShapetagSets.m calls the two functions described above (i.e., createShapetag.m and errorCorrection.m) to generate a large set of octoshapes in png/jpg/svg format.

Settings:—The Matlab® script Settings.m defines a class and specifies attributes of the class. These attributes may be easily changed prior to set generation withcreateShapetagSets.m. These attributes include image pixel size, version numbering, set size, whether to generate a new set or read from premade .csv file in order to re-generate a set.

The source code described above may access data in two data files: (1) one data file contains vertex data for each of the 192 contours; and (2) the other data file contains instructions on how the error correction is performed. Both of these data files include a list of integer arrays.

This invention is not limited to the computer programs and data files described above. Other software (including functions and data files) may be employed. Depending on the particular implementation, the software used in this invention may vary.

In some implementations of this invention, a computer executes a software program that employs Matlab® Polyshape objects in order to calculate an octoshape. In this Polyshapeprogram: (a) an octoshape may be generated by first loading a set of 192 contours, which contours are polyshapes that have been previously generated and saved; and (b) each octoshape may be a polygon which is contained within a box with end point coordinates [0 0.5 0 0.5] (0 to 0.5 along X-axis and 0 to 0.5 along Y-axis).

Computers

In illustrative implementations of this invention, one or more computers (e.g., servers, network hosts, client computers, integrated circuits, microcontrollers, controllers, microprocessors, field-programmable-gate arrays, personal computers, digital computers, driver circuits, or analog computers) are programmed or specially adapted to perform one or more of the following tasks: (1) to control the operation of, or interface with, hardware components of a camera, imaging system, or input/output device; (2) to analyze images of an octoshape or other notched polygon in order to decode data that is represented by the octoshape or other notched polygon; (3) to access data that is associated with the decoded data; (4) to cause the decoded data (or data associated with or derived at least in part from, the decoded data) to be transmitted; (5) to receive data from, control, or interface with one or more sensors; (6) to perform any other calculation, computation, program, algorithm, or computer function described or implied herein; (7) to receive signals indicative of human input; (8) to output signals for controlling transducers for outputting information in human perceivable format; (9) to process data, to perform computations, and to execute any algorithm or software; and (10) to control the read or write of data to and from memory devices (tasks 1-10 of this sentence being referred to herein as the "Computer Tasks"). The one or more computers (e.g., 1505 or 1510) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory computer-readable media. For example, in some cases, these instructions comprise instructions for a computer to perform any calculation, computation, program, algorithm, or computer function described or implied herein. For instance, in some cases, instructions encoded in a tangible, non-transitory, computer-accessible medium comprise instructions for a computer to perform the Computer Tasks.

Computer Readable Media

In some implementations, this invention comprises one or more computers that are programmed to perform one or more of the Computer Tasks.

In some implementations, this invention comprises one or more tangible, machine readable media, with instructions encoded thereon for one or more computers to perform one or more of the Computer Tasks. In some implementations, these one or more media are not transitory waves and are not transitory signals.

In some implementations, this invention comprises participating in a download of software, where the software comprises instructions for one or more computers to perform one or more of the Computer Tasks. For instance, the participating may comprise (a) a computer providing the software during the download, or (b) a computer receiving the software during the download.

Network Communication

In illustrative implementations of this invention, one or more devices (e.g., 1502, 1505) are configured for wireless or wired communication with other devices in a network.

For example, in some cases, one or more of these devices include a wireless module for wireless communication with other devices in a network. Each wireless module may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables and wiring.

In some cases, one or more computers (e.g., 1505, 1510) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UMTS (universal mobile telecommunication system), CDMA (code division multiple access, including IS-95, IS-2000, and WCDMA), LTE (long term evolution), or 5G (e.g., ITU IMT-2020).

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

"Aligned with the X and Y axes" is defined above.

"Archimedes' constant" means the ratio of a circle's circumference to its diameter. Archimedes' constant is sometimes called "pi" or "$\pi$". Archimedes' constant is an irrational number that is approximately equal to 3.14159.

To compute "based on" specified data means to perform a computation that takes the specified data as an input.

"CAD" means computer-aided design.

Non-limiting examples of a "camera" include: (a) a digital camera; (b) a digital grayscale camera; (c) a digital color camera; and (d) a video camera.

The term "coincident" is used herein in its geometric sense. For instance: (a) to say that two points are "coincident" means that the two points are the same point as each other; (b) to say that two lines are "coincident" means that the two lines consist of the same set of points as each other; and (c) to say that two shapes are "coincident" means that the two shapes consist of the same set of points as each other.

The term "comprise" (and grammatical variations thereof) shall be construed as if followed by "without limitation". If A comprises B, then A includes B and may include other things.

A digital computer is a non-limiting example of a "computer". An analog computer is a non-limiting example of a "computer". A computer that performs both analog and digital computations is a non-limiting example of a "computer". However, a human is not a "computer", as that term is used herein.

"Coded Shape" is defined above.

"Computer Tasks" is defined above.

As used herein, "contour" of a 2D shape means the perimeter of the 2D shape. As used herein, a "contour" of a 3D shape means an outline of the 3D shape.

As used herein, "contours of respective notches" means a set of contours that consists of a contour for each of the notches. For example, if there were eight notches, then the "contours of the respective notches" would consist of eight contours: that is, one contour for each notch. Likewise, as used herein, "contours of respective regions" means a set of contours that consists of a contour for each of the regions. For example, if there were four regions, then the "contours of the respective regions" would consist of four contours: that is, one contour for each region.

"Convex hull" is defined above.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

Non-limiting examples of an "equation", as that term is used herein, include: (a) an equation that states an equality; (b) an inequation that states an inequality; (c) a mathematical statement of proportionality or inverse proportionality; (d) a system of equations; (e) a mathematical optimization problem; or (f) a mathematical expression.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, so that they each may be referred to later with specificity (e.g., by referring to "the first" thing and "the second" thing later). For example, if a device has a first socket and a second socket, then, unless the context clearly indicates otherwise, the device may have two or more sockets, and the first socket may occur in any spatial order relative to the second socket. A phrase that includes a "third" thing, a "fourth" thing and so on shall be construed in like manner.

"For instance" means for example.

As used herein, to say that a physical object "forms" a 2D geometric shape means that the 2D geometric shape exists in or on the physical object. Here are four non-limiting examples: (1) A 2D geometric shape printed, painted, drawn, engraved, impressed, embossed, or etched or otherwise present on an exterior surface of a physical object exists in or on the physical object and thus is "formed" (as that term is used herein) by the physical object. (2) A 2D geometric shape in a cross-section of a physical object exists in the physical object and thus is "formed" (as that term is used herein) by the physical object. (3) A 2D geometric shape that is present in a plane of a molded, pressed, injected, 3D-printed, cut, carved or otherwise fabricated physical object exists in the physical object and thus is "formed" (as that term is used herein) by the physical object. (4) Holographic interference patterns in a physical object that are a record of a 2D geometric shape exist in the physical object and thus the physical object "forms" (as that term is used herein) the 2D geometric shape.

As used herein, two objects may have the same "geometric shape" even though they differ in scale. For instance, as used herein: (a) a first sphere with a radius of 10 cm has the same "geometric shape" as a second sphere with a radius of 50 cm; and (b) a first cube with a volume of one liter has the same "geometric shape" as a second cube with a volume of one milliliter. Put differently, a transformation that consists of only uniform scaling is disregarded, when determining whether two objects have identical "geometric shapes", as that phrase is used herein. Likewise, a transformation that consists of only one or more rotations, translations and uniform scaling is disregarded, when determining whether two objects have identical "geometric shapes", as that phrase is used herein.

To say a "given" the shape is simply a way of identifying the X, such that the X may be referred to later with specificity. To say a "given" the shape does not create any implication regarding X. For example, to say a "given" the shape does not create any implication that the shape is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"Inner contour" is defined above.

"I/O device" means an input/output device. Non-limiting examples of an I/O device include a touch screen, other electronic display screen, keyboard, mouse, microphone, handheld electronic game controller, digital stylus, display screen, speaker, or projector for projecting a visual display.

To say that a first geometric shape "matches" a second geometric shape means that the first and second shapes are identical to each other. To say that a first contour "matches" a second contour means that the first and second contours are identical to each other. To say that an outline of a 3D shape "matches" a contour of a 2D shape (or vice versa) means that the contour and the outline are identical to each other.

As used herein, the "maximum dimension" of an object means the longest Euclidian distance between any two points of the object. For example, the maximum dimension of a circle is the diameter of the circle. Also, for example, if the sides of a square each have length A, then the maximum dimension of the square is $\sqrt{2}A$ (the length of the diagonal between two opposite vertices of the square).

The term "mobile computing device" or "MCD" means a device that includes a computer, a camera, a display screen and a wireless transceiver. Non-limiting examples of an MCD include a smartphone, cell phone, mobile phone, tablet computer, laptop computer and notebook computer.

To say that a shape is "notched" means that the shape has been modified by notches. For instance, a notched polygon is a shape that is different than a polygon and that results from notching the perimeter of the polygon.

To "multiply" includes to multiply by an inverse. Thus, to "multiply" includes to divide.

As used herein, a "notch" may have any geometric shape.

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

"Outer contour" is defined above.

As used herein, the term "set" does not include a group with no elements.

To say that a set of objects "share a common vertex" means that: (a) all of the vertices in a set of vertices are co-located, which set of vertices includes a vertex of each object in the set of objects; or (b) a set of vertices are located a region that is small relative to the set of objects, which set of vertices includes a vertex of each object in the set of objects.

To say that a region is "small" relative to a set of objects means that the volume of the region is less than one fiftieth of the volume of the convex hull of the set of objects.

Unless the context clearly indicates otherwise, "some" means one or more.

As used herein, to say that an association is "stored" means that the association is stored in a non-transitory, machine-readable medium. For instance, a look-up table that is stored in a non-transitory, machine-readable medium is a non-limiting example of a "stored association".

As used herein, a "subset" of a set consists of less than all of the elements of the set.

The term "such as" means for example.

"2D" means two-dimensional.

"3D" means three-dimensional.

To say that a machine-readable medium is "transitory" means that the medium is a transitory signal, such as an electromagnetic wave.

To say that a first surface of a first object is "very close" to a second surface of a second object means that the smallest distance between the first and second objects is less than one thirtieth of the maximum dimension of the convex hull of a group of objects that consists of the first and second objects.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) one or more steps in the method are done in parallel or serially; (5) any step in the method is performed iteratively; (6) a given step in the method is applied to the same thing each time that the given step occurs or is applied to a different thing each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Notwithstanding anything to the contrary herein or in the 662 application, if there is any conflict between any definition set forth in the 662 application and any definition set forth herein, then the definition set forth herein shall control. Notwithstanding anything to the contrary herein or in the 530 patent, if there is any conflict between any definition set forth in the 530 patent and any definition set forth herein, then the definition set forth herein shall control. For purposes of this paragraph, the incorporation by reference of the 662 application and 530 patent is disregarded (i.e., treated as not occurring) when determining whether a definition or other language is set forth "herein".

Non-Limiting Examples

This invention may be implemented in many different ways. Here are some non-limiting examples:

In some implementations, this invention is a method comprising: (a) analyzing an image of, or at least one measurement of, a first physical object to identify a set of contours, which set consists of a contour of each of a plurality of notches in a perimeter of a two-dimensional (2D) geometric shape, the 2D shape being a spatial pattern formed by the first physical object; (b) accessing a stored association that associates the set of contours with specific data; and (c) based on the stored association, accessing the specific data; wherein (i) the 2D shape has a convex hull, and (ii) the convex hull is a convex regular polygon with at least five sides. In some cases, the convex hull is a convex regular octagon. In some cases, the stored association is part of a look-up table. In some cases, the stored association associates the set of contours with the specific data via a chain of sub-associations. In some cases, the specific data comprises information about the first physical object or about a second physical object that includes or that is attached to the first physical object. In some cases: (a) the specific data represents three-dimensional (3D) shapes; and (b) the contours of the notches match respective outlines of the 3D shapes. In some cases: (a) the specific data represents orientation and geometric shape of specific three-dimensional (3D) objects; (b) the contours of the notches match respective outlines of the specific 3D objects; and (c) the first physical object is not one of the specific 3D objects. Each of the cases described above in this paragraph is an example of the method described in the first sentence of this paragraph, and is also an example of an embodiment of this invention that may be combined with other embodiments of this invention.

In some implementations, this invention is an article of manufacture comprising a machine-readable non-transitory media having instructions encoded thereon for enabling one or more processors to perform the operations of: (a) analyzing an image of, or at least one measurement of, a physical object to identify a set of contours, which set consists of a contour of each of a plurality of notches in a perimeter of a two-dimensional (2D) geometric shape, the 2D shape being a spatial pattern formed by the physical object; (b) accessing a stored association that associates the set of contours with specific data; and (c) based on the stored association, accessing the specific data; wherein (i) the 2D shape has a convex hull, and (ii) the convex hull is a convex regular polygon with at least five sides. In some cases, the convex hull is a convex regular octagon. In some cases: (a) the specific data represents three-dimensional (3D) shapes; and (b) the contours of the notches match respective outlines of the 3D shapes. In some cases: (a) the specific data represents orientation and geometric shape of three-dimensional (3D) virtual objects; and (b) the contours of the notches match respective outlines of the 3D virtual objects. Each of the cases described above in this paragraph is an example of the article of manufacture described in the first sentence of this paragraph, and is also an example of an embodiment of this invention that may be combined with other embodiments of this invention.

In some implementations, this invention is a system comprising a set of physical objects, wherein each physical object in the set forms a specific two-dimensional (2D) geometric shape, which specific 2D shape: (a) is different from any other 2D shape that is formed by any other physical object in the set; (b) has a perimeter that is indented by notches that are, as a group, associated with specific data by a stored association; and (c) has a convex hull that is a convex regular polygon with at least five sides. In some cases: (a) the specific 2D shape has a hole in an interior region of the specific 2D shape, which hole is not one of notches; (b) the rim of the hole is an irregular polygon; and (c) distances between a reference point and respective vertices of the irregular polygon are each associated, by a stored association, with data other than the specific data. In some cases: (a) the specific 2D shape has a hole in an interior region of the specific 2D shape, which hole is not one of notches; and (b) contours of respective regions of the perimeter of the hole are each associated, by a stored association, with a color. In some cases, the convex hull is a convex regular octagon. In some cases, the stored association is part of a look-up table. In some cases: (a) the specific data represents a three-dimensional (3D) shape; and (b) the perimeters of the notches match respective outlines of the 3D shapes. In some cases: (a) the specific data represents orientation and geometric shape of specific three-dimensional (3D) objects; and (b) the perimeters of the notches match respective outlines of the specific 3D objects. In some cases: (a) the specific data represents an orientation and a geometric shape of three-dimensional (3D) virtual objects; (b) the contours of the notches match respective outlines of the 3D virtual objects; (c) there are only three allowed orientations of the 3D virtual objects; and (d) there are only sixty-four allowed geometric shapes of the 3D virtual objects. In some cases, the specific data represents orientation and geometric shape of subshapes in a portion of a shape matrix. In some cases, the specific data represents orientation and geometric shape of subshapes in a product shape. In some cases, the set of physical objects are layers that are stacked in such a way that each physical object in the set touches at least one other physical object in the set. Each of the cases described above in this paragraph is an example of the system described in the first sentence of this paragraph, and is also an example of an embodiment of this invention that may be combined with other embodiments of this invention.

In some implementations, this invention is a system comprising: (a) one or more computers; and (b) a set of physical objects other than the one or more computers; wherein (i) each physical object in the set forms a specific two-dimensional (2D) geometric shape, which specific 2D shape (A) is different from any other 2D shape that is formed by any other physical object in the set, (B) has a perimeter that is indented by notches, and (C) has a convex hull that is a convex regular polygon with at least five sides, and (ii) the one or more computers are programmed (A) to analyze an image of, or at least one measurement of, a first physical object in the set of physical objects, to identify contours of respective notches in the perimeter of a 2D geometric shape, which 2D shape is formed by the first physical object, (B) to access a stored association that associates the contours, as a group, with specific data, and (C) based on the stored association, to access the specific data. Each of the cases described above in this paragraph is an example of the system described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

Any document that is incorporated by reference herein ("incorporated document") does not limit the scope of this invention (including the scope of any hardware, hardware component, method, process, step, software, algorithm, feature, or technology that is described in this document). Any incorporated document shall only expand—and shall not limit—the scope of this invention. For example, if any given feature described in any incorporated document is different from, or in addition to, the features described in this document, this additional or different feature of the incorporated document does not limit any implementation of this invention described in this document.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including any hardware, hardware components, methods, processes, steps, software, algorithms, features, and technology) that are described herein.

What is claimed:

1. A method comprising:
   (a) analyzing an image of, or at least one measurement of, a first physical object to identify a set of contours, which set comprises a contour of each of a plurality of notches in a perimeter of a two-dimensional (2D) geometric shape, the 2D shape being a spatial pattern formed by the first physical object;
   (b) accessing a stored association that associates the set of contours with specific data; and
   (c) based on the stored association, accessing the specific data; wherein
      (i) the 2D shape has a convex hull, and
      (ii) the convex hull is a convex regular polygon with at least five sides.

2. The method of claim 1, wherein the convex hull is a convex regular octagon.

3. The method of claim 1, wherein the stored association is part of a look-up table.

4. The method of claim 1, wherein the stored association associates the set of contours with the specific data via a chain of sub-associations.

5. The method of claim 1, wherein the specific data comprises information about the first physical object or about a second physical object that includes or that is attached to the first physical object.

6. The method of claim 1, wherein:
   (a) the specific data represents three-dimensional (3D) shapes; and
   (b) the contours of the notches match respective outlines of the 3D shapes.

7. The method of claim 1, wherein:
   (a) the specific data represents orientation and geometric shape of specific three-dimensional (3D) objects;
   (b) the contours of the notches match respective outlines of the specific 3D objects; and
   (c) the first physical object is not one of the specific 3D objects.

8. An article of manufacture comprising one or more machine-readable non-transitory media having instructions encoded thereon for enabling one or more processors to perform the operations of:
   (a) analyzing an image of, or at least one measurement of, a physical object to identify a set of contours, which set comprises a contour of each of a plurality of notches in a perimeter of a two-dimensional (2D) geometric shape, the 2D shape being a spatial pattern formed by the physical object;
   (b) accessing a stored association that associates the set of contours with specific data; and
   (c) based on the stored association, accessing the specific data; wherein
      (i) the 2D shape has a convex hull, and
      (ii) the convex hull is a convex regular polygon with at least five sides.

9. The article of manufacture of claim 8, wherein the convex hull is a convex regular octagon.

10. The article of manufacture of claim 8, wherein:
(a) the specific data represents three-dimensional (3D) shapes; and
(b) the contours of the notches match respective outlines of the 3D shapes.

11. The article of manufacture of claim 8, wherein:
(a) the specific data represents orientation and geometric shape of three-dimensional (3D) virtual objects; and
(b) the contours of the notches match respective outlines of the 3D virtual objects.

12. A method comprising:
(a) analyzing an image of, or at least one measurement of, a first physical object to identify a set of notch contours, which set of notch contours comprises contours of respective notches in a perimeter of a two-dimensional (2D) geometric shape, the 2D shape being a spatial pattern formed by the first physical object;
(b) storing a plurality of sets of allowed notch contours;
(c) storing data each associated with a respective one of the sets of allowed notch contours;
(d) identifying a particular one of the sets of allowed notch contours that is substantially the same as the set of notch contours in the perimeter of the 2D geometric shape; and
(e) accessing specific data of the stored data that is associated with the identified particular one of the sets of allowed notch contours; wherein
(i) the 2D shape has a convex hull, and
(ii) the convex hull is a convex regular polygon with at least five sides.

13. The method of claim 12 wherein the convex hull is a convex regular octagon.

14. The method of claim 12 wherein the plurality of sets of allowed notch contours and the data each associated with a respective one of the sets of allowed notch contours are stored in a look-up table.

15. The method of claim 12 wherein the stored data each associated with a respective one of the sets of allowed notch contours is associated via a chain of sub-associations.

16. The method of claim 12 wherein the specific data comprises information about the first physical object or about a second physical object that includes or that is attached to the first physical object.

17. The method of claim 12 wherein:
(a) the specific data represents three-dimensional (3D) shapes; and
(b) the contours of the notches match respective outlines of the 3D shapes.

18. The method of claim 12 wherein:
(a) the specific data represents orientation and geometric shape of specific three-dimensional (3D) objects;
(b) the contours of the notches match respective outlines of the specific 3D objects; and
(c) the first physical object is not one of the specific 3D objects.

19. An article of manufacture comprising at least one machine-readable non-transitory medium having instructions encoded thereon for enabling one or more processors to perform the operations of:
(a) analyzing an image of, or at least one measurement of, a first physical object to identify a set of notch contours, which set of notch contours comprises contours of respective notches in a perimeter of a two-dimensional (2D) geometric shape, the 2D shape being a spatial pattern formed by the first physical object;
(b) storing a plurality of sets of allowed notch contours;
(c) storing data each associated with a respective one of the sets of allowed notch contours;
(d) identifying a particular one of the sets of allowed notch contours that is substantially the same as the set of notch contours in the perimeter of the 2D geometric shape; and
(e) accessing specific data of the stored data that is associated with the identified particular one of the sets of allowed notch contours; wherein
(i) the 2D shape has a convex hull, and
(ii) the convex hull is a convex regular polygon with at least five sides.

20. The article of manufacture of claim 19 wherein the convex hull is a convex regular octagon.

21. The article of manufacture of claim 19 wherein the plurality of sets of allowed notch contours and the data each associated with a respective one of the sets of allowed notch contours are stored in a look-up table.

22. The article of manufacture of claim 19 wherein the stored data each associated with a respective one of the sets of allowed notch contours is associated via a chain of sub-associations.

23. The article of manufacture of claim 19 wherein the specific data comprises information about the first physical object or about a second physical object that includes or that is attached to the first physical object.

24. The article of manufacture of claim 19 wherein:
(a) the specific data represents three-dimensional (3D) shapes; and
(b) the contours of the notches match respective outlines of the 3D shapes.

25. The article of manufacture of claim 19 wherein:
(a) the specific data represents orientation and geometric shape of specific three-dimensional (3D) objects;
(b) the contours of the notches match respective outlines of the specific 3D objects; and
(c) the first physical object is not one of the specific 3D objects.

* * * * *